(12) United States Patent
Kurani

(10) Patent No.: US 11,922,418 B1
(45) Date of Patent: Mar. 5, 2024

(54) THIRD PARTY PRODUCTS AND SERVICES VIA ATM

(71) Applicant: Wells Fargo Bank, N.A., San Francisco, CA (US)

(72) Inventor: Ashish B. Kurani, Hillsborough, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/964,803

(22) Filed: Oct. 12, 2022

Related U.S. Application Data

(63) Continuation of application No. 17/689,918, filed on Mar. 8, 2022, now Pat. No. 11,741,470, which is a
(Continued)

(51) Int. Cl.
*G06Q 40/00* (2023.01)
*G06Q 20/10* (2012.01)
(Continued)

(52) U.S. Cl.
CPC ....... *G06Q 20/4012* (2013.01); *G06Q 20/102* (2013.01); *G06Q 20/1085* (2013.01); *G06Q 20/18* (2013.01); *G06Q 20/3226* (2013.01)

(58) Field of Classification Search
CPC ............ G06Q 20/4012; G06Q 20/102; G06Q 20/1085; G06Q 20/18; G06Q 20/3226
(Continued)

(56) References Cited

U.S. PATENT DOCUMENTS 5,465,206 A    11/1995  Hilt et al.
5,649,117 A *   7/1997  Landry ................ G06Q 20/102
                                              705/40

(Continued)

OTHER PUBLICATIONS

Adaptive & dynamic interfaces for automated teller machines using clusters; 2018 International Conference on Computing, Mathematics and Engineering Technologies (iCoMET) (pp. 1-6); Muhammad Imran, Aarij Mahmood Hussaan; Mar. 3, 2018. ( Year: 2018).*
(Continued)

*Primary Examiner* — Tien C Nguyen
(74) *Attorney, Agent, or Firm* — Foley & Lardner LLP

(57) ABSTRACT

A computer-implemented method of completing a transaction comprises receiving, by one or more processors, a request to complete a transaction between a third party and a third party customer. The method comprises providing a first user interface to the third party customer via a customer device associated with the third party customer. The first user interface comprises a plurality of payment options to complete the transaction. The method comprises receiving a selection of one of the plurality of payment options to complete the transaction. The selection comprises a cash payment at a transaction machine. The method comprises generating a second user interface comprising a map that shows locations of a plurality of transaction machines in relation to a current position of the third party customer. The method comprises completing the transaction based on the cash payment being received by one of the plurality of transaction machines from the map.

20 Claims, 39 Drawing Sheets

Related U.S. Application Data continuation of application No. 16/943,675, filed on Jul. 30, 2020, now Pat. No. 11,379,839, which is a continuation-in-part of application No. 16/706,157, filed on Dec. 6, 2019, now Pat. No. 11,282,051, which is a continuation-in-part of application No. 16/239,332, filed on Jan. 3, 2019, now Pat. No. 11,270,277.

(60) Provisional application No. 62/881,055, filed on Jul. 31, 2019, provisional application No. 62/798,362, filed on Jan. 29, 2019, provisional application No. 62/672,971, filed on May 17, 2018, provisional application No. 62/614,283, filed on Jan. 5, 2018.

(51) Int. Cl.
  *G06Q 20/18* (2012.01)
  *G06Q 20/32* (2012.01)
  *G06Q 20/40* (2012.01)

(58) Field of Classification Search
  USPC .......... 705/37, 39, 38, 36, 75, 26, 77, 14.57, 705/14.1; 719/328, 315; 717/108; 709/226, 201, 227; 715/704; 726/9, 6; 235/375, 380; 700/236
  See application file for complete search history.

(56) References Cited

U.S. PATENT DOCUMENTS

| | | | |
|---|---|---|---|
| 5,787,403 A | 7/1998 | Randle | |
| 5,899,982 A | 5/1999 | Randle | |
| 5,956,700 A | 9/1999 | Landry | |
| 6,173,272 B1 | 1/2001 | Thomas et al. | |
| 6,317,745 B1* | 11/2001 | Thomas | G06Q 20/14 705/40 |
| 6,341,272 B1 | 1/2002 | Randle | |
| 6,996,542 B1* | 2/2006 | Landry | G06Q 20/04 705/40 |
| 7,076,458 B2 | 7/2006 | Lawlor et al. | |
| 7,182,252 B1 | 2/2007 | Cooper et al. | |
| 7,200,551 B1 | 4/2007 | Senez | |
| 7,240,031 B1* | 7/2007 | Kight | G06Q 20/108 705/40 |
| 7,287,009 B1 | 10/2007 | Liebermann | |
| 7,370,014 B1* | 5/2008 | Vasavada | G06Q 20/04 705/40 |
| 7,395,241 B1 | 7/2008 | Cook et al. | |
| 7,676,431 B2 | 3/2010 | O'Leary et al. | |
| 7,813,983 B2* | 10/2010 | Wottowa | G06Q 40/00 705/36 R |
| 7,979,348 B2 | 7/2011 | Thomas et al. | |
| 8,005,754 B2 | 8/2011 | Mccoy et al. | |
| 8,042,733 B2* | 10/2011 | Smith | G06Q 40/02 235/379 |
| 8,190,521 B2 | 5/2012 | O'Leary et al. | |
| 8,380,622 B2 | 2/2013 | Bushman et al. | |
| 8,527,381 B2* | 9/2013 | Gerstner | G06Q 20/14 705/35 |
| 8,543,506 B2 | 9/2013 | Grandcolas et al. | |
| 8,554,671 B2 | 10/2013 | Ballout | |
| 8,725,632 B2* | 5/2014 | Tompkins | G07F 7/1008 705/39 |
| 8,732,044 B2* | 5/2014 | Lovelett | G06Q 20/10 705/38 |
| 9,520,033 B2 | 12/2016 | Freedman et al. | |
| 9,633,346 B2 | 4/2017 | Goodwin, III | |
| 9,652,758 B2 | 5/2017 | Zhou et al. | |
| 9,773,236 B2 | 9/2017 | Mohsenzadeh | |
| 9,842,322 B2 | 12/2017 | Johnston et al. | |
| 10,354,246 B1* | 7/2019 | Janiga | G07F 19/204 |
| 11,354,632 B1* | 6/2022 | Hill | H04L 67/52 |
| 11,429,976 B1* | 8/2022 | Jain | G06Q 20/405 |
| 2001/0032182 A1* | 10/2001 | Kumar | H04L 67/567 705/40 |
| 2003/0105711 A1* | 6/2003 | O'Neil | G06Q 40/00 705/39 |
| 2003/0191711 A1* | 10/2003 | Jamison | G06Q 20/40 705/40 |
| 2003/0216960 A1* | 11/2003 | Postrel | G06Q 30/0267 705/14.57 |
| 2006/0173779 A1* | 8/2006 | Bennett | G06Q 20/102 705/40 |
| 2006/0206425 A1* | 9/2006 | Sharma | G06Q 20/02 705/40 |
| 2007/0011104 A1* | 1/2007 | Leger | G06Q 20/085 705/77 |
| 2010/0114677 A1* | 5/2010 | Carlson | G06Q 40/02 705/14.1 |
| 2011/0238573 A1* | 9/2011 | Varadarajan | G06Q 20/1085 705/43 |
| 2011/0251956 A1* | 10/2011 | Cantley | G06Q 40/02 235/379 |
| 2013/0046687 A1 | 2/2013 | Simpson, Jr. | |
| 2013/0124411 A1* | 5/2013 | Kobres | G06Q 40/02 235/379 |
| 2013/0232064 A1* | 9/2013 | Bosch | G06Q 20/1085 235/379 |
| 2015/0199681 A1 | 7/2015 | Salgado et al. | |
| 2015/0324768 A1 | 11/2015 | Filter et al. | |
| 2016/0104140 A1* | 4/2016 | Harrow | G06Q 20/322 705/42 |
| 2017/0124544 A1 | 5/2017 | Recriwal et al. | |
| 2017/0161700 A1 | 6/2017 | Salgado et al. | |
| 2017/0364899 A1 | 12/2017 | Watson et al. | |
| 2018/0068281 A1 | 3/2018 | Johnston et al. | |
| 2018/0204193 A1 | 7/2018 | Cacheria et al. | |

OTHER PUBLICATIONS

A generative solution for ATM cash management; 2010 International Conference of Soft Computing and Pattern Recognition; R Armenise, C Birtolo, E Sangianantoni, L Troiano; Dec. 7, 2010. (Year: 2010).*

Boddupalli, P.; Al-Bin-Ali, F, Davies, N., Friday, A., Storz, 0., Wu, M., Payment support in ubiquitous computing environments; 2003 Proceedings Fifth IEEE Workshop on Mobile Computing Systems and Applications (pp. 110-120); Jan. 1, 2003 (Year: 2003).

Emergence of payment systems in the age of electronic commerce: The state of art; 2009 First Asian Himalayas International Conference on Internet (pp. 1-18); S. Singh; Nov. 3, 2009. (Year: 2009).

Liu Han-xia, Li Rong-jun; Responsibility of Net-bank in Electronic Payment; 2008 International Symposium on Electronic Commerce and Security (pp. 771-775); Aug. 3, 2008 (Year: 2008).

Payment support in ubiquitous computing environments; 2003 Proceedings Fifth IEEE Workshop on Mobile Computing Systems and Applications (pp. 110-120); Boddupalli, P.; Al-Bin-Ali, F, Davies, N., Friday, A., Storz, 0., Wu, M., Jan. 1, 2003. (Year: 2003).

Responsibility of Net-bank in Electronic Payment; 2008 International Symposium on Electronic Commerce and Security (pp. 771-775); Liu Han-xia, Li Rong-jun; Aug. 3, 2008. (Year: 2008).

S. Singh, Emergence of payment systems in the age of electronic commerce: The state of art; 2009 First Asian Himalayas International Conference on Internet (pp. 1-18); S. Singh; Nov. 1, 2009 (Year: 2009).

A secure mobile payment system using QR code; 2013 5th International Conference on Computer Science and Information Technology (pp. 111-114); Sana Nseir, Nael Hirzallah, Musbah Aqel; Mar. 27, 2013. (Year: 2013).

Design of Embedded Based Dual Identification ATM Card Security System; 2019 9th International Conference on Emerging Trends in Engineering and Technology—Signal and Information Processing (ICETET-SIP-19) (pp. 1-5); Priyanka Hemant Kale, K. K. Jajulwar; Nov. 1, 2019. (Year: 2019).

P2P-Paid: A Peer-to-Peer Wireless Payment System; Second IEEE International Workshop on Mobile Commerce and Services (pp. 102-111); J. Gao, K. Edunuru, J. Cai, S. Shim; Jan. 1, 2005. (Year: 2005).

(56) References Cited

OTHER PUBLICATIONS

Research on E-Payment Model; 2010 International Conference on E-Business and E-Government (pp. 339-341); Zhu Junxuan; May 7, 2010. (Year: 2010).
E-charging API: outsource charging to a payment service provider; IEEE Intelligent Network 2001 Workshop. IN 2001 Conference Record (Cat. No.01TH8566) (pp. 216-222); K. Luttge; May 6, 2001. (Year: 2001).
Authorization mechanisms for mobile commerce implementations in enhanced prepaid solutions; Bell Labs Technical Journal (vol. 8, Issue: 4, pp. 121-131); Yigang Cai, Jack Kozik, Helmut L. Raether, John B. Reid, Guy H. Starner, Sunil Thadani, Kumar V. Vemuri, Jan. 1, 2004. (Year: 2004).

* cited by examiner

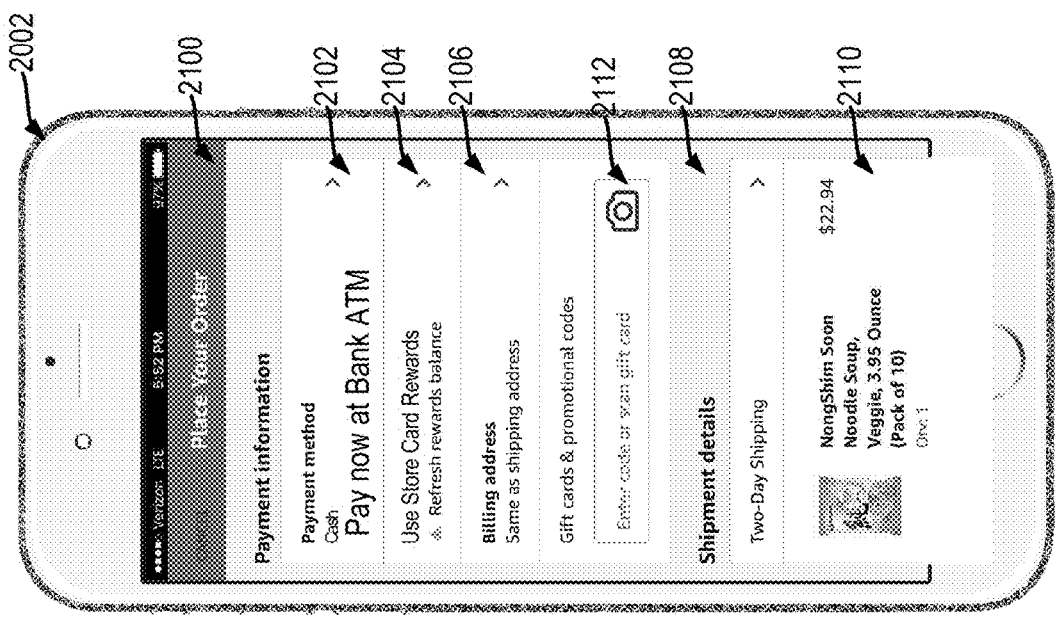
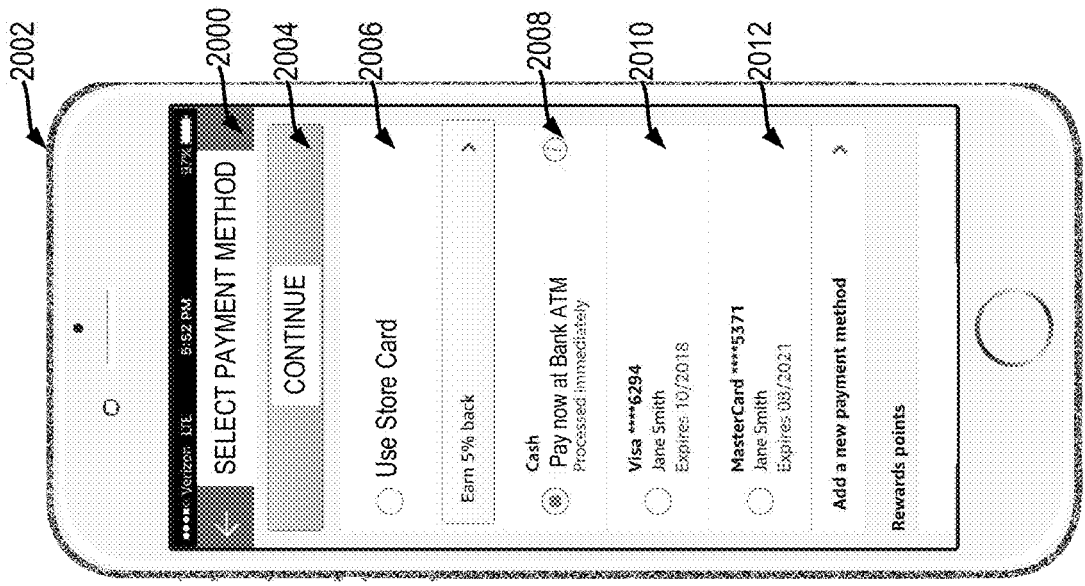
Figure 21
Figure 20

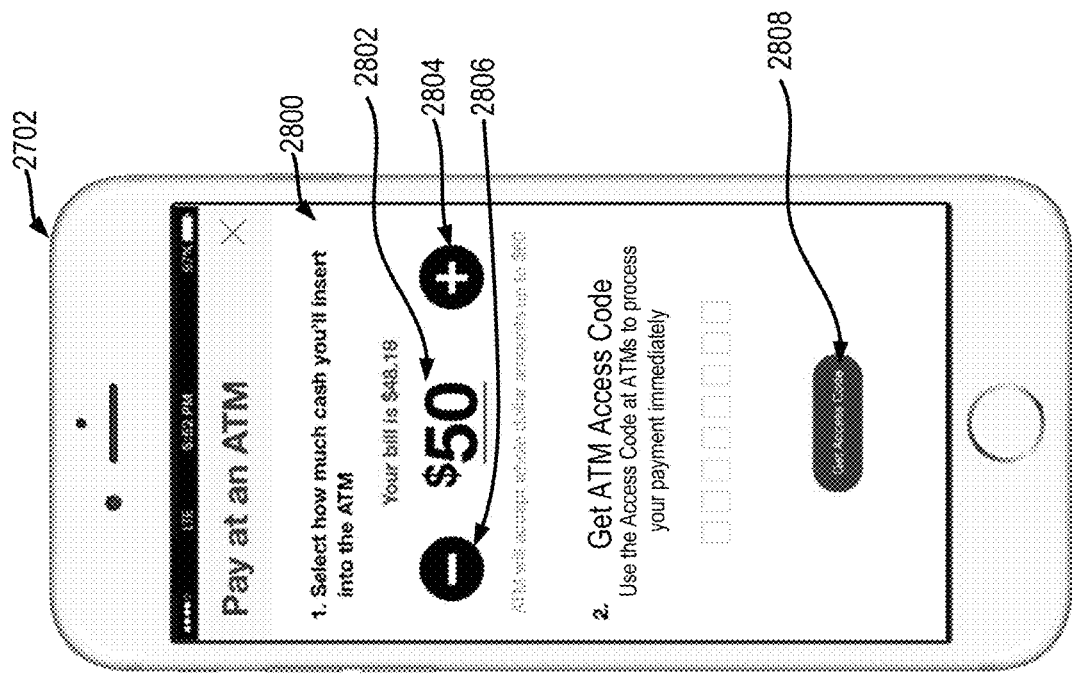
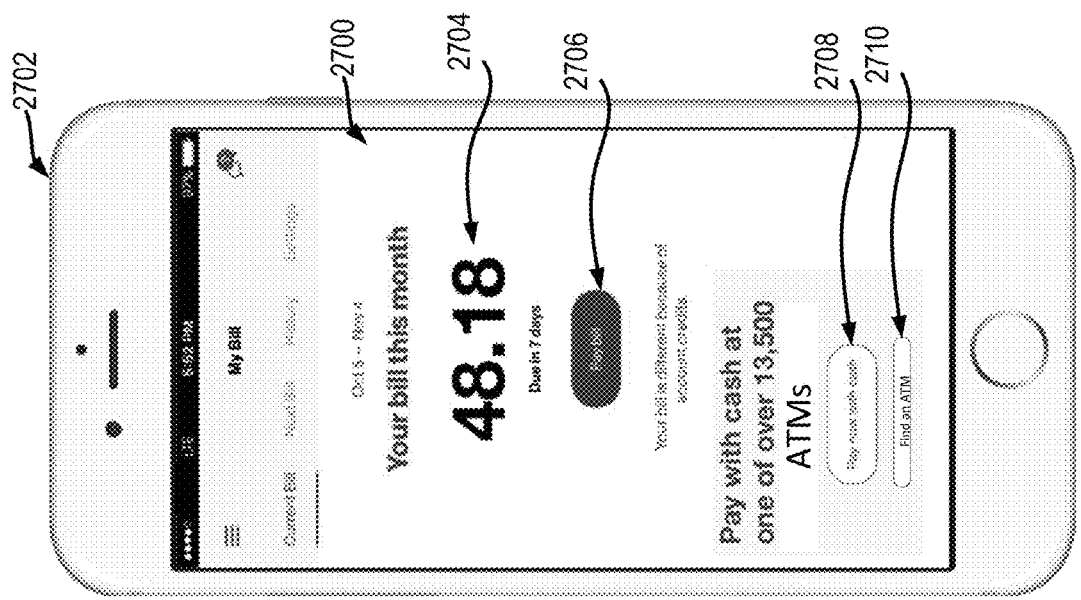
Figure 28
Figure 27

THIRD PARTY PRODUCTS AND SERVICES VIA ATM

CROSS-REFERENCE TO RELATED APPLICATIONS

This application is a continuation of U.S. patent application Ser. No. 17/689,918 filed Mar. 8, 2022, which is a continuation of U.S. patent application Ser. No. 16/943,675 filed Jul. 30, 2020, now U.S. Pat. No. 11,379,839, which claims the benefit of and priority to U.S. Provisional Patent Application No. 62/881,055 filed Jul. 31, 2019 and is a continuation-in-part of U.S. patent application Ser. No. 16/706,157 filed Dec. 6, 2019, now U.S. Pat. No. 11,282,051, which claims the benefit of and priority to U.S. Provisional Patent Application No. 62/798,362 filed Jan. 29, 2019 and is a continuation-in-part of U.S. patent application Ser. No. 16/239,332 filed Jan. 3, 2019, now U.S. Pat. No. 11,270,277, which claims the benefit of and priority to U.S. Provisional Patent Application No. 62/672,971 filed May 17, 2018 and to U.S. Provisional Patent Application No. 62/614,283 filed Jan. 5, 2018, each of which are incorporated herein by reference in their entirety.

BACKGROUND

Financial institutions provide various ways for customers to access account information and perform transactions, such as transaction machines, websites, and brick and mortar locations (e.g., retail bank branches). Transaction machines, such as automated teller machines (ATMs), may be accessed at various geographic locations, such as bank locations, convenience stores or other stores to facilitate the account holder's interaction with banking systems. Transaction machines accept transaction cards such as debit, credit or stored value cards that are often used by account holders to purchase items or services or to obtain funds.

SUMMARY

A first example embodiment relates to a method. The method includes receiving, at a transaction machine via a payment user interface, a request from a payor for a transaction to make a payment to a payee. The method further includes providing, by the transaction machine, a passcode user interface that allows receipt of a passcode unique to the request for the transaction. The method also includes receiving, by the transaction machine via the passcode user interface, the passcode. The method additionally includes determining, by the transaction machine, that the passcode is valid. The method further includes providing, by the transaction machine, responsive to determining that the passcode is valid, an amount user interface that requests an amount associated with the request for the transaction. The method also includes receiving, by the transaction machine via the amount user interface, the amount associated with the request for the transaction. The method additionally includes providing, by the transaction machine subsequent to receiving the amount, a payment user interface configured to accept a payment. The method further includes receiving, by the transaction machine via the payment user interface, a payment.

Another example embodiment relates to a system. The system includes a transaction machine associated with a provider computing system, the transaction machine comprising a one or more processors and computer readable storage medium storing instructions that when executed by one or more processors, cause the one or more processors to perform operations that include receive, via a payment user interface, a request from a payor for a transaction to make a payment to a payee. The operations further include provide a passcode user interface that allows receipt of a passcode unique to the request for the transaction. The operations also include receive, via the passcode user interface, the passcode. The operations additionally include determine that the passcode is valid. The operations further include provide, responsive to determining that the passcode is valid, an amount user interface that requests an amount associated with the request for the transaction. The operations also include receive, via the amount user interface, the amount associated with the request for the transaction. The operations further include provide, subsequent to the receipt of the amount, a payment user interface configured to accept a payment. The operations also include receive, via the payment user interface, a payment.

Another example embodiment relates to a system. The system includes a transaction machine associated with a provider computing system. The transaction machine includes one or more processors and computer readable storage medium storing instructions that when executed by one or more processors, cause the one or more processors to perform operations including providing a passcode user interface, an amount user interface, and a payment user interface in succession, wherein the passcode user interface allows receipt of a passcode unique to a request for a transaction to make a payment to a payee, the amount user interface requests an amount associated with the request for the transaction, and the payment user interface is configured to accept a payment; and receive, via the payment user interface, a payment to the payee.

BRIEF DESCRIPTION OF THE DRAWINGS

FIG. 20 shows a snapshot of an example user interface for selecting a payment method provided by a third party on a third party customer device.

FIG. 21 shows a snapshot of an example user interface for placing an order provided by a third party on the third party customer device.

FIG. 27 shows an example screenshot of a user interface shown on a customer device.

FIG. 28 shows an example screenshot of a user interface shown on a customer device allowing the user to enter a user selected amount for deposit.

DETAILED DESCRIPTION

Figure 1A:
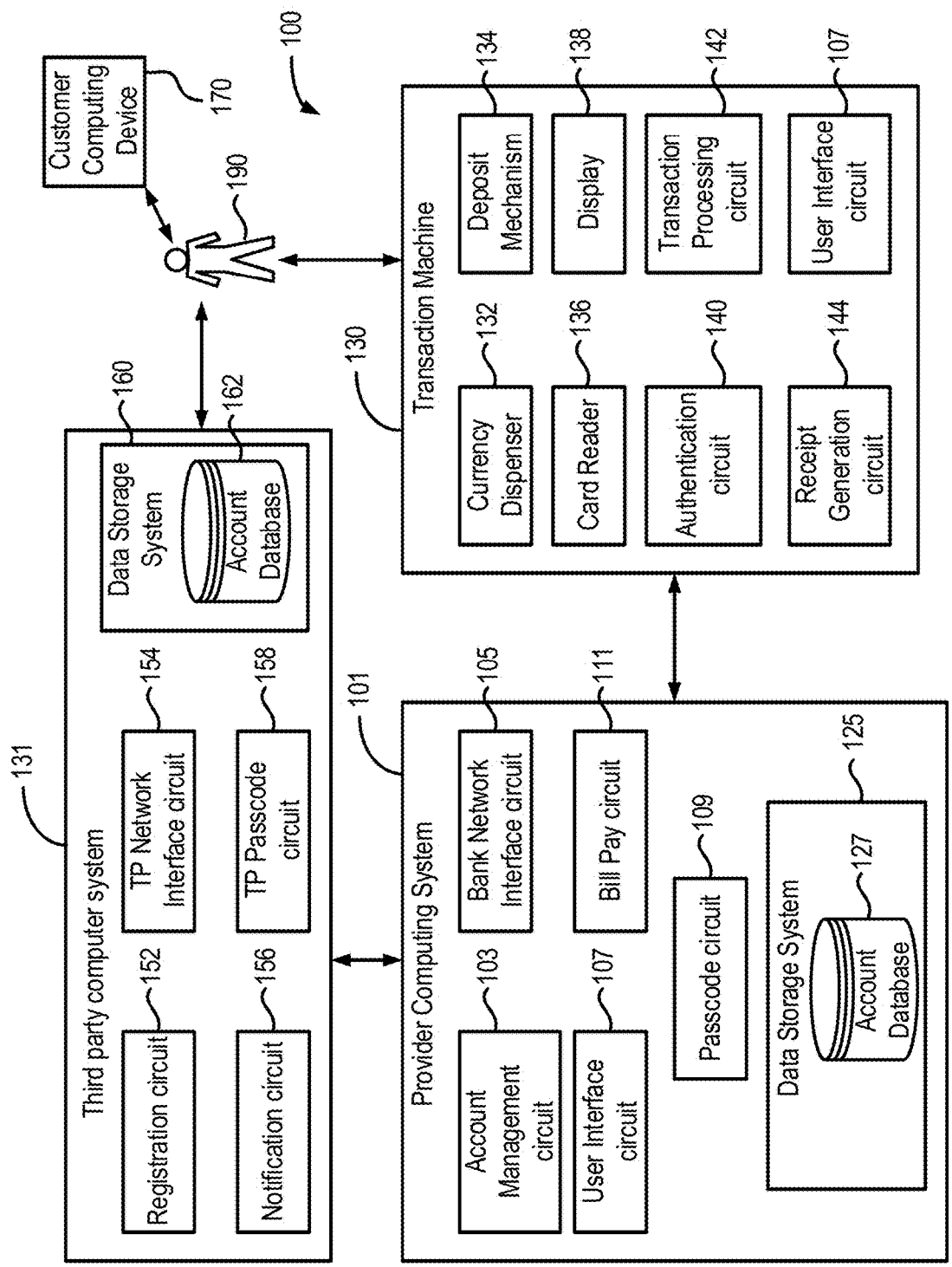
FIG. 1A is a schematic diagram of a system that includes a transaction machine that communicates with a provider computing system.

Transaction machines, such as, for example, automatic teller machines (ATMs) provide users with convenient and secure terminals for carrying out banking and other transactions. In some instances, the transaction machine may also have the capability to accept payments of third party products and services. For example, a payee, such as a merchant, having a bank account with Bank A can request the back to generate a passcode associated with a transaction that the payee expects a payor to make. The payor may approach a transaction machine associated with the Bank A and make the payment to the payee using the passcode.

As discussed below, the transaction machines can be configured to allow payors to make payments to payee accounts even if the payor may not hold an account with the bank or financial institution associated with the transaction machine. In one example, the transaction machine can accept payments by an individual to another individual. Such payments can be referred to as person-to-person (or "P2P") payments. In some such examples, the payee individual can hold an account with the financial institution associated with the transaction machine. Another individual—a payor—can carry out a transaction at the transaction machine to make a payment to the payee. The payment received by the transaction machine can be credited to the payee's account. In the context of the P2P payments at the transaction machine, the payor and the payee can be any pair of individuals wanting to undertake a transfer of payment. Utilizing the transaction machine allows the payor to make a payment in a manner that is convenient for the payor. For example, some payors may not have access to the Internet or may not possess devices that can enable access to the Internet. Without access to the Internet, such individuals may not be able to make online payments to the payee. In some other examples, even with access to the Internet, some individuals may be averse to online transactions due to the security risks know to be associated with online transaction in the form of hacking, phishing, etc. On the other hand, transaction machines are ubiquitous, and therefore may be more easily accessible to the payor. In addition, the transaction machine can provide a terminal of payment that can be relatively more secure than a user device such as a cellphone or a laptop connected to the Internet. The increased security provided by the transaction machine can lead an individual to feel more comfortable making a payment at the transaction machine instead of making a payment on the user device. The transaction machine can also provide the payor multiple payment modes. For example, the transaction machine can be configured to accept various payment modes such as cash, credit cards, cryptocurrency, etc. Thus a payor, who otherwise would have to hold a bank account that allows online payments (which in some instances may involve additional costs), can instead make a payment in a mode of his or her choosing by merely walking up to the transaction machine. One or more examples of this approach are discussed below in relation to FIGS. 38-40.

Referring to FIG. 1A, a system 100 is shown according to an example embodiment. The system 100 may include a provider computing system 101, a third party computer system 131, one or more transaction machines 130, such as automated teller machines (ATMs), and one or more customer computing devices 170. The system 100 may be accessed by a third party customer 190 who seeks to perform a financial transaction, such as, for example, paying bills for the third party at the one or more transaction machines 130.

In an example embodiment, the provider computing system 101 may be provided or controlled by a bank or other financial institution. The provider computing system 101 may provide services to users, customers, or account holders of the financial institution. The provider computing system 101 also provides services to users who do not hold an account with the institution. These services can be provided to the users through the transaction machine 130. For example, as shown in FIG. 1A, an account holder or a third party customer 190 communicates with the provider computing system 101 through the transaction machine 130. In practice, the provider computing system 101 may include server computing systems, for example, comprising one or more networked computer servers having a processor and non-transitory machine readable media. The logic or logics described herein may therefore be implemented as program logic that is stored on the machine-readable media and that, when executed by the processor, causes the processor to perform the operations described.

The provider computing system 101 may further include, among other systems, account management circuit 103, provider network interface circuit 105, provider user interface circuit 107, bill pay circuit 111, provider passcode circuit 109, and provider data storage system 125. The account management circuit 103 may perform various tasks in connection registered customers of one or more third parties, such as the third party associated with the third party computer system 131. Account management circuit 103 may receive customer data from the third party computer system 131, where the customer data can include one or more of customer name, customer address, customer date of birth, third party unique customer ID, and other customer related information. The account management circuit 103 may store the customer data received from the third party computer system in the provider data storage system 125. The account management circuit 103 may also maintain a log of all transactions that occurred in the past associated with one or more customer data and store data related to the transactions in a provider data storage system 125.

The provider network interface circuit 105 may be used to connect the provider computing system 101 to communicate with other systems such as the transaction machine 130 and the third party computer system 131. An embodiment of the provider network interface circuit 105 may be configured to communicate with the transaction machine 130 over a proprietary encrypted network. Another embodiment of the provider network interface circuit 105 may be configured to communicate with the transaction machine 130 over a public encrypted network. The provider network interface circuit 105 may also comprise logic that is configured to provide an interface for other types of devices, including mobile devices such as cell phones, smart phones, mobile slate, or tablets. Similarly, the provider network interface circuit 105 may be configured to communicate with the third party computer system 131 over a proprietary or public encrypted network.

The provider user interface circuit 107 may generate customized sequences of menus and menu options. As previously indicated, the provider computing system 101 and the transaction machine 130 may cooperate to provide a user interface at the transaction machine 130. As indicated in FIG. 1A, the user interface circuit 107 includes program logic located at the provider computing system 101, at the transaction machine 130, or at both the provider computing system 101 and the transaction machine 130. That is, the operations described herein as being performed by the user interface circuit 107 may be performed either at the provider computing system 101, at the transaction machine 130, or at both the provider computing system 101 and the transaction machine 130. The user interface circuit 107 generates a graphical user interface for presentation to the third party customer 190 at the transaction machine 130 via a display 138. The user interface circuit 107 may receive information or adjust the sequence of user interfaces on the display 138 according to data provided by the user interface circuit 107. Other configurations are also possible, some of which are described below.

The bill pay circuit 111 may be configured to receive bill payment information from the transaction machine 130. For example, the bill pay circuit 111 may receive verification queries from the transaction machine 130 in responsive to the third party customer 190 initiating a bill payment transaction at the transaction machine 130. The bill pay circuit 111 may also send verification results to the transaction machine 130 in response to receiving the verification queries. The bill pay circuit 111 may also receive notifications of payment or deposits made by the third party customer 190 associated with a customer account. The bill pay circuit 111 may, in response, send a notification to the third party computer system 131 of the bill payment associated with the customer account.

Provider passcode circuit 109 can be configured to generate passcodes, which may be one time or multiple use types. The provider passcode circuit 109 may generate the passcode in response to each request for a new passcode received from the third party computer system 131. The passcode can be a token that is generated based on a random number. In some other embodiments, the provider passcode circuit 109 can include an encryption circuit which can output a passcode based on a random number, third party data, customer data, or a combination thereof. In some embodiments, the provider passcode circuit 109 can store the generated passcode in the provider data storage system 125 in association with customer data. For example, the request for the generation of the passcode received from the third party computer system 131 can include a customer identifier. The provider passcode circuit 109 can store the generated passcode in the provider data storage system 125 in association with the received customer identifier. The provider passcode circuit 109, or the bill pay circuit 111 can access the provider data storage system 125 in response to a verification request received from the transaction machine 130. That is, the provider passcode circuit 109 or the bill pay circuit 111 can access the passcode associated with the customer identifier received in the verification request, and compare the passcode retrieved from the provider data storage system 125 with the passcode received with the verification request to verify if the passcodes match.

The provider data storage system 125 may include a provider account database 127. The provider account database 127 can be structured according to various database types, such as, relational, hierarchical, network, flat or object relational. The provider account database 127 may be configured to store account balances and a log of each transaction processed by the account management circuit 103. The provider account database 127 may be configured to store other activity profile information such as account preferences the user has specified, whether the user has previously chained transactions, whether the user has lost bank cards, and so on. In addition to storing data on accounts associated with the bank, the provider account database 127 can store third party customer data, which can include customer name, customer address, customer date of birth, third party unique customer ID, and other customer related information, received from the third party computer system 131. The provider account database 127 may also include any passcodes generated in association with a third party customer.

The transaction machine 130 may, for example, be an automated teller machine, a point of sale device, or other device. For example, the transaction machine 130 may include a currency dispenser 132, deposit mechanism 134, card reader 136, display 138, authentication circuit 140, transaction processing circuit 142, and receipt generation circuit 144. Other hardware may also be included, such as a keypad, a microphone, a camera, or buttons for receiving user inputs. The transaction machine 130 can serve as a terminal for a user, such as a user that has an account with the bank or financial institution associated with the provider computing system 101, to carry out financial transactions in conjunction with the user's account at the bank. Such transactions can include, for example, withdrawals, deposits, transfer, and other financial transactions. In addition to serving as a terminal for financial transactions associated with the bank, the transaction machine 130 also can serve as a terminal for carrying out bill pay transactions associated with a third party.

The currency dispenser 132 may dispense currency notes ("cash") or other forms of currency to an account holder from their financial institution accounts. The currency dispenser 132 may be configured to dispense currency in various denominations, as specified by the account holder. The deposit mechanism 134 may be configured to accept deposits of currency, such as envelope or envelope-free deposits of cash and/or checks.

The card reader 136 may be configured to read information from a transaction card. The transaction card may include many different types of cards, for example, a credit card, debit card, check card, ATM card, stored value card, or the like. The card reader 136 may be configured to scan information from a magnetic stripe ("magstripe") of a transaction card. Some transaction machines may require the user to "dip" or "swipe" their transaction card, while other transaction machines may require the user to insert their transaction card, in which case the user's card may be retained by the machine for the duration of the session. Alternatively, the card reader 136 may be configured to communicate with the transaction card via near field communications (NFC). While performing the read operation, the card reader 136 may be configured to read the account information and the PIN associated with the card and the account.

The display 138 may be configured to display graphics such as menus, instructions, background photos (e.g., advertisements, etc.), logos, and so on. In one embodiment, the display 138 is a touch screen display that is capable of detecting user touches, e.g., to make menu selections. The display 138 allows the account holder or a third party customer 190 to interact with the transaction machine 130 in order to process transactions. The transactions may include withdrawing funds, purchasing one or more goods or services, transferring funds from one account to another account, paying a bill or mortgage and so on. As will be discussed further below, the display 138 may be used to display various custom sequences of user interfaces to the account holder 190.

The authentication circuit 140 may be configured to authenticate information received by the transaction machine 130 to approve or reject a transaction. The information authentication circuit 140 may approve or deny authentication for transaction data received by the transaction machine 130. The authentication circuit 140 authenticates a user as being a valid account holder associated with the transaction card and the corresponding account at the bank or financial institution.

The transaction processing circuit 142 processes each transaction requested by the account holder or a third party customer 190. For example, the transaction processing circuit 124 may cooperate with the account management circuit 103 of the provider computing system 101 to ensure that transactions are properly debited/credit to the account held by the account holder 190. The receipt generation circuit 144 generates a receipt for each transaction.

The third party computer system 131 may be provided or controlled by a third party merchant, seller, or service provider. The third party computer system 131 may provide services to third party customers 190. For example, the third party computer system 131 may provide customer registration services to the third party customer 190 once the third party customer 190 has purchased products or services from the third party. The third party computer system 131 also can facilitate bill payment at a transaction machine 130 associated with a bank. In particular, the third party computer system 131 can communicate with the provider computing system 101 to exchange data that can be used to carry out bill payments by the third party customer 190 at the transaction machine 130.

The third party computer system 131 can include a registration circuit 152, a third party network interface circuit 154, a notification circuit 156, a third party passcode circuit 158, and a third party data storage system 160. The registration circuit 152 can facilitate the registration of a third party customer 190 at the provider computing system 101. For example, a third party customer 190 can communicate with the third party computer system 131 to register a customer account with the third party computer system 131. The registration circuit 152 can receive with the request customer data such as, for example customer name, customer date of birth, customer address, customer email address, customer phone number, and other information related to the customer. The registration circuit 152 stores the third party customer 190 information in a data storage system or a database in association with a unique identifier such as a customer ID. In addition the registration circuit 152 can communicate the customer information and/or the unique identifier to the provider computing system 101 along with a request to register the customer, or create an account for the user, as a customer for the third party.

The third party network interface circuit 154 may be used to connect the provider computing system 101 to other systems, such as the provider computing system 101, over proprietary or public encrypted networks. In some embodiments, the third party network interface circuit 154 may also comprise circuit that is configured to provide in interface for other types of devices, including mobile devices such as cell phones, smart phones, mobile slate or tablets.

The third party passcode circuit 158, responsive to a third party registration request, can generate and send a passcode generation request to the provider computing system 101. The third party passcode circuit 158 also can receive the passcode generated by the provider computing system 101. The third party passcode circuit 158 or the registration circuit 152 can provide the third party customer 190 with the received passcode (e.g., via the customer computing device 170).

The notification circuit 156 generates and sends bill pay notifications to the third party customer 190. For example, the notification circuit 156 generates notifications indicating that a bill pay transaction was completed successfully. In some embodiments, the third party passcode circuit 158 or the registration circuit 152 provides the bill pay transaction complete notification to the third party customer 190 (e.g., via the customer computing device 170) only after receiving a notification from the provider computing system 101 that a bill payment was successfully received from the third party customer 190.

The third party data storage system 160 can include a third party account database 162. The third party account database 162 can be structured according to various database types, such as, relational, hierarchical, network, flat or object relational. The third party account database 162 can be configured to store account information associated with third party customers. For example, the account information can include customer name, customer date of birth, customer address, customer email address, customer phone number, a unique customer ID, and other information related to the customer. The account information may also include the current account balance, payment due date, and a list of banks where the third party customer may potentially pay the bills. The list of banks can include the bank associated with the provider computing system 101.

Figure 1B:
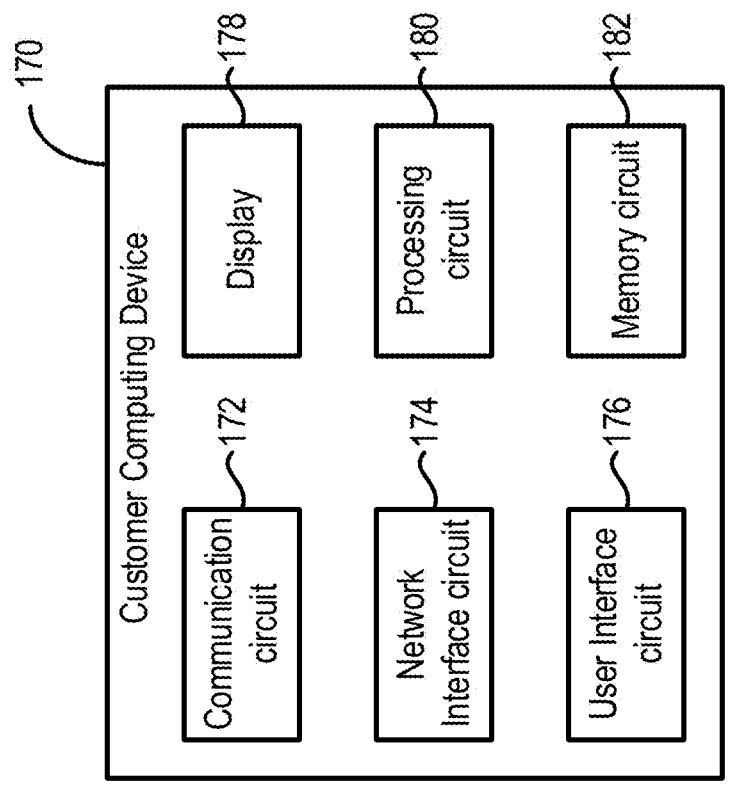
FIG. 1B shows a block diagram of an example customer computing device.

The system 100 can also include a customer computing device 170. The customer computing device 170 can be accessed by the third party customer 190 to communicate and carry out transactions with other components of the system 100, such as the third party computer system 131, and the provider computing system 101. FIG. 1B shows a block diagram of an example customer computing device 170. The customer computing device 170 can include a communication circuit 172, a network interface circuit 174, a user interface circuit 176, a display 178, a processing circuit 180, and a memory circuit 182. The communication circuit 172 can be configured to provide communication capability to the customer computing device 170. For example, the communication circuit 172 can include analog and/or digital components that can allow the customer computing device 172 to communicate over wireless communication channels such as 2G, 3G, 4G, LTE, etc. The network interface circuit 174 may be used to connect the customer computing device 170 to other systems such as the provider computing system 101, the third party computer system 131 and the transaction machine 130 over proprietary or public encrypted networks. The user interface circuit 176 may generate customized sequences of menus or menu options for presentation to the third party customer 190. The third party computer system 131 and the customer computing device 170 can cooperate to provide a user interface at the customer computing device 170. For example, the third party computer system 131 may provide applications or programs to the customer computing device 170 that when executed on the customer computing device 170 can provide appropriate user interfaces to allow the third party customer 190 to carry out transactions. Some examples of user interfaces provided at the customer computing device 170 are discussed below in relation to FIGS. 3 and 4. The processing circuit 180 and the memory circuit 182 can provide computing capabilities to the customer computing device 170 and can aid in executing instructions or programs for the operation of the customer computing device 170. In one or more embodiments, the customer computing device 170 can include one or more of portable electronic devices such as cellphones, tablets, laptops, smart watches, or other computing devices such as desktops.

Figure 2:
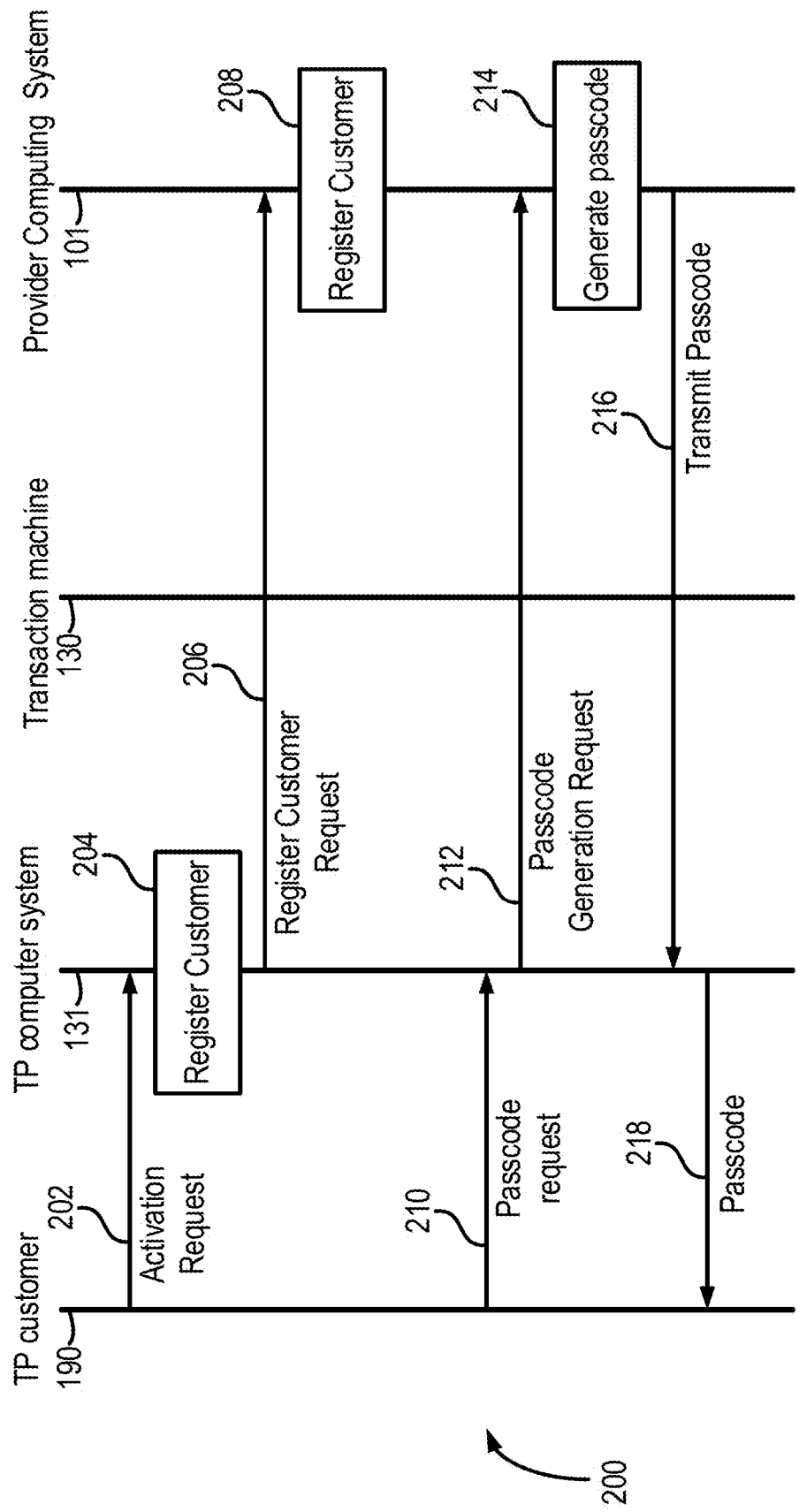
FIG. 2 shows a process flow for a third party customer registration and passcode generation.

FIG. 2 shows a process flow 200 for a third party customer registration and passcode generation. In particular FIG. 2 shows interactions between the third party customer 190, the third party computer system 131, the transaction machine 130, and the provider computing system 101 during a third party customer 190 registration at the provider computing system 101. The process flow 200 includes the third party computer system 131 receiving an activation request 202 from the third party customer 190. The activation request 202 may be received from a new third party customer 190 who does not previously have an account or service with the third party. In one example, the third party customer 190 may purchase a cellular phone plan from a third party, and may register with the third party as a customer. In registering with the third party, the third party customer 190 may provide the third party computer system 131 with third party customer 190 information, such as, for example, customer name, customer date of birth, customer address, customer email address, customer phone number, and other information related to the third party customer 190.

The third party computer system 131, responsive to receiving the activation request 202 from the third party customer 190, registers (204) the third party customer 190 at the third party computer system 131. In particular, the registration circuit 152 creates an account associated with the third party customer 190 in the third party account database 162. The registration circuit 152 creates a unique third party customer ID associated with the third party customer 190, and stores the customer information in the third party account database 162 indexed to the unique third party customer ID. The registration circuit 152 also stores account information associated with the third party customer 190 in the third party account database 162. For example, the registration circuit 152 stores the current account balance, payment due date, and a list of banks where the third party customer may potentially pay the bills. In one or more embodiments, the list of banks can include those banks that are near the user and that allow third party bill payment transactions. In one or more embodiments, the registration circuit 152 may also verify the third party customer 190 prior to registration. For example, if the third party customer 190 purchases cellphone service from a store (online or brick-and-mortar), the registration circuit 152 may receive the purchase information. When the third party customer 190 sends the activation request 202, the registration circuit 152 may compare the purchase information with the customer information provided with the activation request 202. If at least part of the information matches, the registration circuit 152 can determine that the third party customer 190 is the same customer that purchased the cellphone service at the store, and is verified. If there is no match, the registration circuit 152 may determine that the third party customer is not verified, and determine not to proceed with registering the third party customer 190.

The third party computer system 131 also can send a register customer request 206 to the provider computing system 101. In particular, the registration circuit 152 can generate the register customer request 206 and send the request 206 to the provider computing system 101 via the third party network interface circuit 154. The register customer request 206 can include the unique customer ID associated with the third party customer 190, and may also include additional customer information such as customer name, customer date of birth, customer address, customer email address, customer phone number, or other customer information.

The account management circuit 103 at the provider computing system 101 receives the register customer request 206 from the third party computer system 131. Responsive to the receipt of the register customer request 206, the account management circuit 103 registers the customer (208) at the provider account database 127. In particular, the account management circuit 103 creates a record in the provider account database 127 associated with the customer ID, or some other identifier based on the customer ID. The account management circuit 103 stores in the record the customer ID and the customer information received with the register customer request 206. By storing the customer ID and the associated customer information, the account management circuit 103 registers the customer at the provider computing system 101. In one or more embodiments, the account management circuit 103 may send a message to the third party computer system 131 indicating that the third party customer 190 associated with the register customer request 206 was successfully registered at the provider computing system 101. In one or more embodiments, the registration circuit 152 updates the record associated with the third party customer 190 in the third party account database 162 to indicate that the third party customer 190 has been registered with the bank associate with the provider computing system 101.

In one or more embodiments, the third party computer system 131 initiates the registration process discussed above in relation to the provider computing system 101, with computer systems of more than one bank that can provide third party bill payment services. In some such instances, the registration circuit 152 updates the record associated with the third party customer 190 in the third party account database 162 to indicate a list of banks at which the third party customer 190 has been successfully registered.

Once the third party computer system 131 and the provider computing system 101 register the third party customer 190, the third party computer system 131 may wait for a request for a passcode from the third party customer 190. For example, the third party passcode circuit 158 may receive a passcode generation request 210 from the third party customer 190. In some embodiments, the passcode generation request 210 can be generated by the third party customer 190 over a webpage hosted by the third party. In some embodiments, the passcode generation request 210 can be received from a text message send by the third party customer 190. In some other embodiments, the passcode generation request 210 may be received from a third party application running on a computing device.

Figure 3:
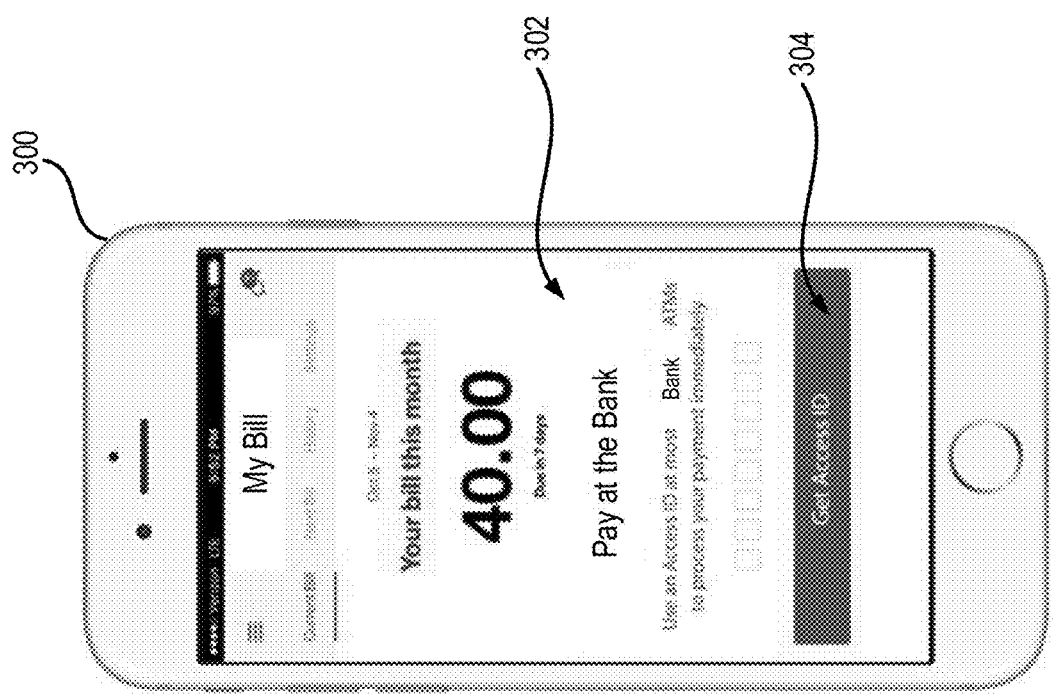
FIG. 3 shows a screenshot of an example computing device displaying a user interface.

FIG. 3 shows a screenshot of an example computing device 300 displaying a user interface 302. In particular, the user interface 302 can be used by the third party customer 190 to request a passcode. In one or more embodiments, third party computer system 131 can provide the user interface 302 to the computing device 300. The user interface 302 can allow display information related to the account associated with the third party customer 190. For example, the user interface 302 can display the current amount due, the due date, as well as an option to pay the bill at ATM belonging to a bank. In particular, the user interface can provide an option get a passcode or access ID. Once the third party customer 190 presses the "Get Access ID" button, the computing device 300 can send a passcode request to the third party computer system 131.

In one or more embodiments, the passcode generation request 210 (FIG. 2) received by the third party passcode circuit 158, can include customer information, such as, an account number, customer name, customer phone number, customer ID, etc. The third party passcode circuit 158 can generate and send a passcode generation request 212 to the provider computing system 101. The passcode generation request 212 can include a unique identifier associated with the third party customer 190.

The passcode generation request 212 can be received by the provider passcode circuit 109 (FIG. 1A) at the provider computing system 101 (FIG. 1A). The provider passcode circuit 109 can generate a passcode (214). In one or more embodiments, the provider passcode circuit 109 can include a pseudo-random number generator for generating a random number. In one or more embodiments, the random number can be of a substantially long length, such as, for example, between about 32 bits to about 256 bits. The provider passcode circuit 109 can use the random number as the passcode. In one or more embodiments, the provider passcode circuit 109 can include an encryption engine to generate the passcode based on an encryption algorithm, such as for example AES, a hash algorithm, or other encryption algorithms. In one or more embodiments, the encryption engine may use, in part, customer information received with the passcode generation request 212 to generate the passcode. In one or more embodiments, the provider passcode circuit 109 may transform the random number or the output of the encryption engine into another number to use as a passcode. For example, the provider passcode circuit 109 can transform binary numbers into decimal numbers, alphabets, or alpha-numeric characters.

In one or more embodiments, the provider passcode circuit 109 can assign a lifetime to the generated passcode. For example, the provider passcode circuit 109 can assign a lifetime of about 1 minute to a few hours or to a few days. The lifetime of the passcode can define the amount of time after generation can the passcode be valid. After the lifetime of the passcode has elapsed, the passcode, when presented to the provider passcode circuit 109 by the third party customer 190, may be declined.

In one or more embodiments, the provider passcode circuit 109 may store, in the provider account database 127 (FIG. 1A) the generated passcode. As discussed above, during third party customer registration process at the provider computing system 101, the account management circuit 103 can create a record associated with the registered third party customer 190. The provider passcode circuit 109 can use the customer information received with the passcode generation request 212 to access the record associated with the third party customer 190, and store the generated passcode.

The provider passcode circuit 109 can transmit the generated passcode (216) to the third party computer system 131. The provider passcode circuit 109 can send the passcode as well corresponding customer information to the third party computer system 131. For example, the provider passcode circuit 109 may include the customer ID received with the passcode generation request 212. The provider passcode circuit 109 may also send the lifetime associated with the passcode to the third party computer system 131.

Figure 4:
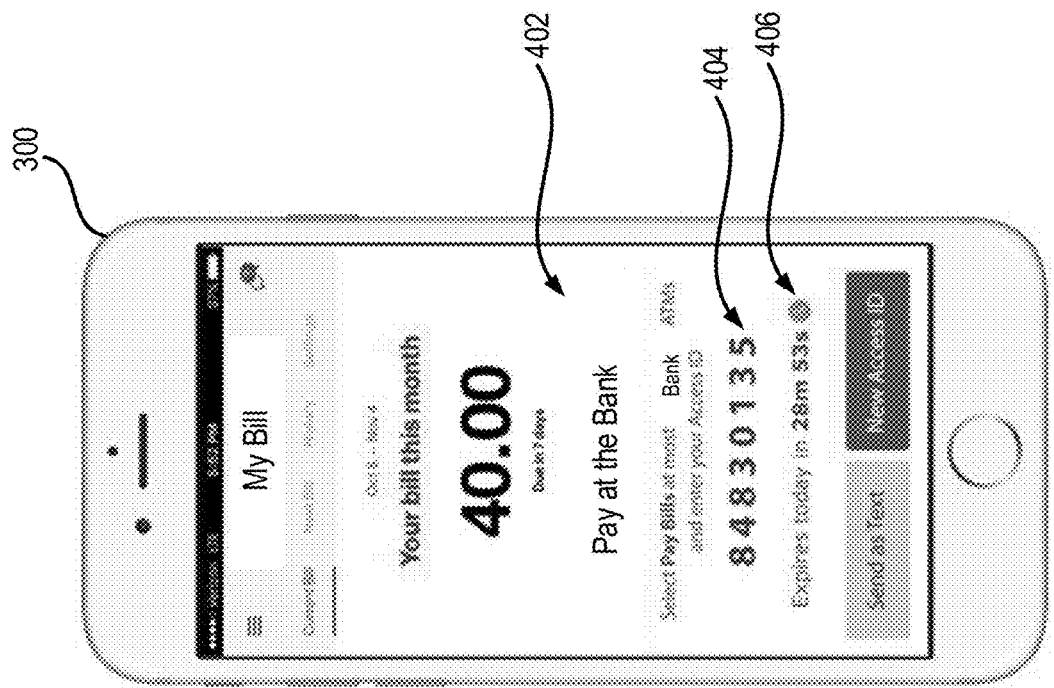
FIG. 4 shows a screen shot of the example computing device displaying a passcode.

The third party passcode circuit 158 (FIG. 1A) can receive the passcode sent by the provider passcode circuit 109. The third party passcode circuit 158 may perform two operations upon receiving the passcode. One, the third party passcode circuit 158 may store the passcode in the third party account database 162 (FIG. 1A) in the record associated with the third party customer 190. In addition, the third party passcode circuit 158 can transmit the passcode (218) to the third party customer 190. In some embodiments, the third party passcode circuit 158 can transmit the passcode to the third party customer device, such as the device 300 shown in FIG. 3. For example, FIG. 4 shows a screen shot of the example computing device 300 displaying a passcode. In particular, the screenshot shows a user interface 402 displaying a passcode or Access ID 404 received from the third party computer system 131. The user interface 402 may also offer the user the options of sending the passcode as a text message or requesting a new passcode. The third party passcode circuit 158 may also send the lifetime associated with the passcode, which the user interface 402 can display as a message 406. The third party passcode circuit 158, can alternatively, send the passcode via email to an email address associated with the third party customer 190.

Figure 5:
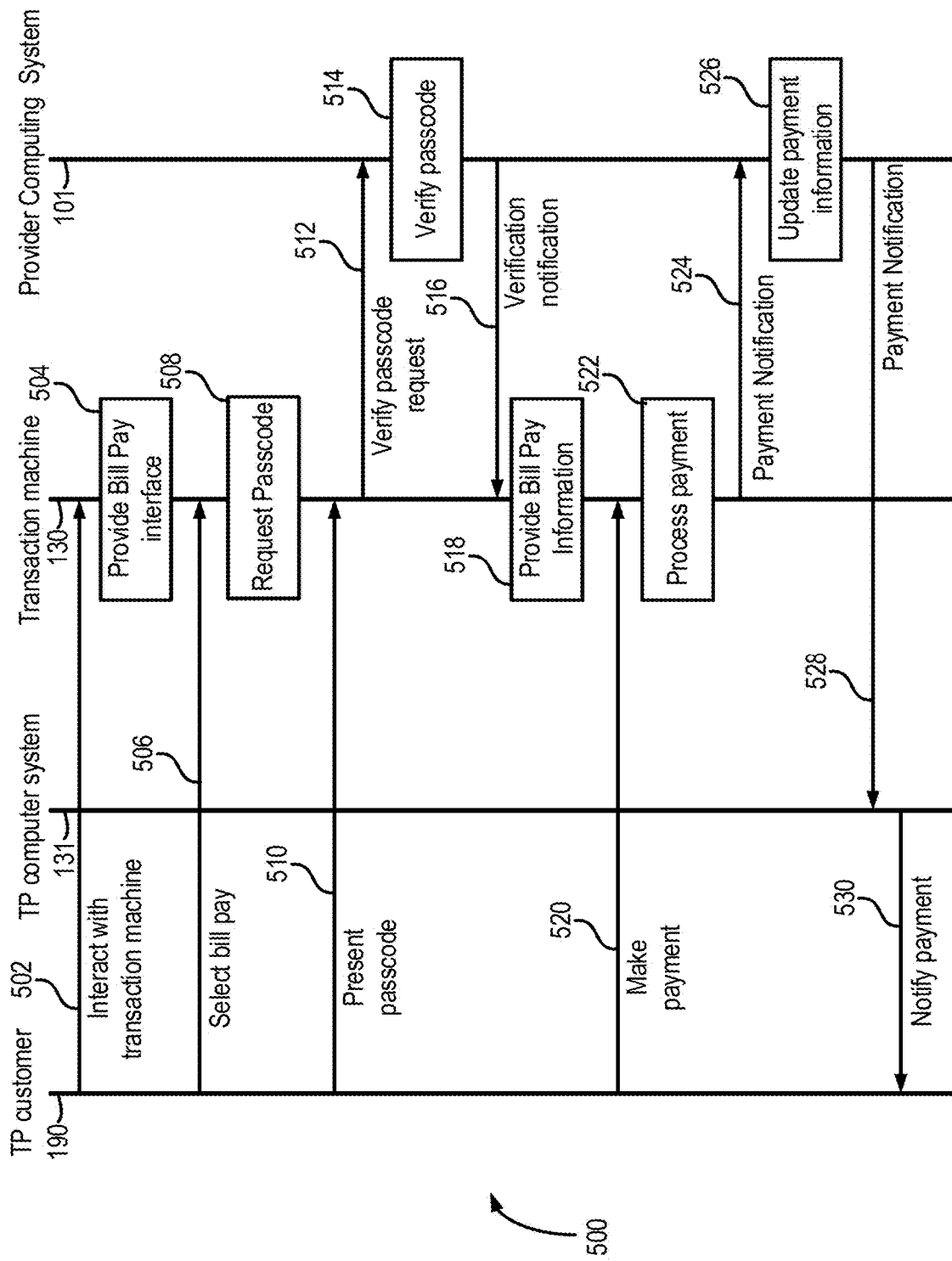
FIG. 5 shows a process flow for an example bill pay process.

FIG. 5 shows a process flow 500 for an example bill pay process. In particular, the process flow 500 depicts a bill pay process for a third party. As discussed above in relation to FIG. 2, the third party customer 190 possesses a passcode generated by the provider passcode circuit 109. The third party customer 190 can walk or drive to the transaction machine 130 associated with the bank that can accept bill payments for the third party, and interact (502) with the transaction machine 130 to initiate a bill pay transaction. The transaction machine 130 can provide a bill pay interface (504) to the third party customer 190 to enable initiation of the bill pay transaction.

Figure 6:
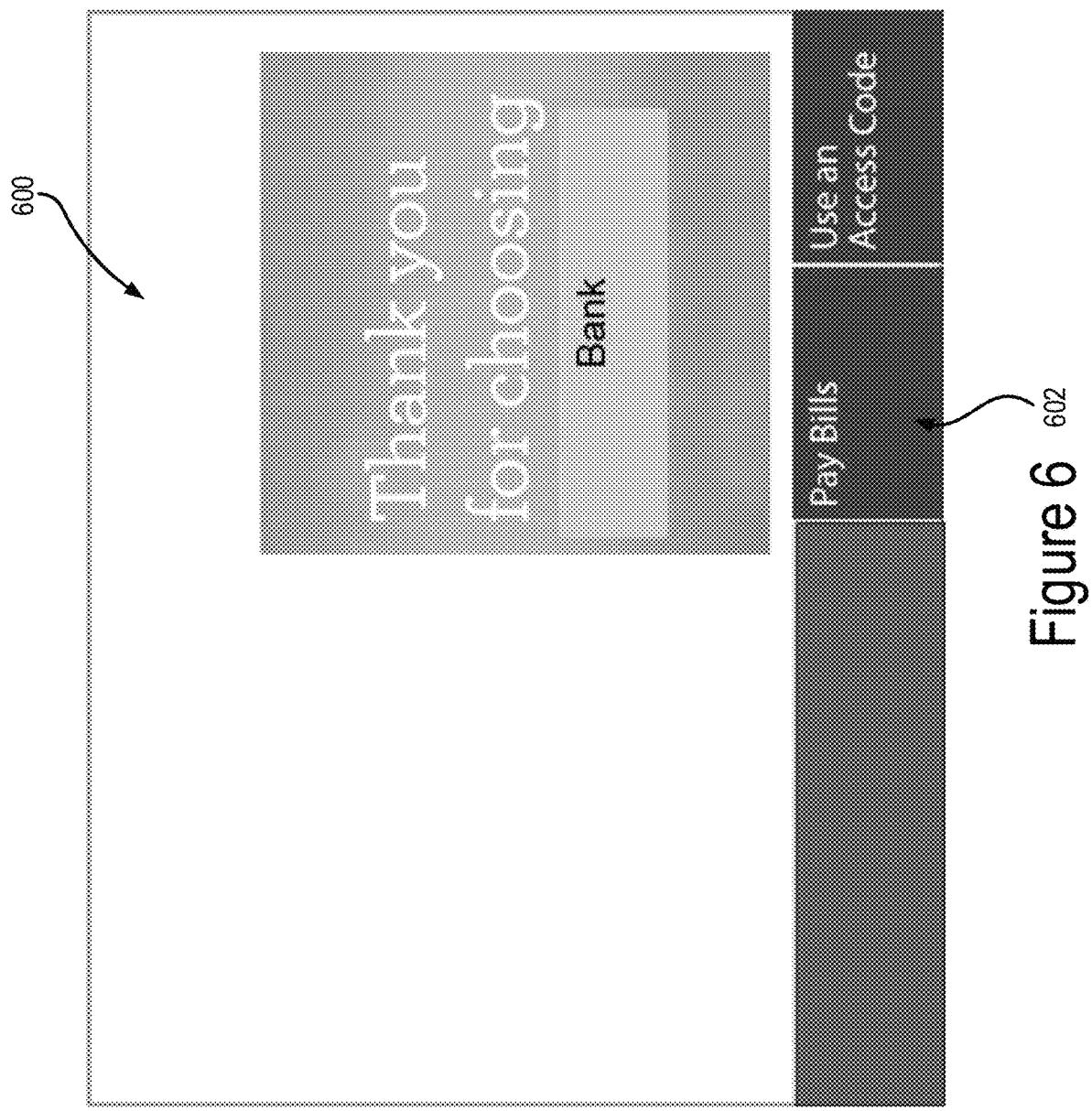
FIG. 6 shows a screenshot of an example user interface that can be displayed on a display of the transaction machine.

FIG. 6 shows a screenshot of an example user interface 600 that can be displayed on a display 138 (FIG. 1A) of the transaction machine 130 (FIG. 1A). The user interface 600 can include a selectable button 602 that can be selected by the third party customer 190 to pay the bill.

Referring again to FIG. 5, the third party customer 190 can select bill pay (506) on the user interface provided by the transaction machine 130. For example, the third party customer 190 can select the button 602 (FIG. 6) labeled "Bill pay" displayed on the display 138 of the transaction machine 130. Responsive to the third party customer 190 initiating the bill pay transaction, the transaction machine 130 can request (508) the third party customer 190 to provide the passcode.

Figure 7:
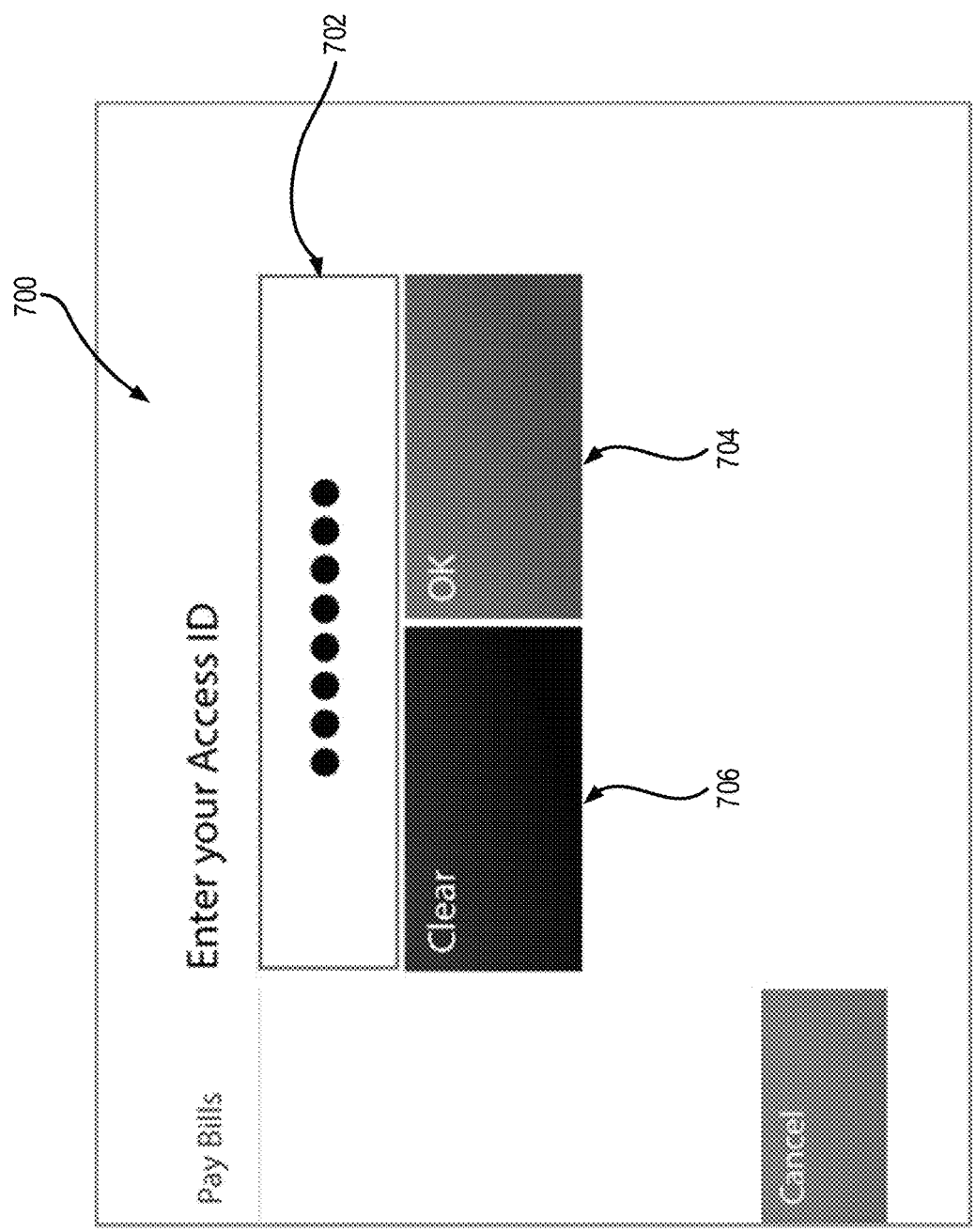
FIG. 7 shows a screenshot of an example user interface to allow passcode entry.

FIG. 7 shows a screenshot of an example user interface 700 to allow passcode entry. The user interface 700, for example, can be displayed on a display 138 (FIG. 1A) of the transaction machine 130 (FIG. 1A). The user interface 700 can include a passcode field 702 where the user can enter the passcode, a selectable OK button 704 to allow the third party customer 190 to instruct the transaction machine 130 to accept the entered passcode, and a CLEAR button 706, which can allow the user to clear the contents of the passcode field 702. While not shown in FIG. 7, the transaction machine 130 can include a keypad, which the third party customer 190 can use to enter the passcode in the passcode field 702.

Referring again to FIG. 5, the third party customer 190 can present (510) the passcode to the transaction machine 130. For example, the third party customer 190 can enter the passcode 404 shown in FIG. 4 in the passcode field 702 on the user interface 700 shown in FIG. 7 and press the OK button 704. In response to receiving the passcode from the third party customer 190, the transaction machine 130 can send a verification request 512 to the provider computing system 101. The verification request 512 can include the passcode provided by the third party customer 190.

In response to receiving the verification request 512 from the transaction machine 130, the bill pay circuit 111 or the account management circuit 103 can access the provider account database 127 to verify (514) if the passcode presented by transaction machine 130 matches a passcode stored in a record associated with a third party customer. If a match is found, the bill pay circuit 111 or the account management circuit 103 can send a verification notification (516) to the transaction machine. In addition, the bill pay circuit 111 or the account management circuit 103 can send additional bill pay information to the transaction machine 130. For example, the additional bill pay information can include service information, third party account information, payment due date, payment due amount, etc. In one or more embodiments, the additional information may also include a billing document detailing the current bill. In some such embodiments, the billing document may be received from the third party computer system 131 in conjunction with the register customer request (FIG. 2, 206) or with the passcode generation request (FIG. 2, 212). The billing document may also be received at any time after the customer has been registered at the provider computing system 101.

Figure 8:
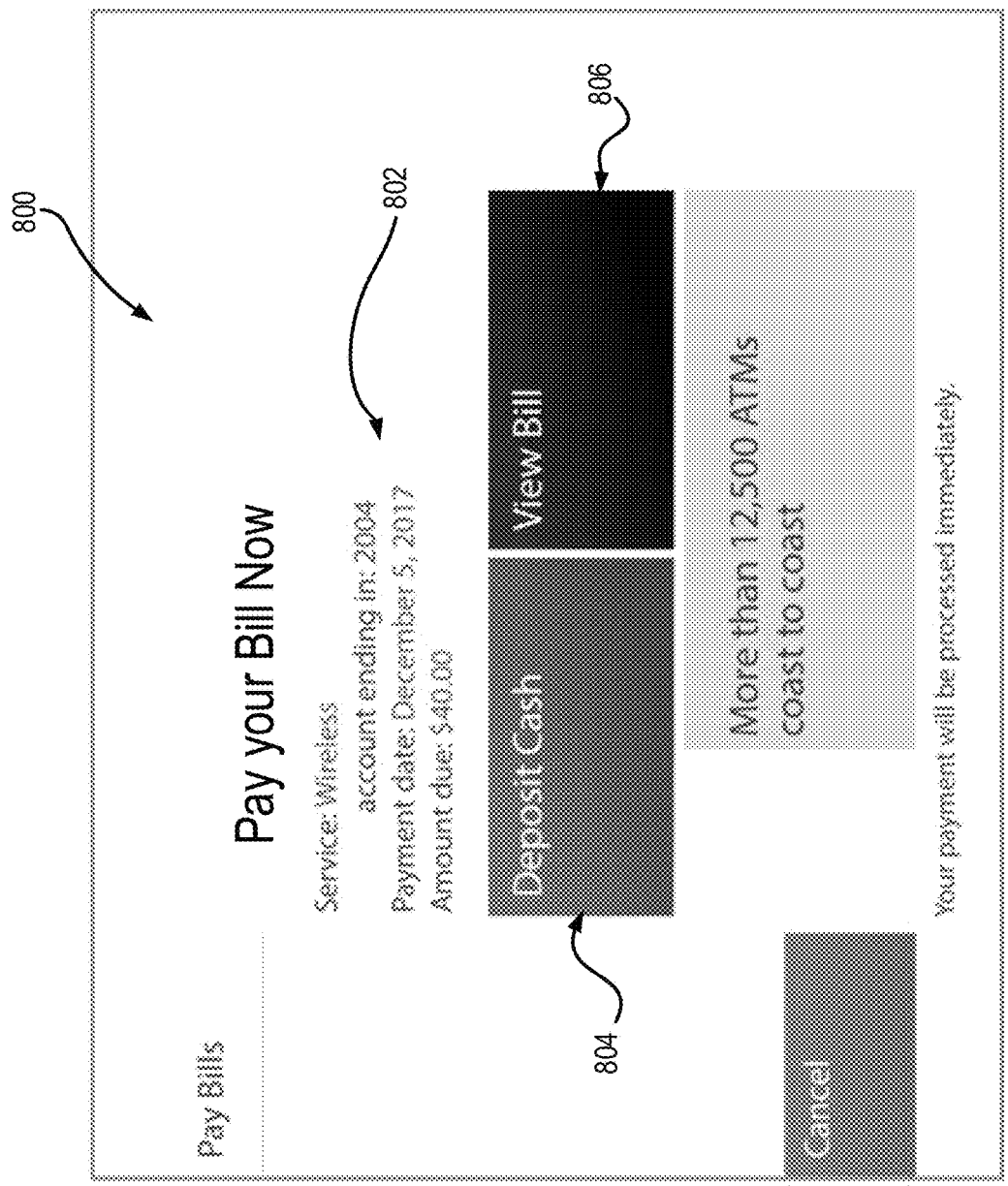
FIG. 8 shows a screenshot of an example user interface providing bill pay information.

Referring again to FIG. 5, the transaction machine 130, responsive to receiving the verification notification (516) from the provider computing system 101, can display a user interface that provides bill pay information (518) and the ability to initiate payment. FIG. 8 shows a screenshot of an example user interface 800 providing bill pay information that can be displayed on a display 138 of the transaction machine 130. The user interface 800 provides bill pay information 802, which can include the name of the service (e.g., "Wireless"), a portion of the account number (e.g., "2004"), payment date (e.g., "Dec. 5, 2017"), and the amount due (e.g., "$40"). The user interface 800 also includes selectable deposit button 804 ("Deposit Cash") and a selectable view bill button 806 ("View Bill"). Selection of the deposit button 804 can initiate a cash deposit mechanism, while selection of the view bill button 806 can initiate a bill display process, in which the current bill can be presented to the user on the display 138 of the transaction machine 130.

Figure 9:
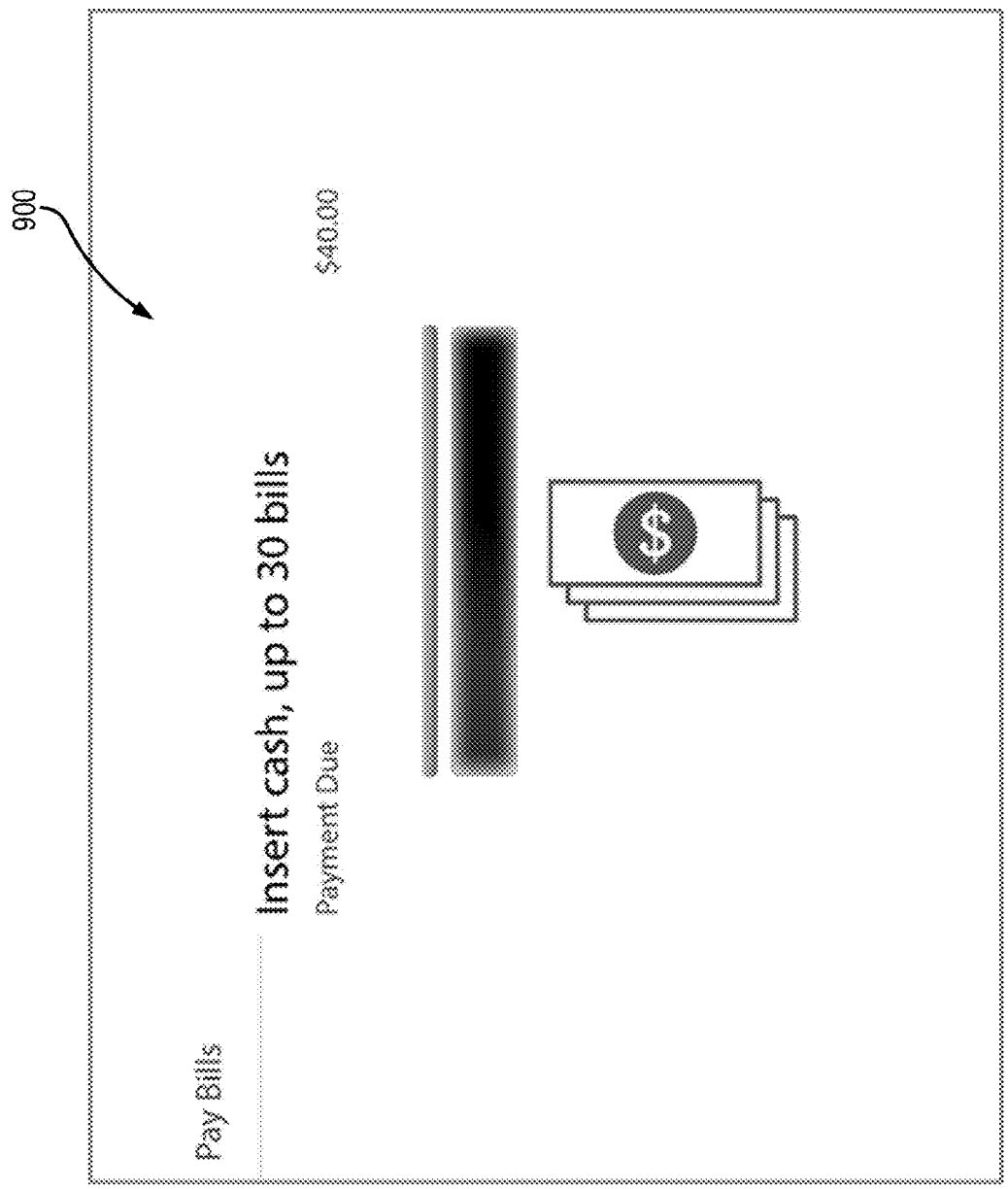
FIG. 9 shows a snapshot of an example user interface providing cash deposit information.

FIG. 9 shows a snapshot of an example user interface 900 providing cash deposit information that can be displayed on a display 138 of the transaction machine 130. The user interface 900 shown in FIG. 9 provides the user instructions for depositing cash in cash deposit mechanism (FIG. 1A, 134). For example, the user interface 900 can display the amount due as well as instructions on the number of bills that can be inserted into the deposit mechanism 134. Referring again to FIG. 5, the third party customer 190, in response to the transaction machine 130 displaying bill pay information (518), can make a payment (520) at the transaction machine 130.

Figure 10:
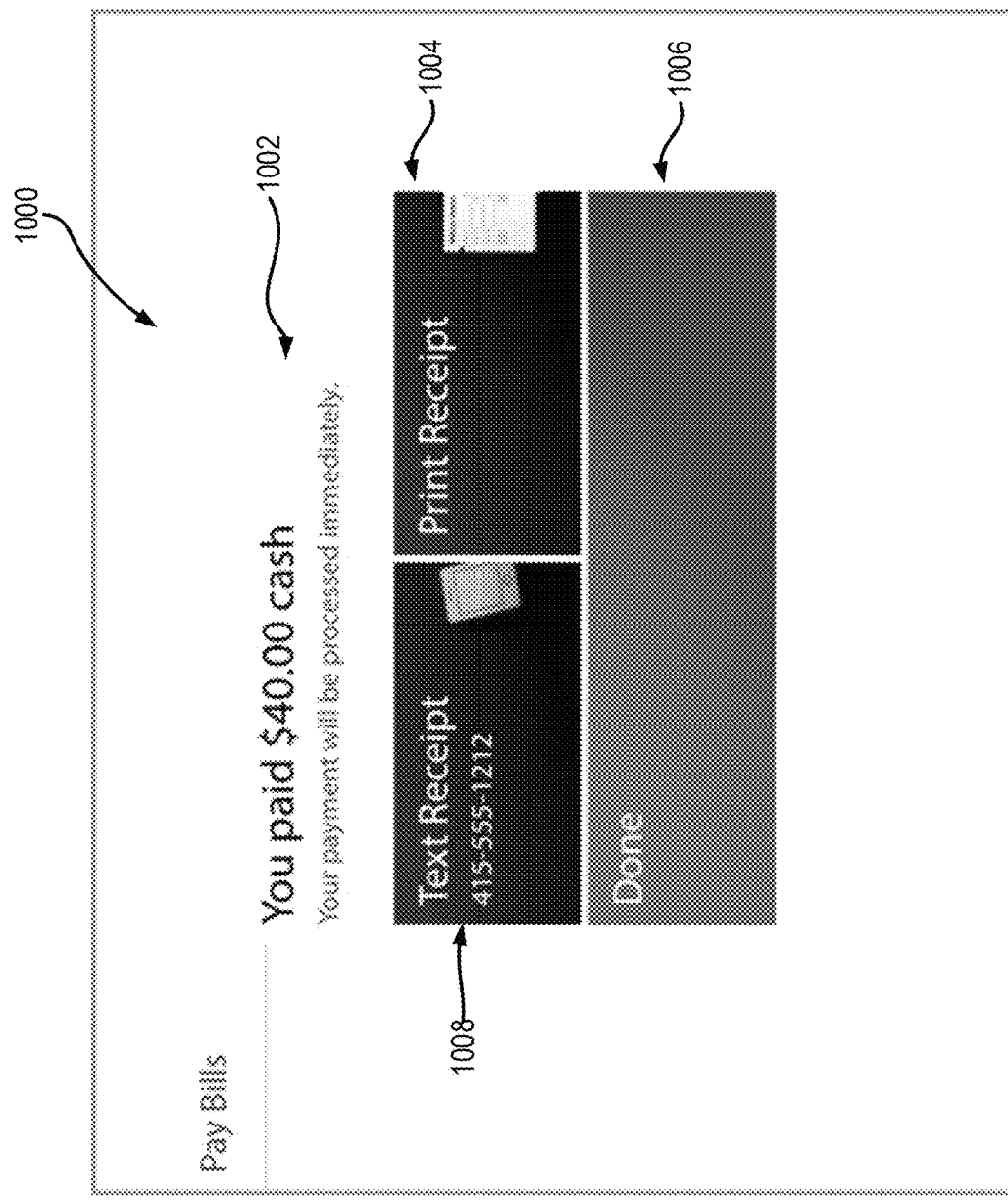
FIG. 10 shows a snapshot of an example user interface providing payment notification information.

The transaction machine 130, responsive to receiving the payment from the third party customer 190, can process the payment (522). For example, the transaction machine 130 can count the deposited cash and determine if the deposited cash is at least equal to the amount due. The transaction machine 130 may also provide a notification on the display 138 indicating the amount that was deposited. FIG. 10 shows a snapshot of an example user interface 1000 providing payment notification information that can be displayed on a display 138 of the transaction machine 130. In particular, the user interface 1000 can display the amount paid information 1002, and also display selectable buttons such as a text receipt button 1008, a print receipt button 1004, and a done button 1006. Selection of the text receipt button 1008 can cause the receipt generation circuit 144 of the transaction machine 130 to initiate sending the receipt in a text to a phone number associated with the third party customer 190. The text receipt button 1008 may also display the phone number on record, so that the third party customer 190 can verify the phone number. Selection of the print receipt button 1004 can cause the receipt generation circuit 144 to initiate printing the receipt at a printer on or near the transaction machine 130. Selection of the done button 1006 can cause the transaction processing circuit 142 to complete the transaction.

The transaction processing circuit 142 can also send a payment notification (524) to the provider computing system 101, indicating that the payment was successfully received from the third party customer 190. The payment notification (524) may also include additional information such as the customer ID associated with the third party customer 190. The bill pay circuit 111 at the provider computing system 101 can receive the payment notification (524) and the customer ID and update (526) the payment information in the record associated with the third party customer 190 stored in the provider account database 127. For example, the bill pay circuit 111 can access the database using the customer ID received from the transaction machine 130 and locate the record associated with the customer ID. The bill pay circuit 111 can then update the record to indicate that the payment of the current bill has been received. In some embodiments, the bill pay circuit 111 can maintain a list of bill identifiers corresponding to a list of current and past bills associated with the third party customer 190. The bill pay circuit 111 can update payment information associated with each of the bill identifiers.

The bill pay circuit 111 can also transmit a payment notification (528) to the third party computer system 131, indicating that a bill payment has been received. The payment notification can include additional information such as the customer ID, the bill payment amount, an identification of the bill payed, and any other customer information. The notification circuit 156 at the third party computer system 131 can receive the payment notification (528) from the bill pay circuit 111, and, in turn, can send a notification (530) to the third party customer 190 that a payment was successfully received. In some embodiments, the notification circuit 156 may send a text message to a phone number associated with the third party customer 190. In some other implementations, the notification circuit 156 can push a message through an application running on a device associated with the third party customer 190. Alternatively, the notification circuit 156 can employ other means to notify the user of the successful completion of payment.

Figure 11:
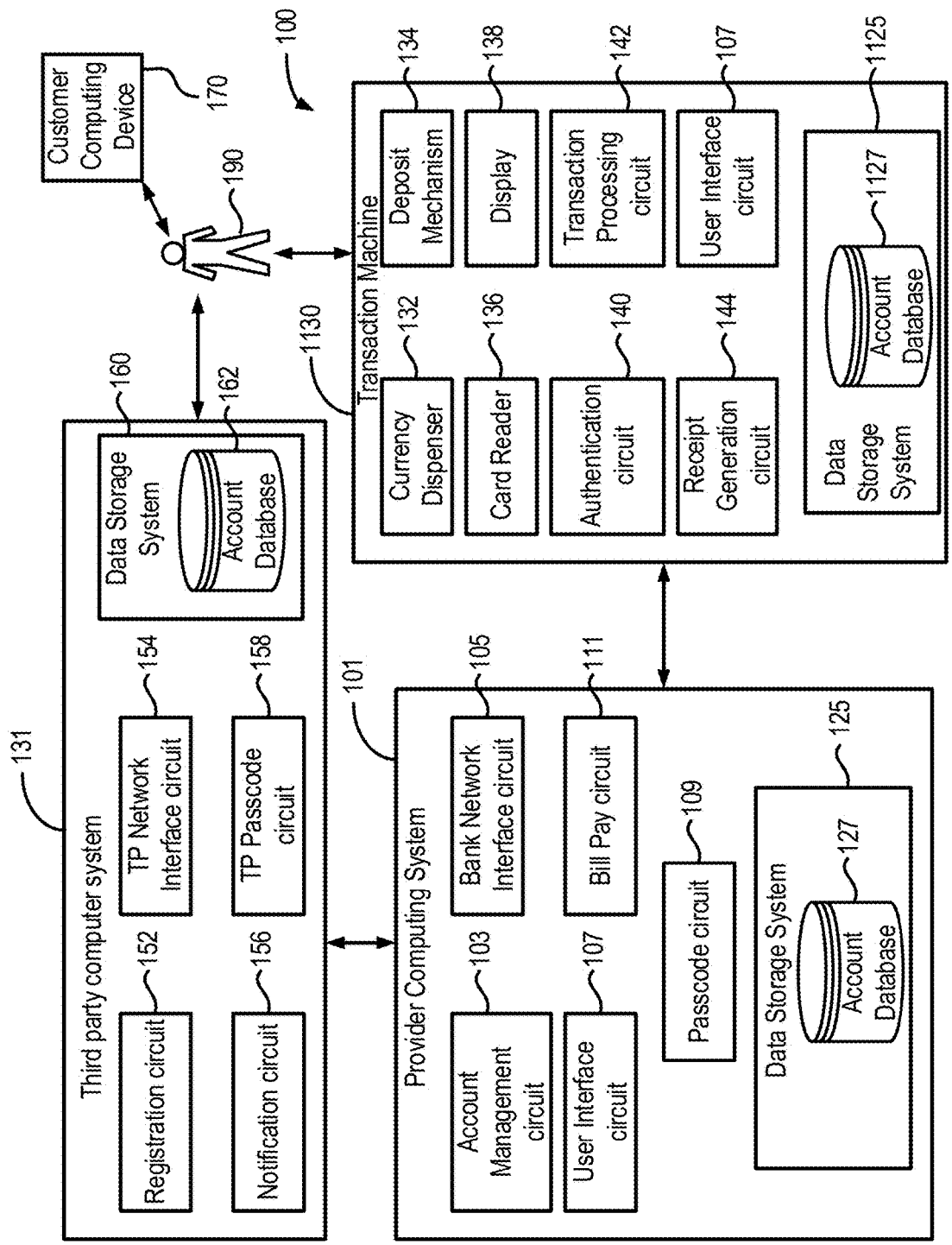
FIG. 11 shows a schematic diagram of an example system that includes a transaction machine that communicates with a third party computing system.

Referring to FIG. 11, a system 1100 is shown according to an example embodiment. The system 1100 is similar to the system 100 discussed above in relation to FIG. 1, in that similar to the system 100 shown in FIG. 1, the system 1100 in FIG. 11 also includes a provider computer system 101 and a third party computer system 131. The system 1100 further includes one or more transaction machines 1130, which are similar in many respects to the one or more transaction machines 130 discussed above in relation to FIG. 1A. However, unlike the transaction machine 130 shown in FIG. 1A, the transaction machine 1130 shown in FIG. 11 includes a transaction machine account database 1127. The transaction machine account database 1127 can be stored in a data storage system 1125, which while not shown in FIG. 1A, can be included in the transaction machine 130 as well. The inclusion of the transaction machine account database 1127 in the transaction machine 130 provides additional capabilities and features that improve the performance of the system 1100, as discussed below.

The transaction machine account database 1127 can be similar to the provider account database 127 discussed above, and can be configured to store account information related to account holders with the financial institution associated with the transaction machine 1130. In addition, the transaction machine account database 1127 can be configured to store third party customer data, which can include customer name, customer address, customer date of birth, third party customer ID, and other customer related information. In addition, the transaction machine account database 1127 can include any passcodes generated in association with a third party customer. As discussed above in relation to FIG. 1A, the passcodes can be stored in the provider account database 127 subsequent to their generation in response to a passcode generation request received from the third party computer system 131 (FIG. 2). The passcodes generated by the provider computer system 101 can be transmitted to the transaction machine 1130 for storage in the transaction machine account database 1127.

In one example, the provider computer system 101 can transmit the passcodes to all transaction machines 130 that are configured to accept payments from third party customers. In another example, the provider computer system 101 can transmit the passcodes to a subset of transaction machines that satisfy one or more criteria, such as, for example, location of the transaction machine (e.g., being within a certain distance from the location of the third party customer address), amount of the bill (e.g., identity of the third party (e.g., select location and number of transaction machines assigned to a particular third party), identity of the user (e.g., select location and number of transaction machines designated by the third party for the particular user), and other criteria. In one example, the provider computer system 101 can transmit the passcodes to the transaction machine 1130 over the bank network interface circuit 105. The provider computer system 101 also can transmit user data associated with the passcodes, where the user information can include user name, user identity, bill amount, third party identity, and any other user information. The transaction machine 1130, in turn, can receive the passcodes and associated user information over the transaction machine's bank network interface circuit (not shown). The data storage system 1125 can store the passcodes and the associated user information in the transaction machine account database 127.

Figure 12:
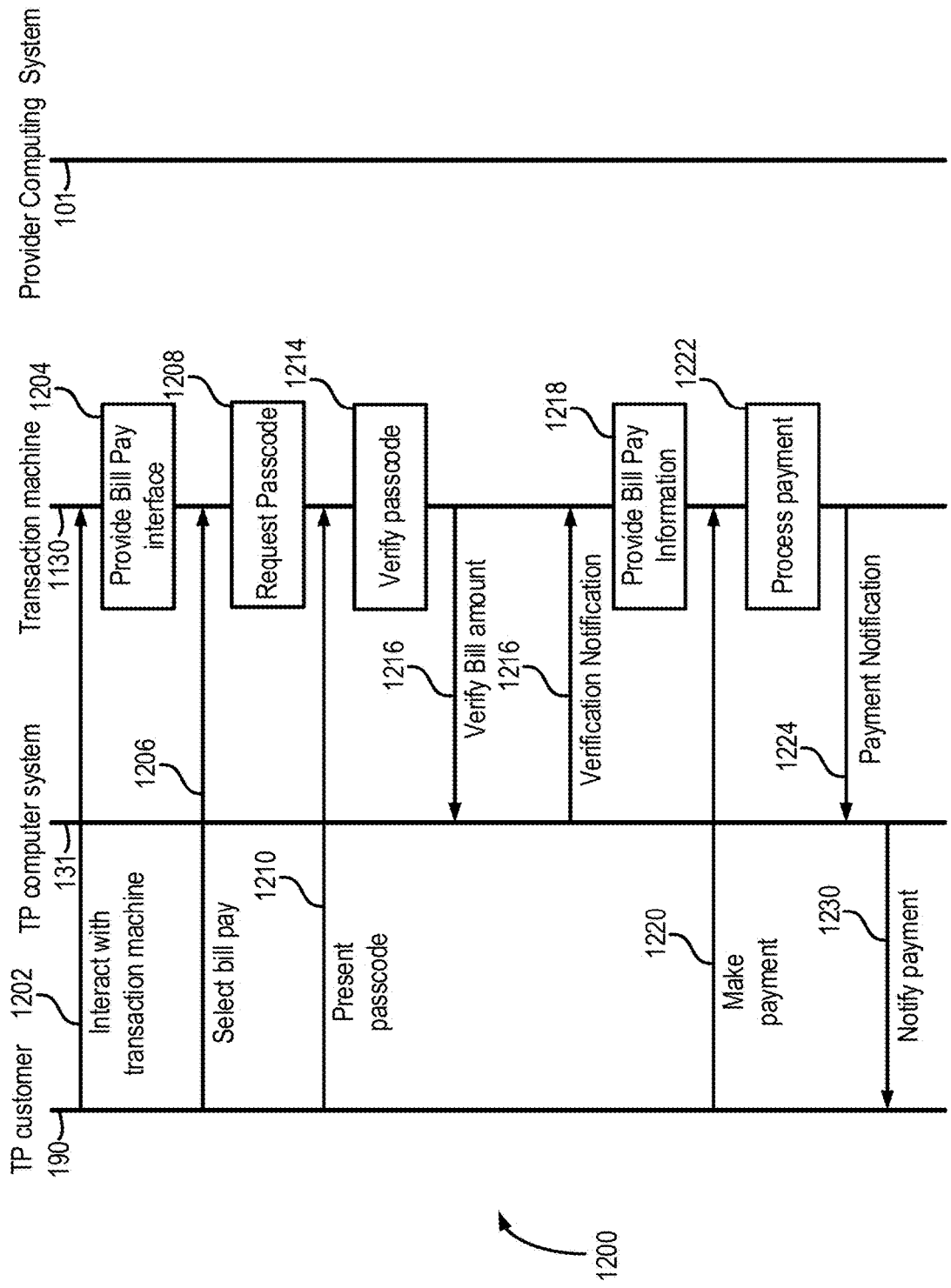
FIG. 12 shows a process flow for another example bill pay process executed by the system shown in FIG. 11.

FIG. 12 shows a process flow 1200 for an example bill pay process. In particular, the process flow 1200 depicts a bill pay process for a third party. As discussed below, the process flow 1200 is similar to the process flow 500 discussed above in relation to FIG. 5, in that like the process flow 500, the process flow 1200 also includes interaction with the third party customer 190 to request and receive passcodes. However, unlike in the process flow 500, where the passcode verification is carried out by the provider computing system 101, in the process flow 1300, the passcode verification is carried out by the transaction machine 1130 instead of the provider computing system 101. In addition, unlike in the process flow 500, in the process flow 1200, the transaction machine 1130 verifies the billing amount with the third party computing system 131 prior to accepting and processing the payment from the third party customer 190. Furthermore, unlike in the process flow 500, where the provider computing system 101 notifies the third party computing system 131 of the third party customer payment, in the process flow 1200, the transaction machine 1130, instead of the provider computing system 101, notifies the third party computing system 131 of the third party customer payment.

The process flow 1200 includes the interaction (1202) of the third party customer 190 with the transaction machine 1130. The third party customer 190 can walk or drive to the transaction machine 1130 associated with the bank that can accept bill payments on behalf of the third party. The user interface circuit 107 of the transaction machine 1130 can provide a bill pay interface (1204) similar to that discussed above in relation to FIG. 6. The third party customer 190 can select bill pay (1206) on the user interface provided by the transaction machine 1130. For example, the third party customer 190 can select the button 602 (FIG. 6) labeled "Bill pay" displayed on the display 138 of the transaction machine 1130. Responsive to the third party customer 190 initiating the bill pay transaction, the user interface circuit 107 of the transaction machine 1130 can request (1208) the third party customer 190 to provide the passcode. The user interface circuit 107 can provide a passcode entry user interface that is similar to that discussed above in relation to FIG. 7. As an example, referring to FIG. 7, the third party customer 190 can preset the passcode (1210) by entering the passcode in the passcode field 702 and selecting the OK button 704 to instruct the transaction machine 1130 to accept the entered passcode.

Responsive to receiving the passcode from the third party customer 190, the transaction machine 1130 can verify the passcode (1214) based on the information stored in the transaction machine account database 1127. For example, the authentication circuit 140 can compare the passcode received from the user interface with the passcodes stored in the transaction machine account database 1127. If a match is found, the authentication circuit 140 can indicate that the passcode has been verified.

Once the passcode has been verified, the transaction processing circuit 142 can determine the bill pay amount stored in the transaction machine account database 1127 in association with the passcode. For example, the transaction processing circuit 142 can communicate the bill pay amount determined from the transaction machine account database 1127 to the third party computer system 131 (1216). The communication to the third party computer system 131 can also include the passcode, and any other third party customer information stored in the transaction machine account database 1127. The third party computer system 131 can compare the bill pay amount received from the transaction machine 1130 with the bill pay amount stored in the database in association with an identity (or passcode) of the third party customer. If the bill pay amount is verified as correct, the transaction processing engine 142 can receive a message from the third party computer acknowledging that the bill pay amount is correct. If the bill pay amount does not match with the one stored at the third party computer system 131, the transaction processing engine 142 may receive a message indicating that the amount is incorrect. The transaction processing circuit 142 can terminate the bill pay transaction with the third party customer if the message indicating that the bill pay amount is incorrect is received. On the other hand, the transaction processing circuit 142 can proceed with the bill pay transaction with the third party customer if a message indicating that the bill pay amount is correct is received from the third party computer system 131.

The transaction machine 1130, responsive to receiving the verification notification 1216 indicating that the bill pay amount is correct, can display a user interface that provides the verified bill pay amount (518) and the ability to initiate payment. FIG. 8, discussed above, shows a screenshot of an example user interface 800 providing bill pay information that can be displayed on a display 138 of the transaction machine 1130. FIG. 9, discussed above, shows a snapshot of an example user interface 900 providing cash deposit information that can be displayed on a display 138 of the transaction machine 130. The user interface 900 shown in FIG. 9 provides the user instructions for depositing cash in cash deposit mechanism (FIG. 1A, 134). For example, the user interface 900 can display the amount due as well as instructions on the number of bills that can be inserted into the deposit mechanism 134. Referring again to FIG. 12, the third party customer 190, in response to the transaction machine 1130 displaying bill pay information (1218), can make a payment (1220) at the transaction machine 130.

The transaction machine 1130, responsive to receiving the payment from the third party customer 190, can process the payment (1222). For example, the transaction machine 1130 can count the deposited cash and determine if the deposited cash is at least equal to the amount due. The transaction machine 1130 may also provide a notification on the display 138 indicating the amount that was deposited. FIG. 10, discussed above, shows a snapshot of an example user interface 1000 providing payment notification information that can be displayed on a display 138 of the transaction machine 130. In particular, the user interface 1000 can display the amount paid information 1002, and also display selectable buttons such as a text receipt button 1008, a print receipt button 1004, and a done button 1006. Selection of the text receipt button 1008 can cause the receipt generation circuit 144 of the transaction machine 1130 to initiate sending the receipt in a text to a phone number associated with the third party customer 190. The text receipt button 1008 may also display the phone number on record, so that the third party customer 190 can verity the phone number. Selection of the print receipt button 1004 can cause the receipt generation circuit 144 to initiate printing the receipt at a printer on or near the transaction machine 1130. Selection of the done button 1006 can cause the transaction processing circuit 142 to complete the transaction.

The transaction processing circuit 142 can also send a payment notification (1224) to the third party computer system 131. In contrast with the process 500 discussed above in relation to FIG. 5, where the transaction machine 130 sends a payment notification (524) to the provider computing system 101, the transaction machine 1130 instead sends a payment notification (1224) to the third party computer system 130. By bypassing the provider computing system 101, the transaction machine 1130 can reduce the risk of degraded performance in the payment notification process that may be caused by delays in the communication between the transaction machine 1130 and the provider computing system 101 and the communication between the provider computing system 101 and the third party computer system 131, and the delay due to the performance of the provider computing system 101. As a result, the speed of notification to the third party customer can be improved. The third party computer system 131, responsive to receiving the payment notification (1224) from the transaction machine 1130, can notify (1230) the third party customer of a successful receipt of the bill payment.

Figure 13:
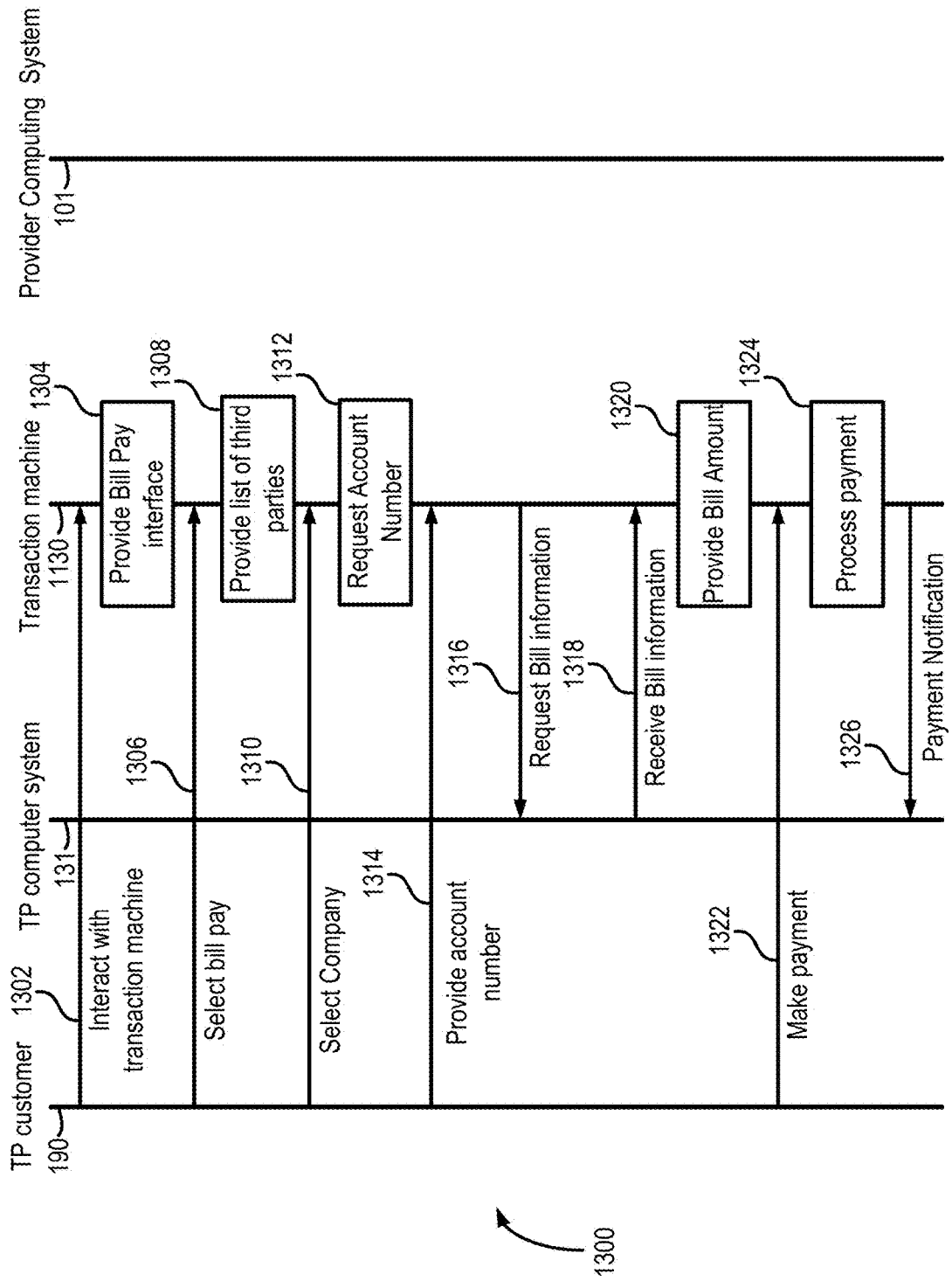
FIG. 13 shows a process flow for another example bill pay process using an account number of the third party customer.

FIG. 13 shows a process flow 1300 for an example bill pay process. In particular, the process flow 1300 depicts a bill pay process for a third party. Unlike the process flow 1200 discussed in relation to FIG. 12, in which the transaction machine 1130 requests a passcode from the third party customer 190, the process flow 1300 in FIG. 13 depicts an example where the transaction machine instead requests an account number. The account number can correspond to an account that the third party customer 190 holds with the third party associated with the third party computer system 131. In this manner, the process flow 1300 abstains from generating and storing passcodes as well as customer information related to the third party customer 190.

The process 1300 includes the interaction (1302) of the third party customer 190 with the transaction machine 1130. The third party customer 190 can walk or drive to the transaction machine 1130 associated with the bank that can accept bill payments on behalf of the third party. In response to the third party customer 190 interacting with the transaction machine 1130, the transaction machine 1130 can present a user interface (1304) to the third party customer 190. The user interface circuit 107 of the transaction machine 1130 can provide a bill pay interface (1304) similar to that discussed above in relation to FIG. 6. The third party customer 190 can select bill pay (1306) on the user interface provided by the transaction machine 1130. For example, the third party customer 190 can select the button 602 (FIG. 6) labeled "Bill pay" displayed on the display 138 of the transaction machine 1130.

Figure 14:
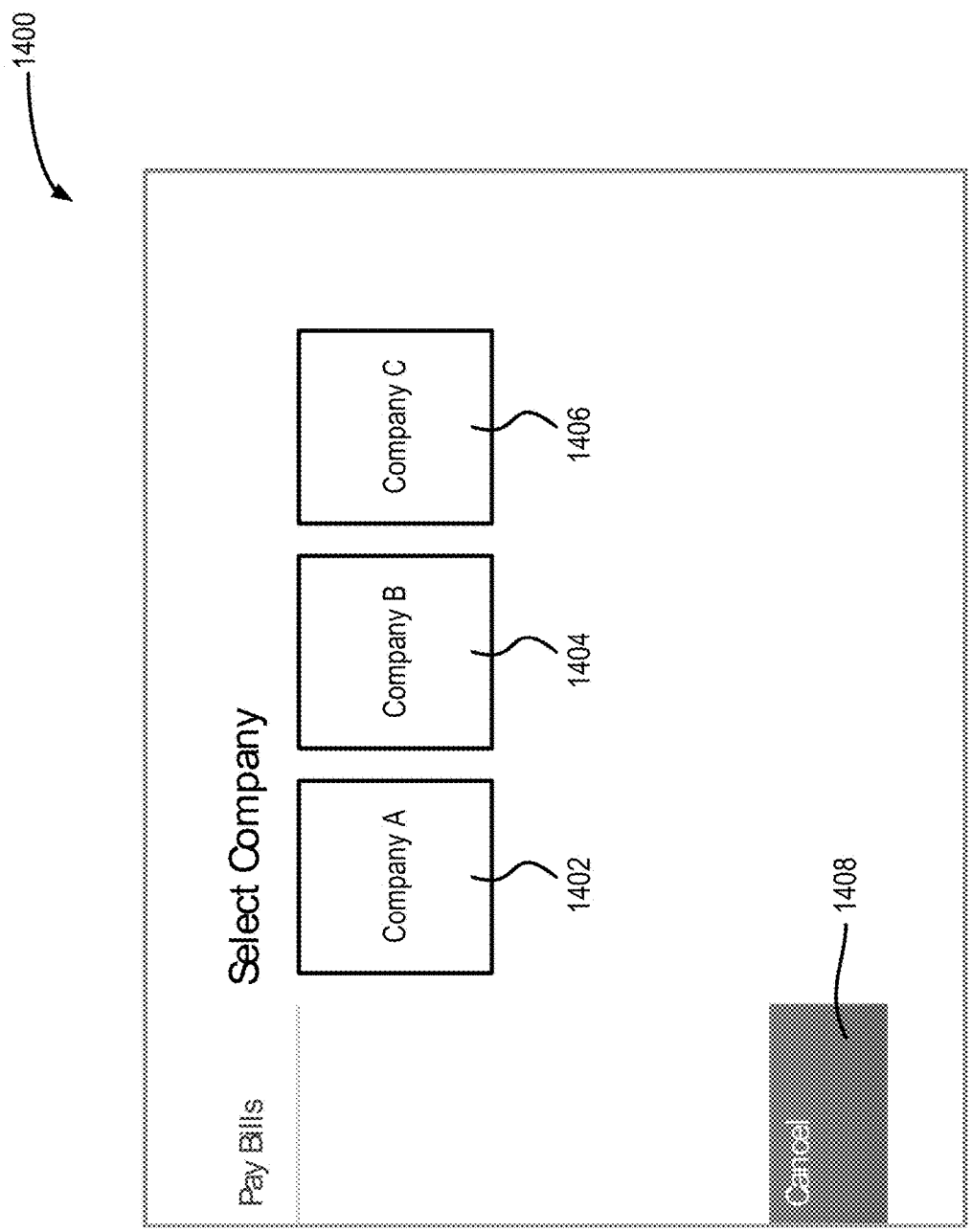
FIG. 14 shows a snapshot of an example user interface providing selection of a third party by the customer.

Responsive to the third party customer 190 initiating the bill pay transaction, the user interface circuit 107 of the transaction machine 1130 can present an user interface that requests the user to select a third party (1308). For example, FIG. 14 shows an example user interface 1400 that can be presented on a display 138 of the transaction machine 1130. In particular, the user interface circuit 107 can present the user interface 1400 on the display 138 of the transaction machine 1130. The user interface 1400 can include a number of selectable buttons associated with various third parties for which the transaction machine 1130 can accept bill payments. For example, the user interface 1400 shows a company A button 1402, a company B button 1404, and a company C button 1406. The user interface 1400 also can display a Cancel button 1408. The third party customer 190 can identify the third party for which a bill is to be paid by selecting (1310) the appropriate button on the user interface 1400.

Figure 15:
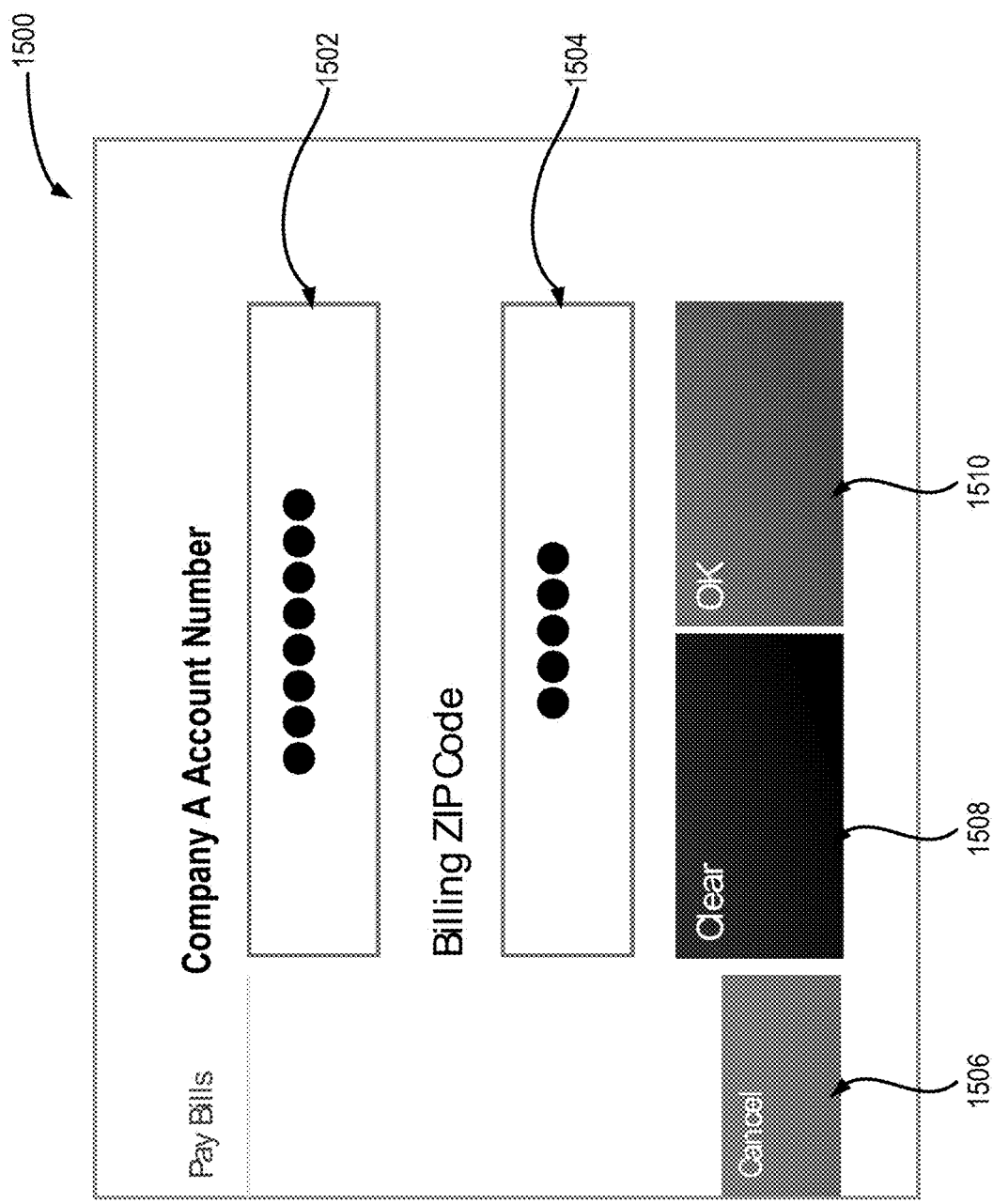
FIG. 15 shows a snapshot of an example user interface providing ability for the third party customer to enter account information.

Responsive to the third party customer 190 selecting a company or third party (1310) on the user interface 1400, the transaction machine 1130 can display a user interface to request, from the third party customer 190, account information related to the selected third party (1312). FIG. 15 shows an example user interface 1500 that the user interface circuit 107 can display on the display screen 138 of the transaction machine 1130. The user interface 1500 can include an account field 1502, a ZIP code field 1504, a cancel button 1506, a clear button 1508, and an OK button 1510. The account field 1502 can accept the account number entered by the third party customer 190. The account number can correspond to an account number that the third party customer 190 holds with the selected third party or company, such as, for example Company A. In some examples, the account number can be a customer number, a phone number, a unique ID number, or any other number that can uniquely identify the third party customer 190 to the third party. The user interface 1500 can optionally include the ZIP code field 1504, in which the third party customer 190 can enter the ZIP code associated with the account with Company A. The ZIP code can offer an additional layer of authentication to the transaction. To that end, the user interface 1500 can include additional fields requesting information, such as, for example, "password," "address," "phone number," etc.

Once the third party customer 190 has entered the requested information on the user interface 1500, the third party customer 190 can press the OK button 1510 (1314).

Responsive to receiving the account number from the third party customer 190, the transaction machine 1130 can communicate with the third party computer system 131 to request the bill amount. The third party computer system 131 can correspond to the third party or company selected by the user in the user interface 1400 shown in FIG. 14. The transaction machine 1130 can store in the data storage system 1125 a list of companies that can be displayed to the third party customer 190. The transaction machine 1130 also can store the communication information, such as the server address, in the data storage system 1125, of a third party computer system associated with each company in the list of companies. In response to the third party customer 190 selecting a company or third party, the transaction machine 1130 can look up the identity of the selected company or third party to determine the communication information to communicate with the third party computer system 130 associated with the selected third party or company.

The transaction machine 1130 can send a request (1316) to the third party computer system 131 to retrieve bill information. The request can include the account information entered by the third party customer 190 at the user interface 1500 shown in FIG. 15. For example, the request can include the account number and the ZIP code entered by the third party customer 190 in the account field 1502 and the ZIP code field 1504.

The transaction machine 1310 can receive (1318) bill information from the third party computer system 131. For example, the transaction machine 1130 can receive from the third party computer system 131 the bill information subsequent to the transaction machine 1130 sending the request (1316). The bill information can include the bill amount that the third party customer 190 owes the third party or company. The bill information may also include additional information such as the due date, the service the bill amount corresponds to, the account information, etc.

Figure 16:
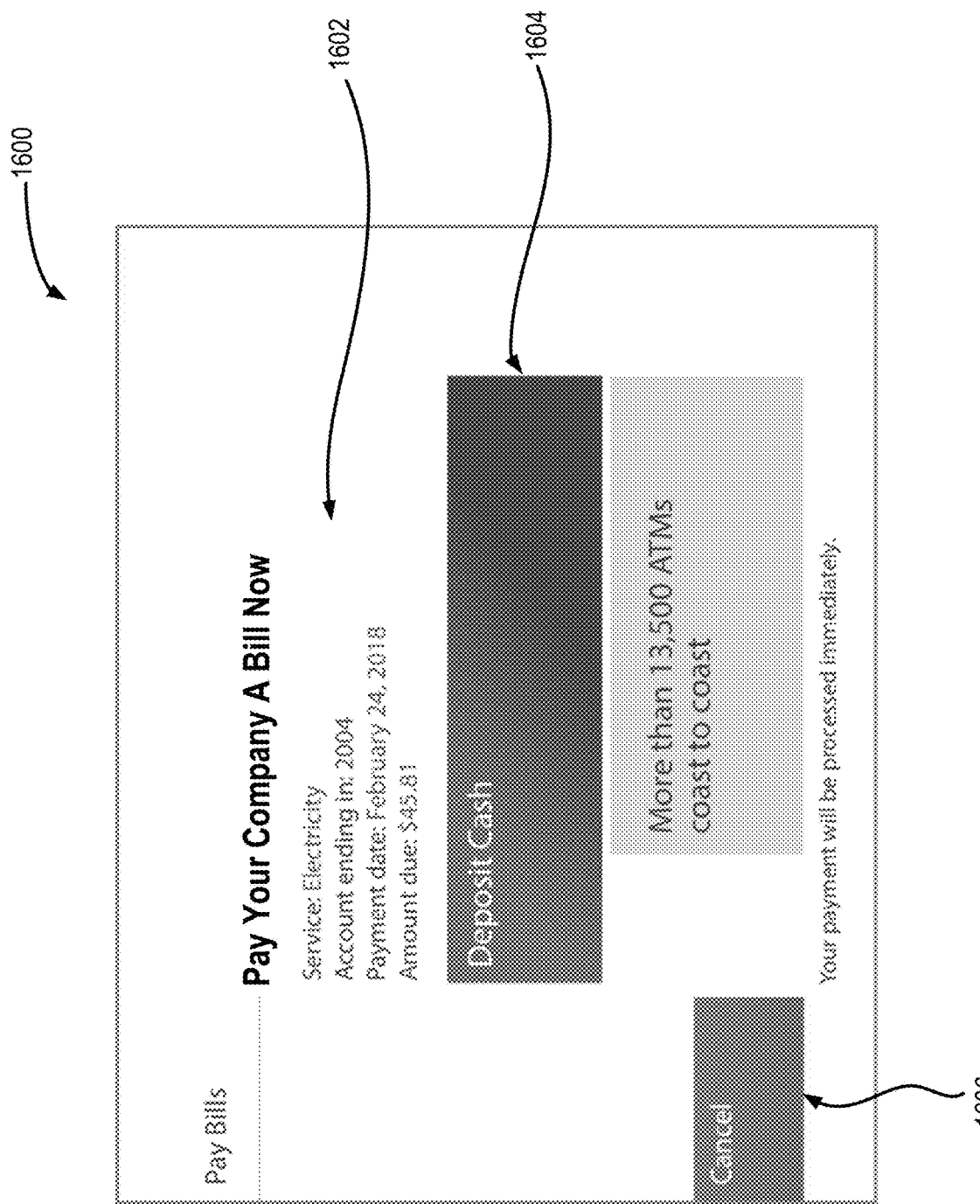
FIG. 16 shows a snapshot of an example user interface providing bill pay information to the third party customer.

The transaction machine 1310 can provide the bill amount to the third party customer 190 (1320). For example, FIG. 16 shows an example user interface 1600 providing the third party customer 190 with the bill information received from the third party computer system 130. The user interface circuit 107 can display the user interface 1600 shown in FIG. 16 on the display screen 138. The user interface 1600 can include bill information such as the service (e.g., Electricity) for which the bill amount is provided, information about the account (e.g., last four digits of the account number), the payment due date, and the amount due. The interface 1600 can also include a deposit cash button 1604, which the third party customer 190 can activate, for example, after verifying the billing information 1602. The user interface 1600 can further include a cancel button 1606, which the third party customer 190 can activate if the third party customer 190 wishes to cancel the bill payment transaction.

Figure 17:
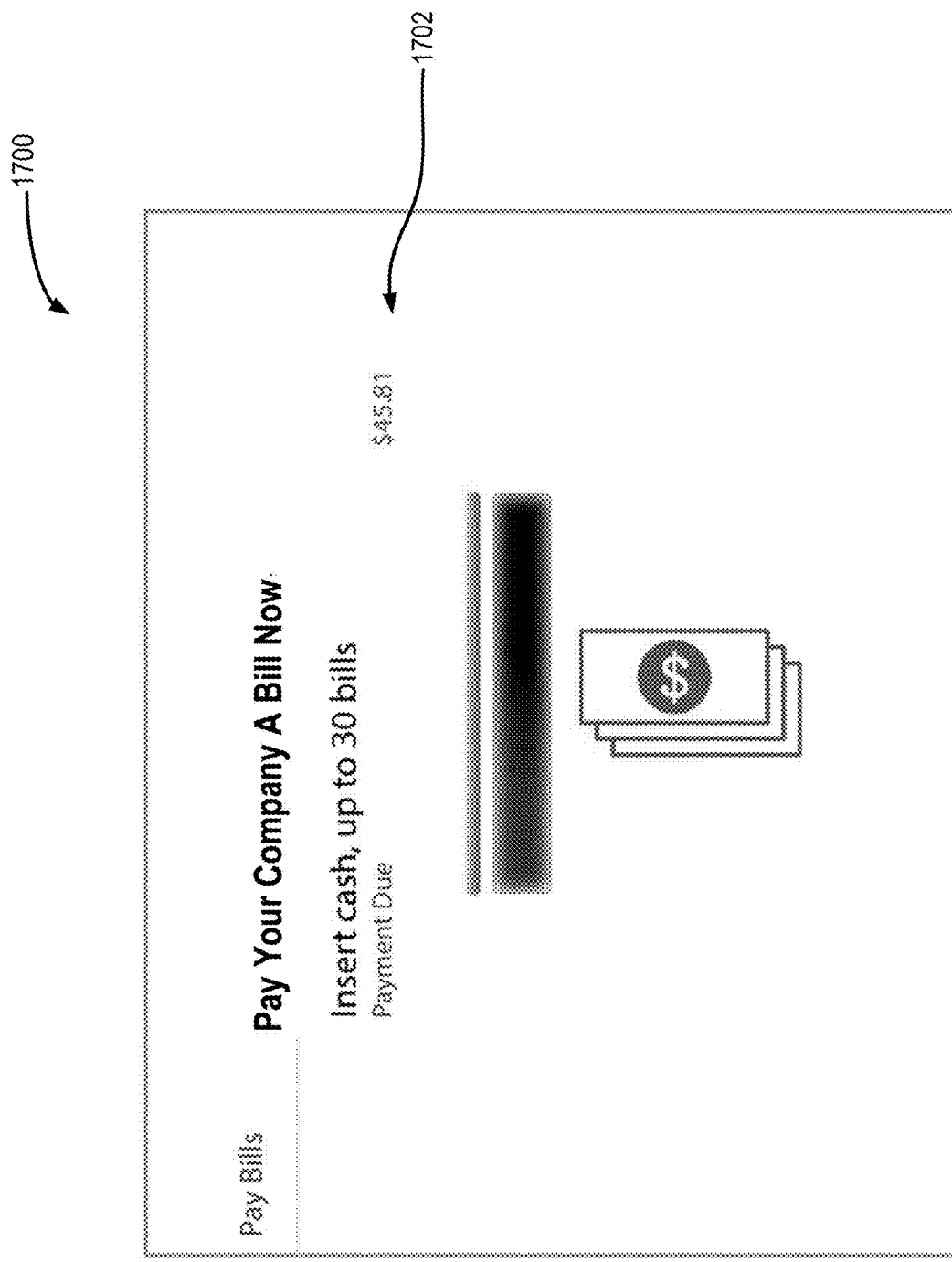
FIG. 17 shows a snapshot of an example user interface providing cash deposit information.

Responsive to the third party customer 190 activating the deposit cash button 1604, the user interface circuit 107 can display cash deposit information on the display screen 138. FIG. 17 shows a snapshot of an example user interface 1700 providing cash deposit information. The user interface 1700 shown in FIG. 17 provides the user instructions for depositing cash in cash deposit mechanism (FIG. 11, 134). For example, the user interface 1700 can display the amount due 1702 as well as instructions on the number of bills that can be inserted into the deposit mechanism 134. Referring again to FIG. 13, the third party customer 190, in response to the transaction machine 1130 displaying bill pay information, can make a payment (1322) at the transaction machine 130.

Figure 18:
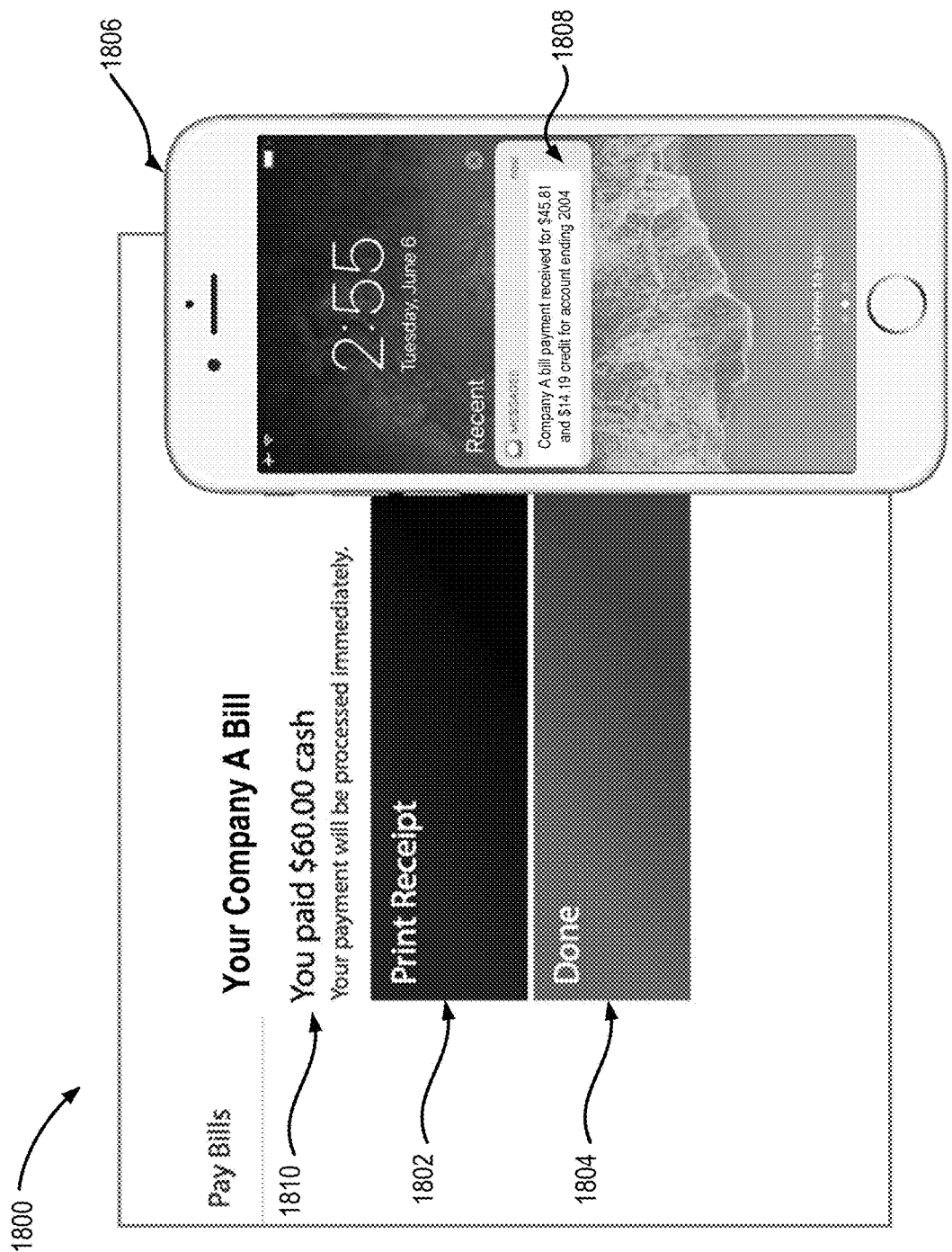
FIG. 18 shows a snapshot of an example user interface providing payment information.

The transaction machine 1130, responsive to receiving the payment from the third party customer 190, can process the payment (1324). For example, the transaction machine 1130 can count the deposited cash and determine if the deposited cash is at least equal to the amount due. The transaction machine 1130 may also provide a notification on the display 138 indicating the amount that was deposited. FIG. 18 shows a snapshot of an example user interface 1800 providing a payment notification information that can be displayed on a display 138 of the transaction machine 1130. In particular, the user interface 1800 can display the amount paid information 1810, and also display selectable buttons such as a print receipt button 1802, and a done button 1804. Selection of the print receipt button 1802 can cause the receipt generation circuit 144 to initiate printing the receipt at a printer on or near the transaction machine 1130. Selection of the done button 1804 can cause the transaction processing circuit 142 to complete the transaction.

The transaction machine 1130 can also send a payment notification (1326) to the third party computer system 131, indicating that the payment was successfully received from the third party customer 190. The payment notification (1326) may also include additional information such as the account number associated with the third party customer 190. A notification circuit 156 at the third party computer system 130 can receive the payment notification (1326) and the additional information and update the payment information in the record associated with the third party customer 190 stored in the provider account database 127. For example, the notification circuit 156 can access the database using the account number received from the transaction machine 1130 and locate the record associated with the account number. The notification circuit 156 can then update the record to indicate that the payment of the current bill has been received. In some embodiments, the notification circuit 156 can maintain contact information, such as a phone number, of the third party customer 190. The notification circuit 156, upon receiving the payment notification (1326) from the transaction machine 1130, can send a notification, such as a text message 1808 to the cell phone 1806 of the third party customer 190 notifying that the payment was received. The notification circuit 156 can include in the notification the amount deposited by the third party customer 190 as well as any credit or any additional amount owed.

Figure 19:
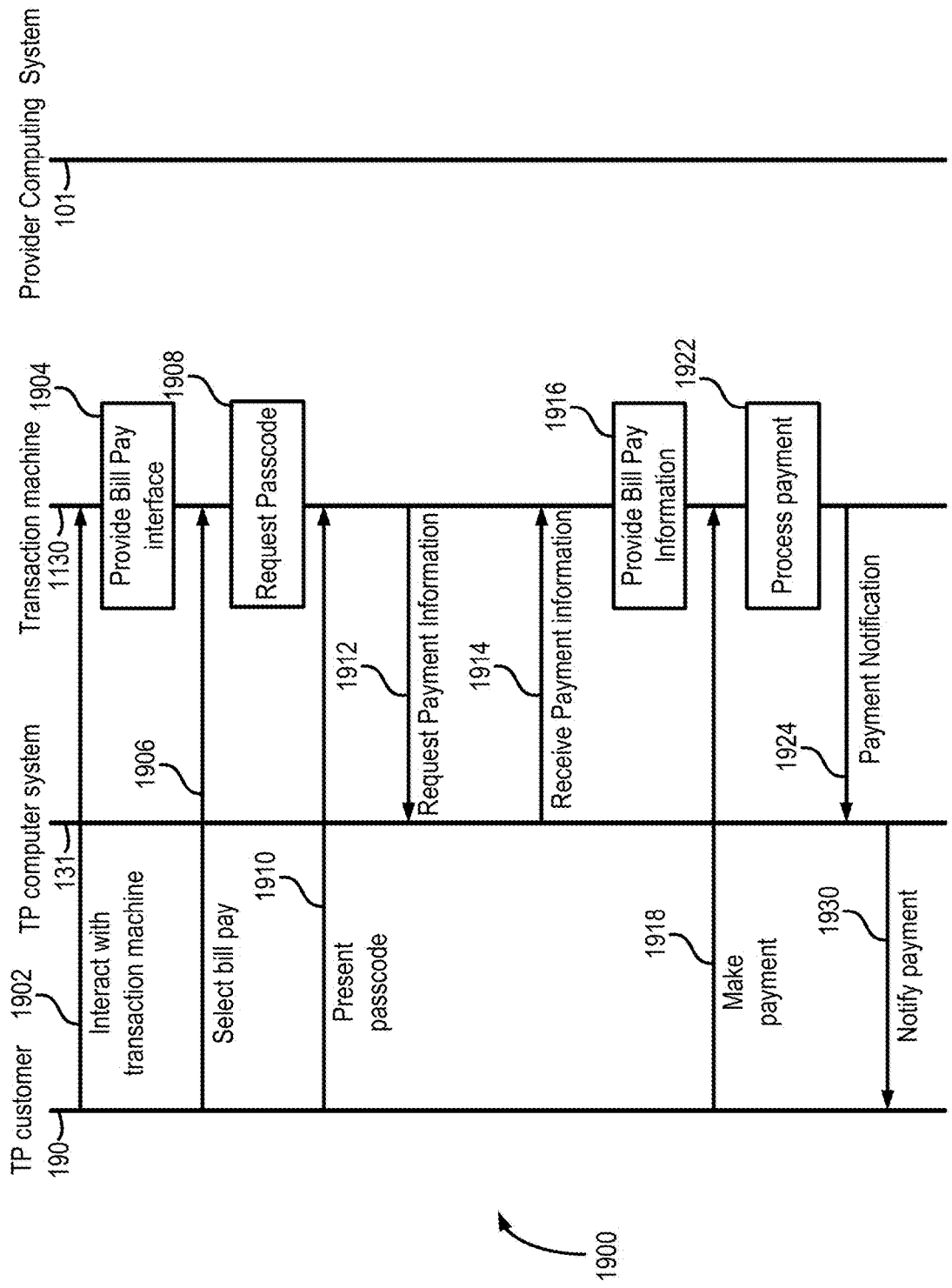
FIG. 19 shows a process flow for an example payment process for purchasing items.

FIG. 19 shows a process flow 1900 for an example bill pay process for a purchase made on a third party application. The transaction machine 1130 can enable a third party customer 190 to make purchases on the third party application, and make cash payments for the purchase at the transaction machine 1300. The transaction machine 1300 can process the cash payments and notify the third party computer system 190 of the cash payment. In response the third party computer system 130 can complete the purchase.

FIG. 20 shows an example screen shot of a user interface 2000 shown on a customer device 2002. The user interface 2000 can represent a user interface displayed on the display screen of the customer device 2002 during the process of making a purchase using a third party application or on s a third party, website. In particular, the user interface 2000 can provide the customer with options in selecting a payment method to pay for the desired purchase. The user interface 2000 can include payment options such as a store card selection 2006, a cash payment selection 2008, a first credit card selection 2010, a second credit card selection 2012, and a Continue button 2004. The customer can select any one of the payment options (for example by selecting a corresponding radio button) and activate the Continue button 2004 to initiate the payment. For example, the customer may select the cash payment selection 2008 and activate the Continue button 2004 to indicate that the customer would like to make cash payment towards the purchase.

FIG. 21 shows an example screen shot of a user interface 2100 shown in the customer device 2002. The user interface 2100 can provide the customer the ability to place the order for the purchase using one or more options. For example, the user interface 2100 can provide the customer with purchase information 2110 including the product being purchased and the price of the product. The user interface 2100 also can include options for selecting the payment method. For example, the user interface 2100 can provide a cash payment option 2101 and a store card rewards option 2104. The user interface 2100 also can provide the customer with the option 2106 to update the billing address and a field 2112 for entering gift cards and promotional codes.

Figure 22:
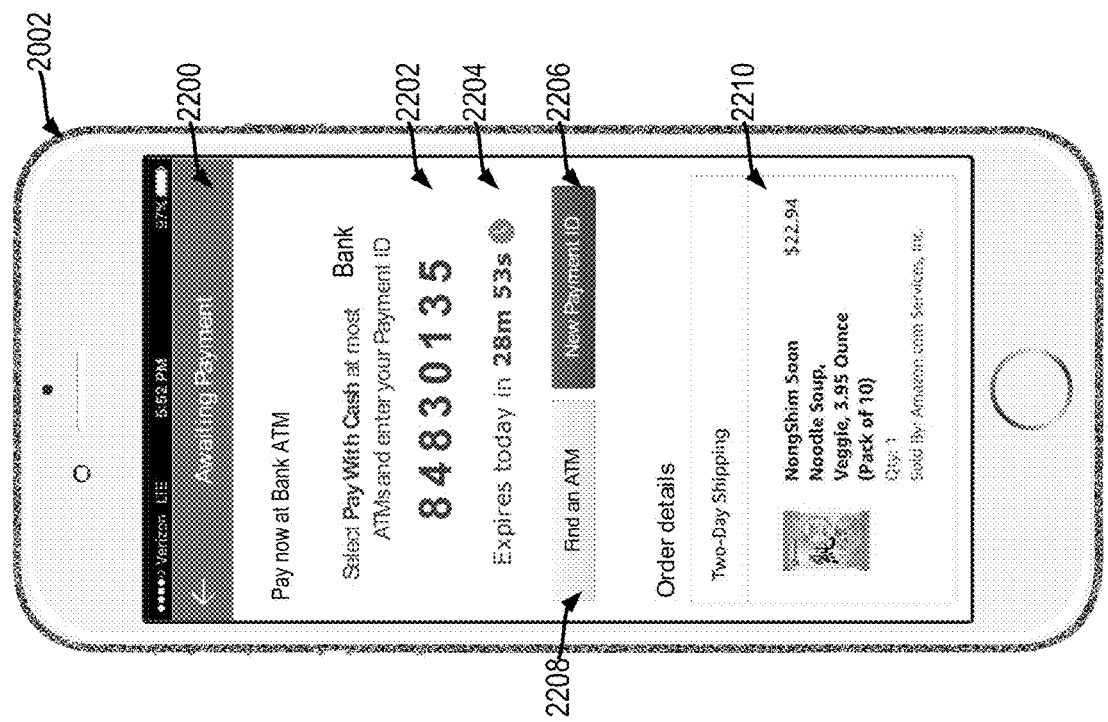
FIG. 22 shows a snapshot of an example user interface providing a customer ID provided by a third party on the third party customer device.

FIG. 22 shows an example screen shot of a user interface 2200 including a payment ID shown on the customer device 2002. Responsive to the customer selecting the cash payment method 2102 on the user interface 2100 shown in FIG. 21, the third party can display the user interface 2200 shown in FIG. 22 on the display screen of the customer device 2002. The user interface 2200 can provide the customer with a payment or customer ID 2202, customer ID expiration duration 2204, a new payment ID button 2206, a find ATM button 2208, and order details 2210. The customer ID 2202 can be generated by the third party passcode circuit 158 or by the passcode circuit 109 of the provider computing system 101 and provided to the customer device 2002. The customer ID expiration duration 2204 can indicate the amount of time for which the customer ID 2202 is valid. If the customer ID expiration duration 2204 has elapsed or expired, the third party customer 190 may have to activate the New Payment ID button 2206 to request the generation and delivery of a new customer ID. The find an ATM button 2208 can invoke a new interface, such as for example a map interface that shows the locations of ATMs in relation to the current location of the third party customer 190. The user interface 2200 may also display order details 2210 including the items being purchased by the third party customer 190.

Referring again to the process flow 1900 shown in FIG. 19, the third party customer 190 can approach the transaction machine 1130 and interact (1902) with the user interface on the transaction machine 1130. For example, the user interface circuit 107 can display (1904) the user interface 600 shown in FIG. 6 on the display screen 138 of the transaction machine 1130. The third party customer 190 can select the Pay Bills 602 button to proceed paying the purchase amount (1906). Responsive to the third party customer 190 selecting the Pay Bills button 602, the user interface circuit 107 can provide a user interface that allows the third party customer 190 to select the third party to which a payment is to be made. For example, the user interface circuit 107 can provide the user interface 1400 shown in FIG. 14, which provides a selectable list of companies or third parties to which the third party customer 190 can make a payment. The third party customer 190 may, for example, select company A 1402 that is associated with the third party application or web page on which the purchase is being made. In instances where the transaction machine 130 provide bill pay service to a single third party, the user interface circuit 107 may refrain from displaying the user interface 1400 on the display screen 138.

The user interface circuit 107 can provide a user interface requesting the third party customer 190 to enter a passcode or a customer ID (1908). For example, the user interface circuit 107 can present the user interface 700 discussed above in relation to FIG. 7, where the user interface 700 includes a passcode field 702 in which the third party customer 190 can enter a passcode (1910). The third party customer 190 can enter the payment or customer ID 2202 provided on the customer device 2000, shown in FIG. 22, into the passcode field 702. After entering the customer ID 2202, the third party customer 190 can activate the OK button 704.

Responsive to the third party customer 190 providing the customer ID, the transaction machine 1130 can request payment information from the third party computer system 131 (1912). The request can be similar to the request 1316 discussed above in relation to the flow diagram 1300 shown in FIG. 13. The request 1912 can include the customer ID provided by the third party customer 190. The request may also include identification information of the transaction machine 1130, location information of the transaction machine 1130, authentication information, etc.

The transaction machine 1130 can receive payment information (1914) form the third party computer system 131. The payment information can indicate the amount that is due for the completing the purchase of the order initiated by the third party customer 190 with the third party. The payment information may also include additional information such as the order details, duration of time for which the purchase price is valid, the name or identity of the account held by the third party customer 190 with the third party, the identity of the third party, etc.

Figure 23:
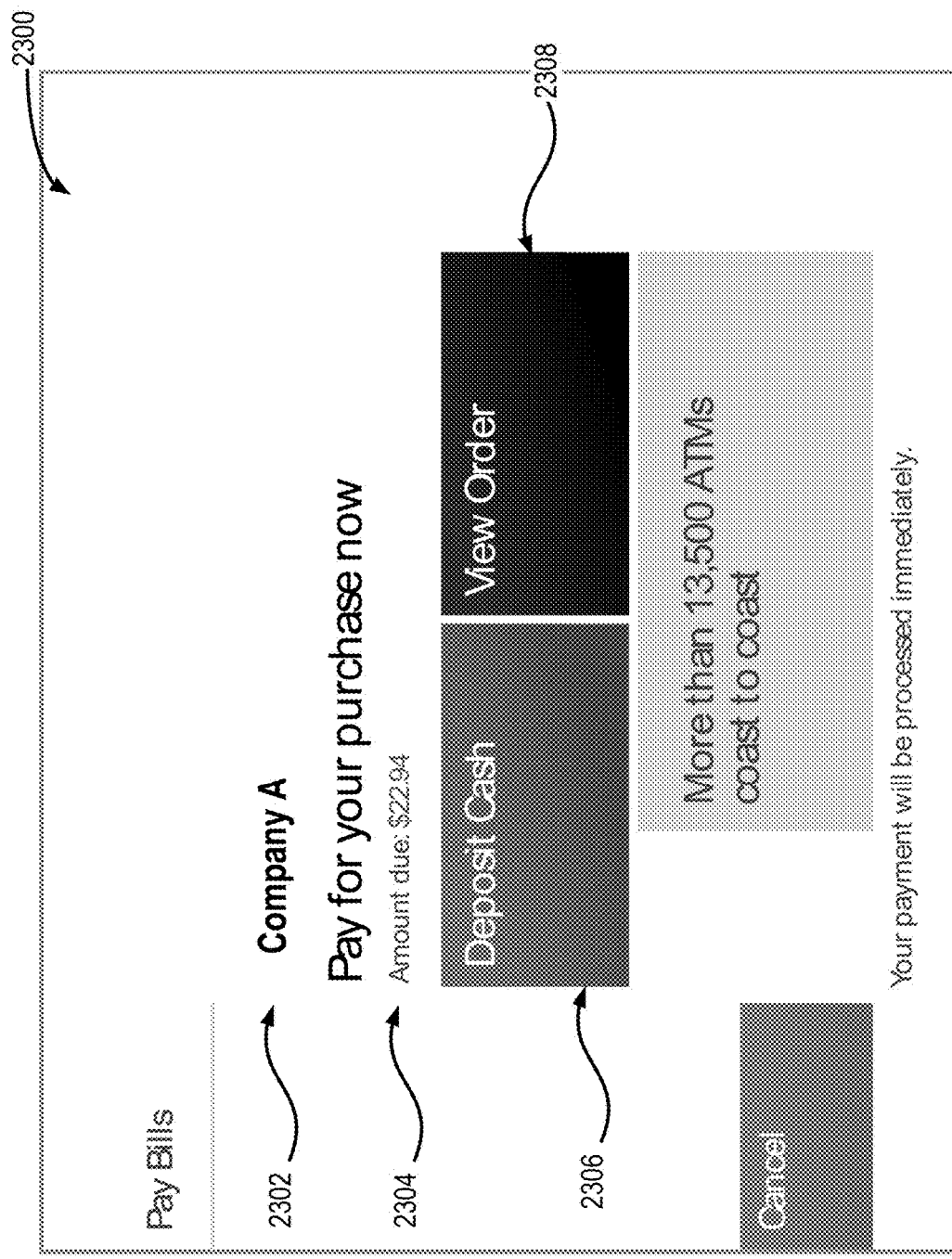
FIG. 23 shows a snapshot of an example user interface showing payment information provided by a transaction machine to the third party customer.

Responsive to receiving the payment information (1914) from the third party computer system 131, the transaction machine 1130 can provide the payment information (1916) to the third party customer 190. For example, the user interface circuit 107 can display a user interface that allows the third party customer 190 to view the payment amount. FIG. 23 shows a screen shot of an example user interface 2300 providing payment information to the third party customer 190. The user interface 2300 can display the name 2302 of the company or the third party from which the third party customer 190 is making the purchase, the amount due 2304, a deposit cash button 2306 and a view order button 2308. The name 2302 of the company can be the name of the company or third party selected by the third party customer 190, such as, for example, customer A selected on the user interface 1400 shown in FIG. 14. The amount due 2304 can indicate the amount due for the purchase initiated by the third party customer 190. The amount due 2304 can match the amount appearing in the order details 2210 on the user interface 2200 shown on the display screen of the customer device 2002 (FIG. 22). The view order button 2308, when activated, can provide the order details received from the third party computer system 131. For example, the order details can include the order details such as the name of the product being purchase, the quantity of the product being purchased, a photograph of the product being purchased, etc. Activation of the deposit cash button 2306 can indicate that the third party customer 190 would like to proceed with the cash payment for the purchase.

Figure 24:
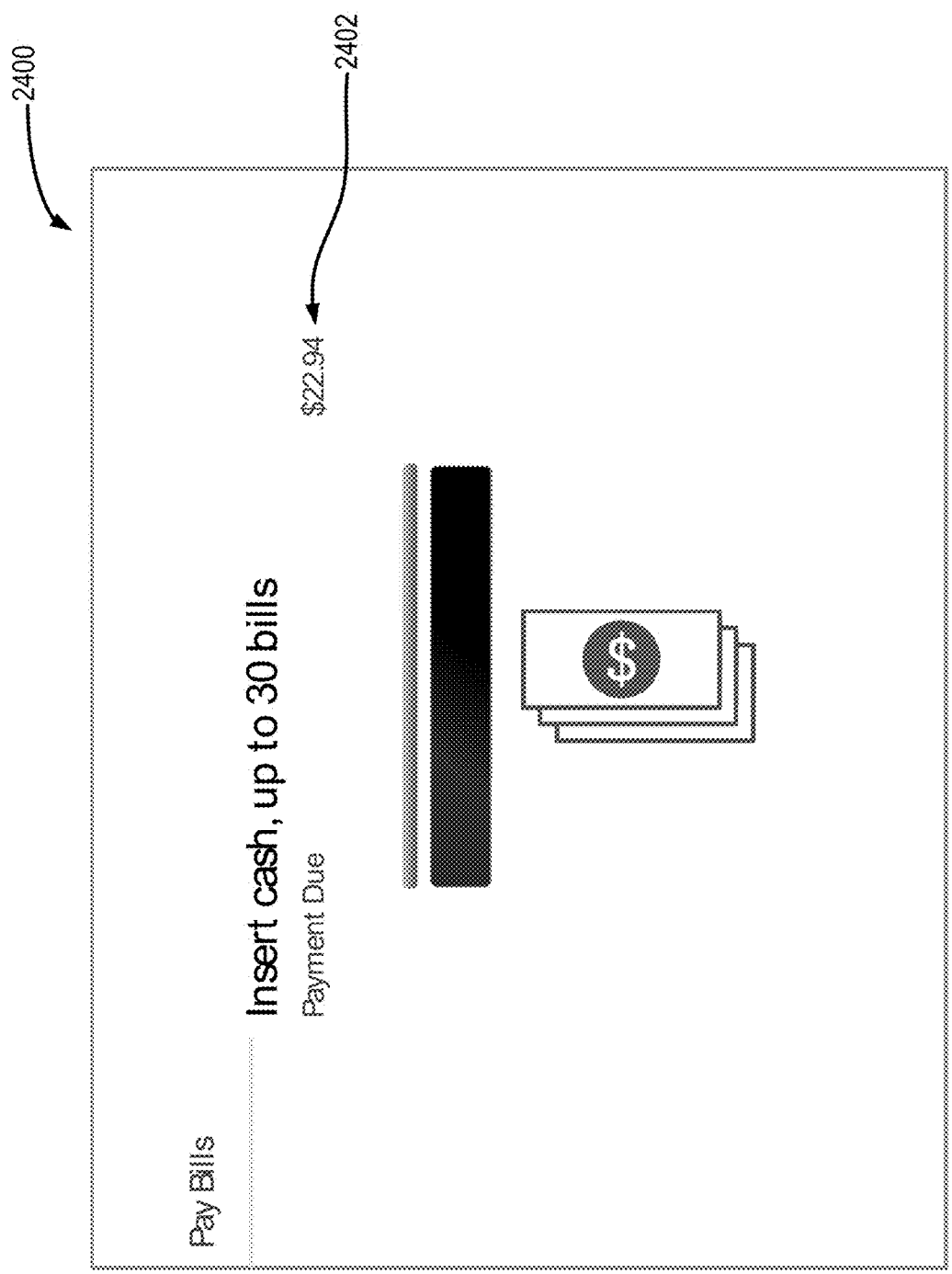
FIG. 24 shows a snapshot of an example user interface providing cash deposit information.

Responsive to the third party customer 190 activating the deposit cash button 2306, the user interface 107 can display cash deposit information on the display screen 138. FIG. 24 shows a snapshot of an example user interface 2400 providing cash deposit information. The user interface 2400 shown in FIG. 24 provides the user instructions for depositing cash in cash deposit mechanism (FIG. 11, 134). For example, the user interface 2400 can display the amount due 2402 as well as instructions on the number of bills that can be inserted into the deposit mechanism 134. Referring again to FIG. 19, the third party customer 190, in response to the transaction machine 1130 displaying bill pay information can make a payment (1918) at the transaction machine 130.

Figure 25:
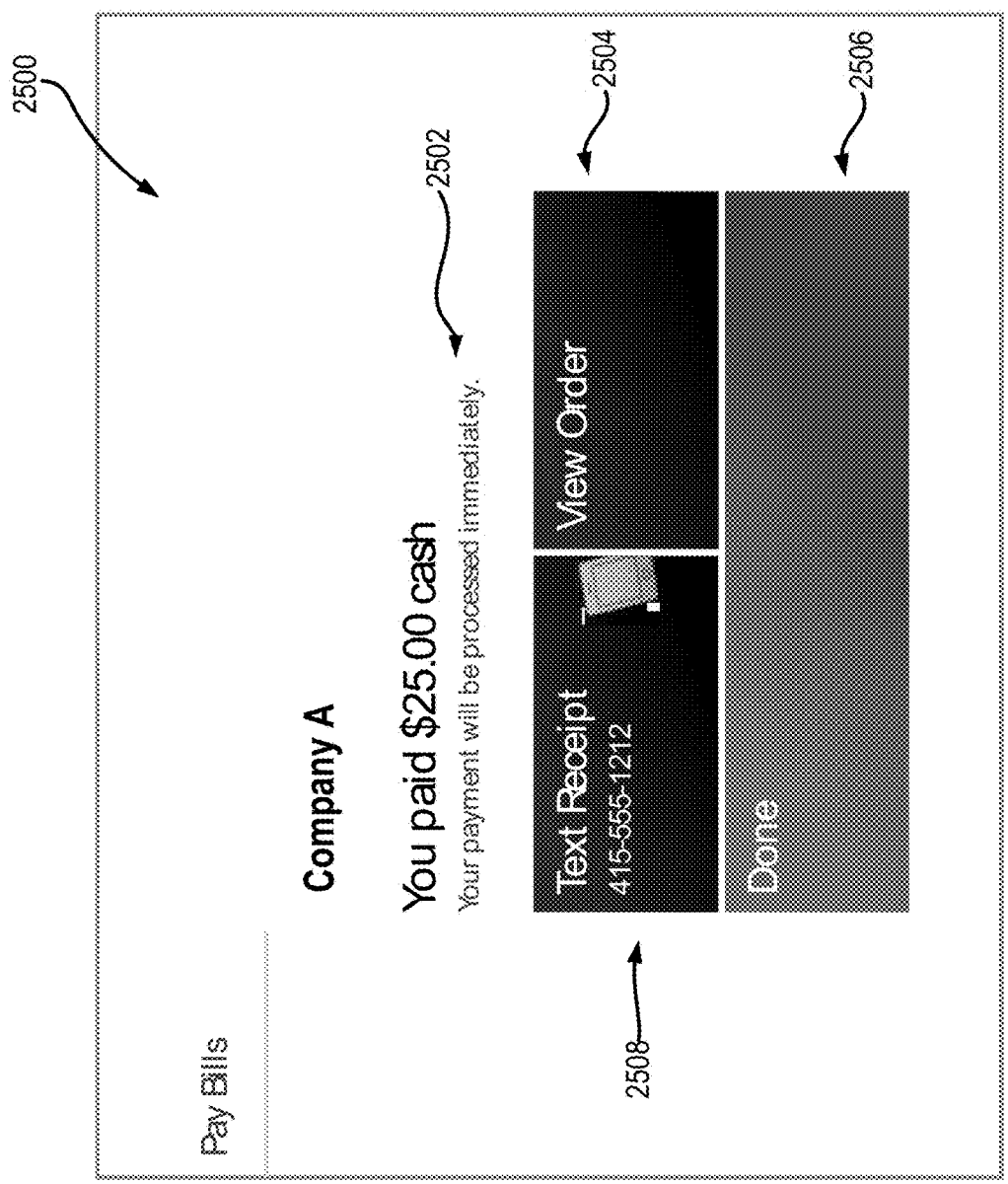
FIG. 25 shows a snapshot of an example user interface providing payment information.

The transaction machine 1130, responsive to receiving the payment from the third party customer 190, can process the payment (1922). For example, the transaction machine 1130 can count the deposited cash and determine if the deposited cash is at least equal to the amount due. The transaction machine 1130 may also provide a notification on the display 138 indicating the amount that was deposited. FIG. 25 shows a snapshot of an example user interface 2500 providing a payment notification information that can be displayed on a display 138 of the transaction machine 1130. In particular, the user interface 2500 can display the amount paid information 2502, and also display selectable buttons such as a text receipt button 2508, a print receipt button 2504, and a done button 2506. Selection of the text receipt button 2508 can cause the receipt generation circuit 144 of the transaction machine 1130 to initiate sending the receipt in a text to a phone number associated with the third party customer 190. The text receipt button 2508 may also display the phone number on record, so that the third party customer 190 can verify the phone number. Selection of the print receipt button 2504 can cause the receipt generation circuit 144 to initiate printing the receipt at a printer on or near the transaction machine 1130. Selection of the done button 2506 can cause the transaction processing circuit 142 to complete the transaction.

The transaction machine 1130 can also send a payment notification (1924) to the third party computer system 131, indicating that the payment was successfully received from the third party customer 190. The payment notification (1924) may also include additional information such as the customer ID associated with the third party customer 190. A notification circuit 156 at the third party computer system 130 can receive the payment notification (1924) and the additional information and update the payment information in the record associated with the third party customer 190 stored in the provider account database 127. For example, the notification circuit 156 can access the database using the customer ID received from the transaction machine 1130 and locate the order associated with the customer ID. The notification circuit 156 can then update order indicate that the payment for the order has been received. In some embodiments, the notification circuit 156 can maintain contact information, such as a phone number, of the third party customer 190. The notification circuit 156, upon receiving the payment notification (1924) from the transaction machine 1130, can send a notification, such as a text message to the cell phone or other device of the third party customer 190 notifying that the payment for the purchase order was received. The notification circuit 156 can include in the notification the amount deposited by the third party customer 190 as well as any credit or any additional amount owed.

In some instances, the third party customer 190 may overpay or underpay the amount due. For example, referring to FIGS. 24 and 25, the third party customer may make a payment of $25 towards an amount due of $22.94. The overpayment or underpayment may be due to the particular cash denominations available to the third party customer 190 at the time of payment and/or the cash denominations accepted by the transaction machine 1130. In the case of underpayment or overpayment, the transaction machine 1130 passes on the amount deposited to the third party computer system 130. The transaction machine 1130 may notify the third party computer system 130 that an overpayment or an underpayment was made, but the transaction machine 1130 does not halt the transaction with the third party customer 190. Instead, the transaction machine 130 completes the transaction of accepting the cash payment, be that for a bill payment or for purchasing items, and notifies the third party computer system 130 the amount of cash deposited, the identification of the deposit (e.g., account number, customer ID, passcode, etc.).

In some instances, such as, for example, in the process flows 1300 and 1900 discussed above in relation to FIGS. 13 and 19, the transaction machine 130 may not store in the long term any information regarding the third party customer 190. For example, the transaction machine 1130, or for that matter the provider computing system 101, may not store in the long term any third party customer information. For example, the transaction machine 1130 may not store the customer ID or the account number provided by the third party customer 190 during the process of depositing cash. In some examples, the transaction machine 130 and the provider computing system 101 may not maintain an account database related to the third party customers 190 of the one or more third parties. The transaction machine 1130 can temporarily store the account number and the customer ID while the transaction is in the process, but delete this information after notifying the third party computer 130 that the cash was deposited. Refraining to store, or deleting, third party customer information 190 can have the technical advantage of improving the performance of the transaction machine 130 or the provider computer system 101. With multiple third parties, and multiple customers associated with each of the third parties, the number of third party customers can be quite large. Storing information for each of these customers can occupy a large amount of space on the data storage system 1125 and 125. This can affect the performance of the data storage system 1125 and 125. The transaction machine 1130 and the provider computing system 101 can instead only temporarily store the customer information until the transaction is complete, and then delete the customer information to free up space on, and improve the performance of, the storage system 1125 and 125.

In some instances, the process flow 1900 shown in FIG. 19 can represent an example bill pay process in which the passcode is static. That is unlike the payment or customer ID 2202 shown in FIG. 22, where the customer ID 2202 had an associated expiration duration 2204, the static passcode may not have an expiration duration, or can have an expiration duration that is substantially longer, such as, for example, a few months, up to the next billing date, etc. This can allow the transmission of the passcode to the user over a medium other than the user interface 2100 of an application shown in FIG. 21. As an example, the passcode can be provided to the user in a payment bill that has the passcode printed on its face. In another example, the passcode can be provided to the user in an email delivered to the user's email address. The user can access the email using an email client that connects to the user's email server. The email client can access an email that includes the passcode. In yet another example, the passcode can be provided to the user on the user's device via a text message (e.g., short message service (SMS)).

The provider computing system 101 can generate the passcode or payment or customer ID and provide the passcode to the third party computer system 131 over a computer network. For example, the passcode circuit 109 discussed above in relation to FIG. 11 can generate the passcode. The passcode also can be stored in the account database 127. In some instances, the provider computing system 101 can transmit the generated passcode to the transaction machine 1130. The transaction machine 1130 can store the passcode in the account database 1127.

Figure 26:
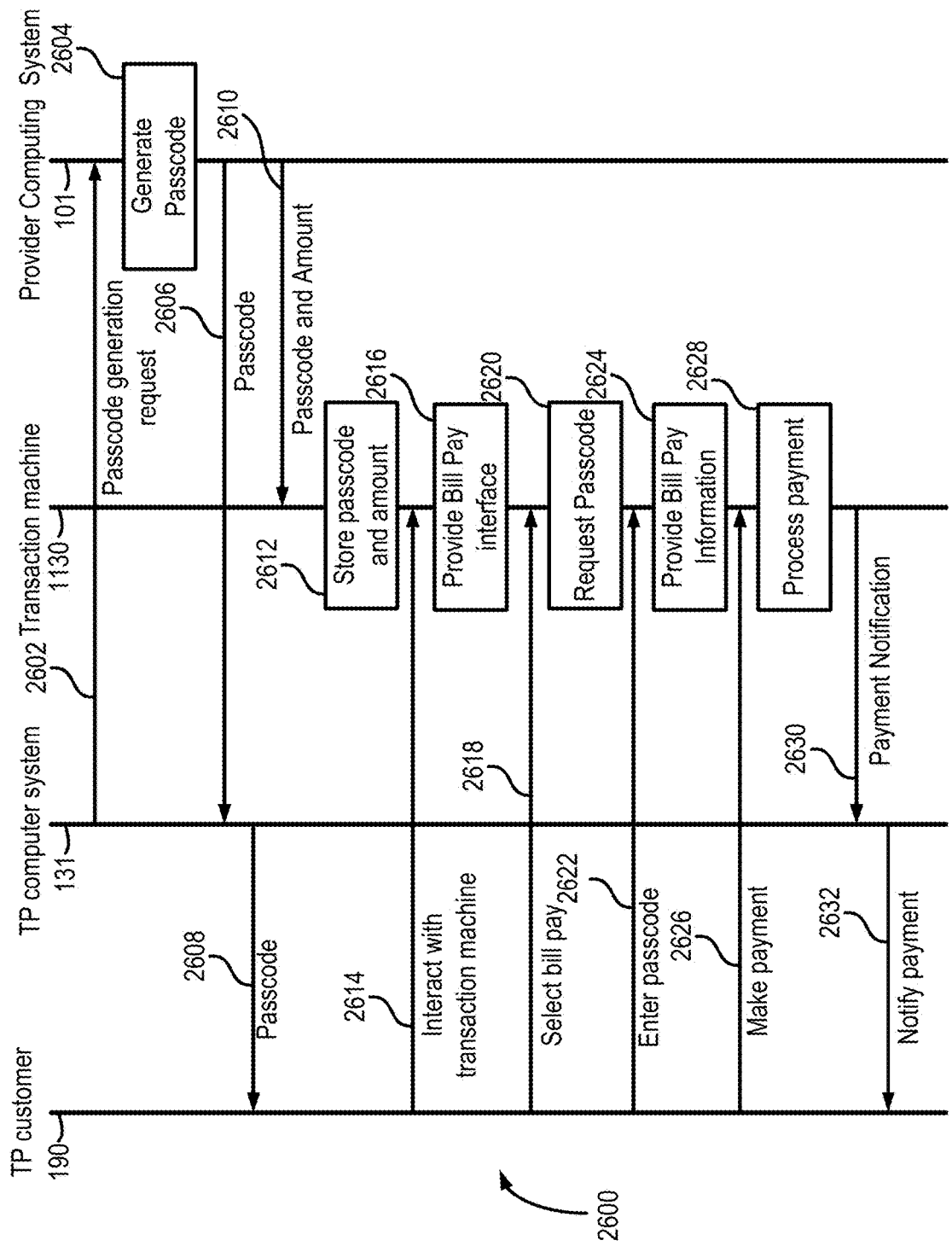
FIG. 26 shows a process flow for an example bill pay process.

FIG. 26 shows a process flow 2600 for an example bill pay process. The process flow 2600 depicts an example bill pay process that provides the user with passcode and allows the user to select an amount of a payment that the user expects to make at the transaction machine 1130. As discussed below, the transaction machine 1130 can utilize the passcode and the selected amount to verify the transaction.

FIG. 27 shows an example screenshot of a user interface 2700 shown on a customer device 2702. The user interface 2702 can represent a user interface displayed on the display screen of the customer device 2702 during the process of viewing a bill. In particular, the user interface 2700 can display account information associated with an account held by the user with a third party associated with the third party computer system 131. The third party computing system 131 can transmit information to the customer device 2702 for display on the user interface 2702. The information can include, for example, a current bill amount 2704, which is displayed one the display screen of the customer device 2702. The user interface 2700 can further include user inputs, such as "Pay bill" button 2706, a "Pay now with cash" button 2708, and "Find an ATM" button 2710. The "Pay bill" button 2706 can allow the user to make payments over the customer device 2702, such as for example, using a credit card or other electronic payment system. However, the user interface 2702 can also allow the user to make payments in cash at an ATM. For example, the user can select the "Pay now with cash" button 2708 to indicate that the user wishes to make a payment at an ATM. The user may also click on the "Find an ATM" button 2710, in response to which, the user interface 2700 can display a list of ATMs near the user's location that are authorized to accept cash for bill payment.

Responsive to the user selecting the "Pay now with cash" button 2708, the customer device 2702 can display a user interface 2800 on the display screen of the customer device 2702. The user interface 2800 can allow the user to select the amount of cash that the user expects to deposit at an ATM. For example, the user interface 2800 can include an amount field 2802 that can display a payment amount. In addition, the user interface 2800 can include "+" and "−" buttons 2804 and 2806, which the user can use to increase or decrease the amount displayed in the amount field 2802. The user interface 2802 also can display the amount due, which in the example shown in FIG. 28, includes the amount $48.18. In some examples, an ATM may accept cash in the form of bills only and may not accept coins. Thus, the user may not be able to deposit an amount that includes fractions of a dollar, such as $0.18. Thus, the user can select an amount that is greater than the amount due, and that can be rendered in bills. For example, user can click on the "+" button 2804 to increase the amount to $50. Once the amount is set by the user, the user can select the "Get access code" button 2808 to request a passcode.

Referring to FIG. 26, responsive to receiving the request for a passcode from the customer device 2702, the third party computing system 131 can send a request to the provider computing system 101 to generate the passcode (2602). For example, the third party passcode circuit 158 of the third party computing system 131 can generate and send a request 2602 to the provider computing system 101 to generate a passcode. In some examples, the request 2602 can include a unique identifier associated with the third party customer or user operating the customer device 2702.

Responsive to receiving the passcode generation request 2602 from the third party computing system 131, the passcode circuit 109 of the provider computing system 101 can generate a passcode 2604. In one or more embodiments, the provider passcode circuit 109 can include a pseudo-random number generator for generating a random number. In one or more embodiments, the random number can be of a substantially long length, such as, for example, between about 32 bits to about 256 bits. The provider passcode circuit 109 can use the random number as the passcode. In one or more embodiments, the provider passcode circuit 109 can include an encryption engine to generate the passcode based on an encryption algorithm, such as for example AES, a hash algorithm, or other encryption algorithms. In one or more embodiments, the encryption engine may use, in part, customer information received with the passcode generation request 2602 to generate the passcode. In one or more embodiments, the provider passcode circuit 109 may transform the random number or the output of the encryption engine into another number to use as a passcode. For example, the provider passcode circuit 109 can transform binary numbers into decimal numbers, alphabets, or alphanumeric characters.

In some embodiments, the passcode circuit 109 may assign a lifetime to the generated passcode. In some examples, the request 2602 received from the third party computing system 131 can include information regarding the lifetime of the passcode to be generated. As discussed above, the passcode can be a static passcode or have a substantially long lifetime, such as for example, a month, a next billing period, etc. The passcode circuit 109 can assign a lifetime based on the lifetime information received from the third party computing system 131.

In one or more embodiments, the provider passcode circuit 109 may store the generated passcode in the provider account database 127 (FIG. 11). The account management circuit 103 can create a record associated with the registered third party customer 190. The provider passcode circuit 109 can use the customer information received with the passcode generation request 2602 to access the record associated with the third party customer 190, and store the generated passcode.

Figure 29:
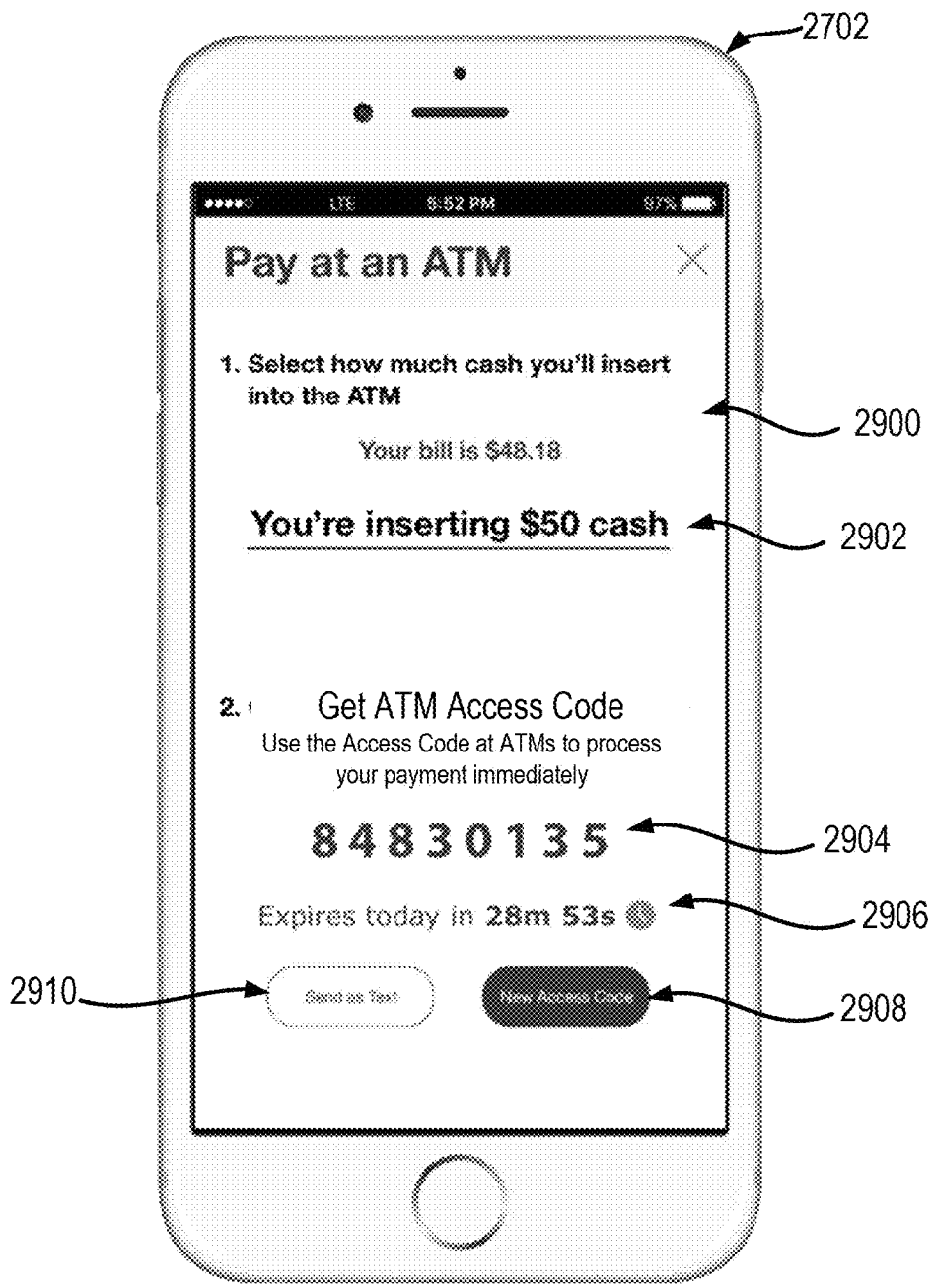
FIG. 29 shows a screenshot of a user interface shown on a customer device providing the user with a passcode.

The provider computing system 101 can transmit the generated passcode to the third party computing system 131 (2606). The third party computing system 131 can, in turn, transmit the passcode to the customer device 2702 (2608). For example, FIG. 29 shows a user interface 2900 presented on a display screen of the customer device 2700. The user interface 2900 can be presented responsive to receiving a passcode from the third party computing system 131. The user interface 2900 can display the passcode 2904 as well as a lifetime 2906 associated with the passcode 2904. The user interface 2900 can also display the payment amount selected by the user on the user interface 2800 shown in FIG. 28. The payment amount displayed can inform the user that the user has selected the displayed payment amount as the amount that the user plans on depositing at the ATM for the due bill amount. The user interface 2800 also can display a "New Access Code" button 2908, which when pressed by the user, can send a request to the third party computing system 131 to generate a new passcode. The user interface 2800 can also include a "Send as Text" button, which when activated by the user, can send a request to the third party computing system 131 to send the passcode via an SMS text.

In some examples, the third party computing system 131 may also send the user selected payment amount to the provider computing system 101. For example, the third party computing system 131 can transmit the amount selected by the user on the interface 2800 shown in FIG. 28. The third party computing system 131 can transmit the user selected amount to the provider computing system 101 along with the request for passcode 2602. In some examples, the third party computing system 131 can transmit the user selected amount to the provider computing system 101 in a separate communication. The provider computing system 101 can store the user selected amount in association with the passcode in the provider account database 127. In some instances, the provider computing system 101 can transmit at least a portion of the information stored in the provider account database 127 associated with a third party customer to the transaction machine 1130 (2610). For example, the provider computing system 101 can transmit the passcode and the user selected amount to the transaction machine 1130, which can store the passcode and the user selected amount in the transaction machine account database 1127 (2612).

Figure 30:
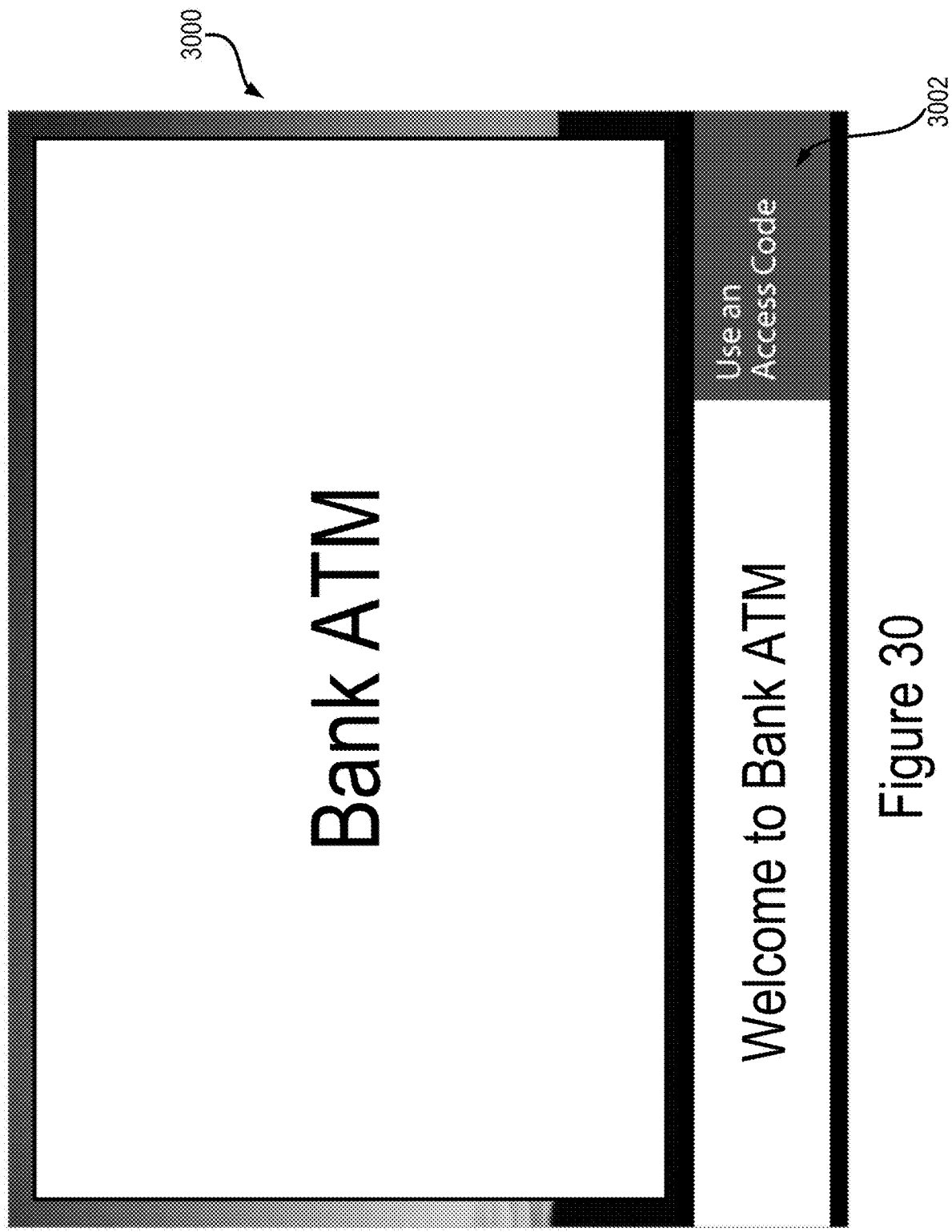
FIG. 30 shows a screenshot of a user interface shown at a transaction machine.

The user can approach and interact with the transaction machine 1130 (2614). In response to the user's interaction with the transaction machine 1130, the user interface circuit 107 can display (2616) a bill pay interface 3000 shown in FIG. 30 on the display screen 138 of the transaction machine 1130. For example, the bill pay interface 3000 can include a "Use an Access Code" button 3002, which the user can click to initiate the bill pay using an access code (FIG. 26, 2618). Responsive to the user selecting the "Use and Access Code" button 3002, the user interface circuit 107 can provide a user interface that allows the user to enter the access code.

Figure 31:
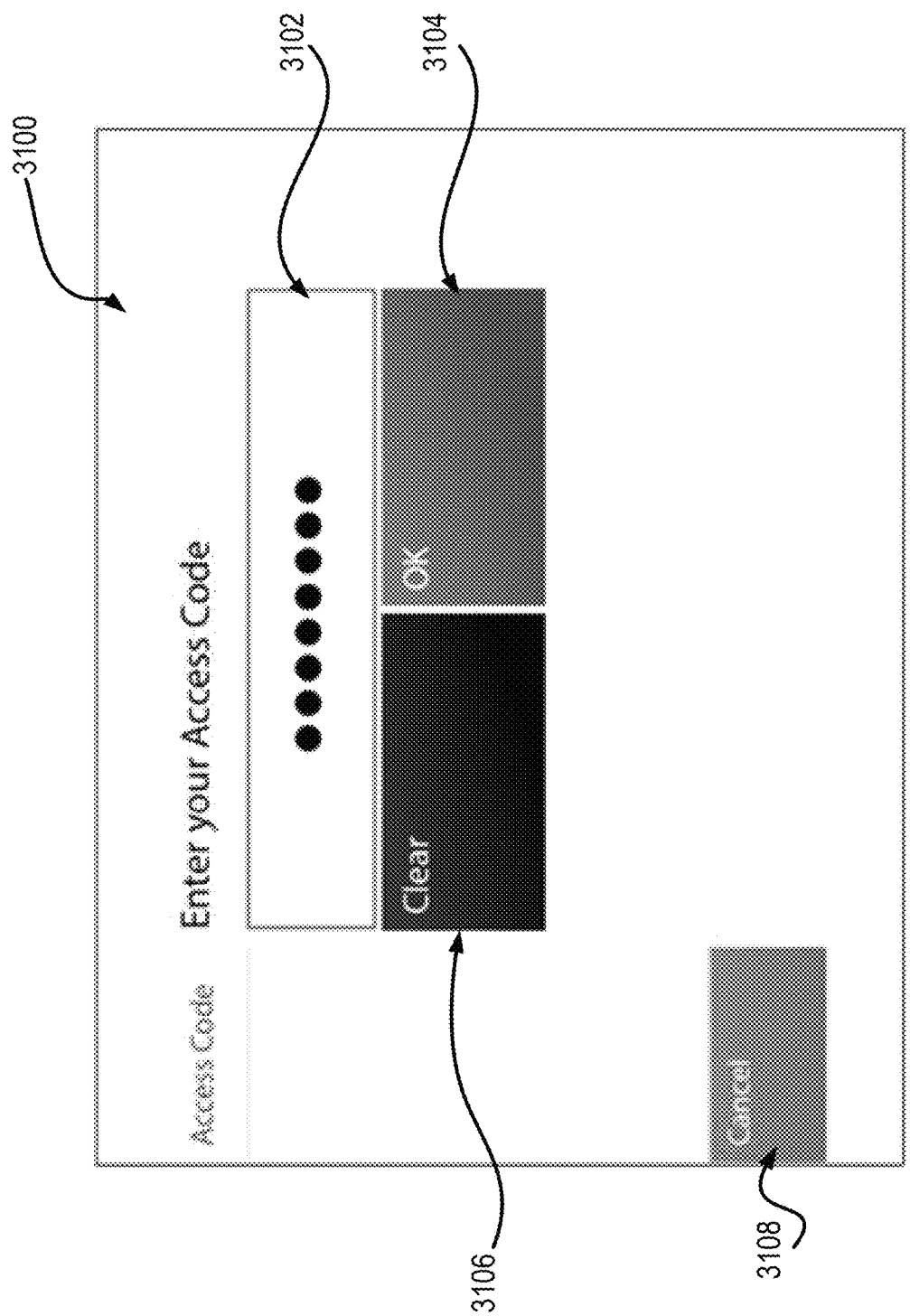
FIG. 31 shows a screenshot of a user interface shown at a transaction machine allowing the user to enter a passcode or an access code.

FIG. 31 shows a screenshot of an example user interface 3100 for requesting a passcode (FIG. 26, 2620). The user interface circuit 107 can display the user interface 3100 on the display screen 138 of the transaction machine 1130. The user interface 3100 can include a passcode field 1302 where the user can enter the passcode, a selectable OK button 3104, the activation of which can indicate to the transaction machine 1130 to accept the entered passcode, a selectable Clear button 3106, which can allow the user to clear the contents of the passcode field 1302. While not shown in FIG. 31, the transaction machine 1130 can include a keypad, which the user can use to enter the passcode in the passcode field 3102.

Figure 32:
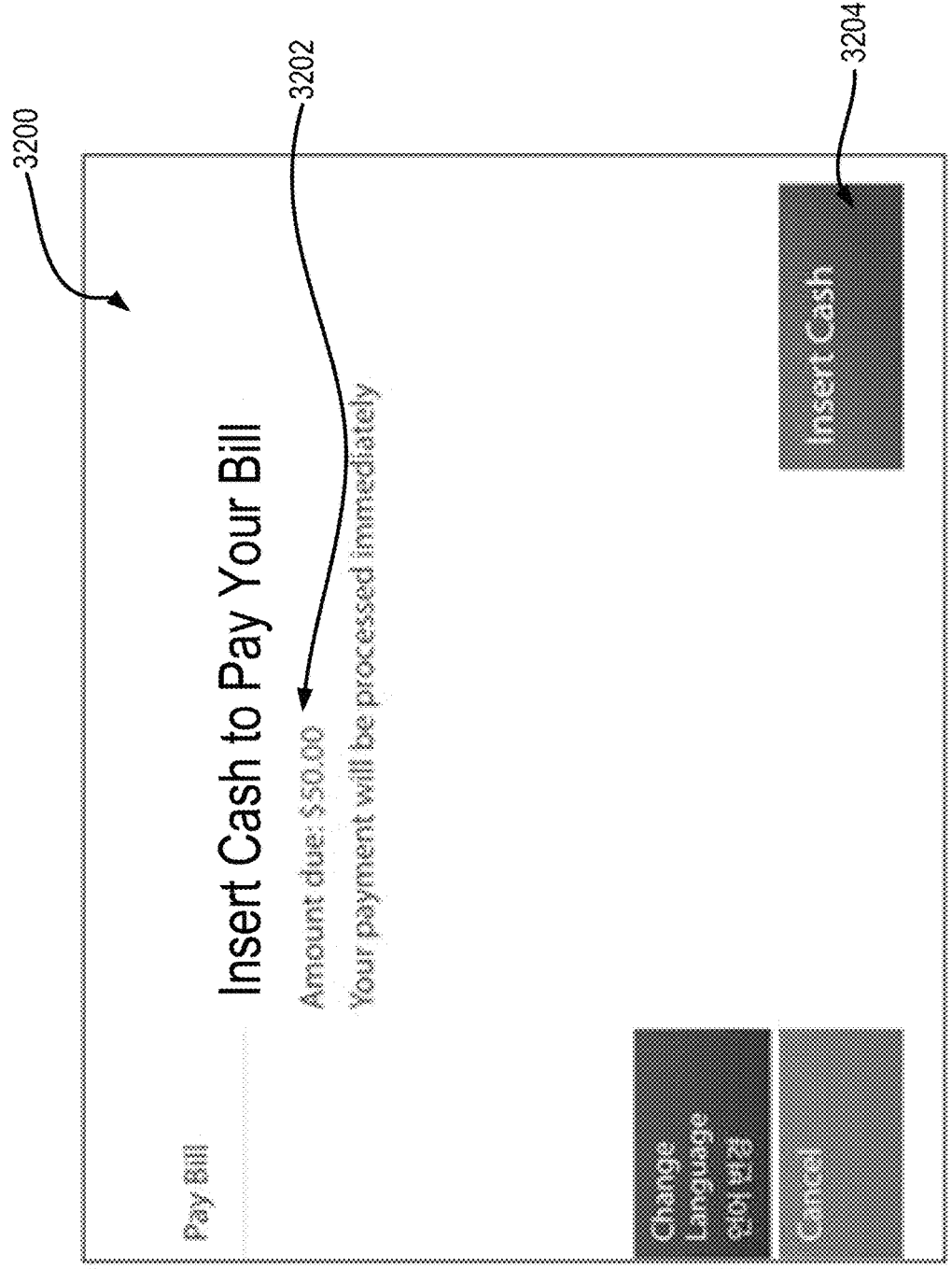
FIG. 32 shows a screenshot of a user interface shown at a transaction machine providing the user with information about the user selected amount to be deposited at the transaction machine.

Referring to FIG. 26, the user can enter the passcode in the passcode field 1302 of the user interface 3100 (2622). For example, the user can enter the access code 2904 provided to the user on the user interface 2900 on the user device 2702 shown in FIG. 29. Responsive to the user entering the passcode, the transaction processing circuit 142 can access the transaction machine account database 1127 to access a database entry associated with the passcode. If an entry exists, the transaction processing circuit 142 can access and provide the user selected amount to the user interface circuit 107 for display. For example, the user interface circuit 107 can generate a user interface 3200 shown in FIG. 32, which includes an "Amount due" field 3202, in which the user selected amount is displayed (FIG. 26, 2624). As an example, the amount displayed in the "Amount due" field 3202 can be the same as the user selected amount appearing in the amount field 2802 on the user interface 2800 displayed on the user device 2702 shown in FIG. 28. The user interface 3200 can also include an "Insert Cash" button 3204, which the user can activate to begin the process of inserting cash into the transaction machine. For example, the user may verify that the amount displayed in the "Amount due" field 3202 is the appropriate amount, and then proceed to activating the "Insert Cash" button 3204.

In some instances, the transaction machine 1130 can communicate with the third party computer system 131 to retrieve the user selected amount. This process step can be carried out in cases where the transaction machine 1130 does not receive the user selected amount from the provider computing system 101 in the communication 2610 shown in FIG. 26. The transaction machine 1130 can request payment information from the third party computing system 131 and in response receive payment information from the third party computing system 131 similar to the process steps 1912 and 1914 shown in FIG. 19. However, the payment information received from the third party computing system 131 can indicate the user selected amount. The transaction processing circuit 142 can communicate with the third party computing system 131 to request and receive the payment information. The transaction processing circuit 142 also can store the user selected amount in the transaction machine account database 1127 in association with the passcode. The user interface circuit 107 can include the user selected amount received from the third party computing system 131 in the "Amount due" field 3202 of the user interface 3200 shown in FIG. 32.

Figure 33:
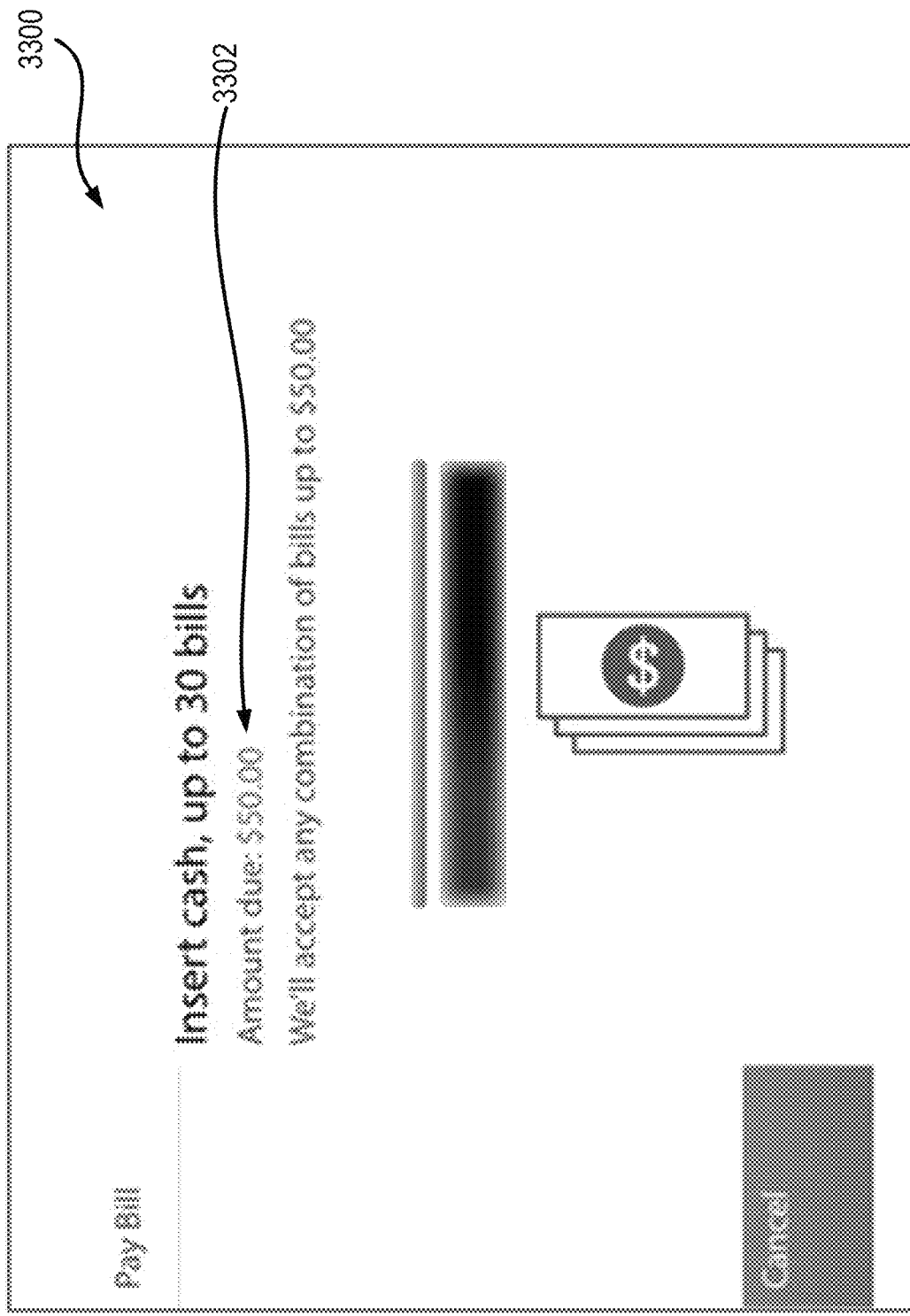
FIG. 33 shows a screenshot of a user interface shown at a transaction machine providing deposit information.

Responsive to the user activating the "Insert Cash" button 3204 on the user interface 3200, the user interface circuit 107 can generate and display a user interface 3300 on the display 138 of the transaction machine 1130, an example of which is shown in FIG. 33. The user interface 3300 can provide cash deposit information to the user. For example, as shown in FIG. 33, the user interface 3300 can display the amount due 3302, as well as instructions on the number of bills that can be inserted into the deposit mechanism 134. The deposit mechanism 134 can also open the deposit slot through which the user can insert cash.

Figure 34:
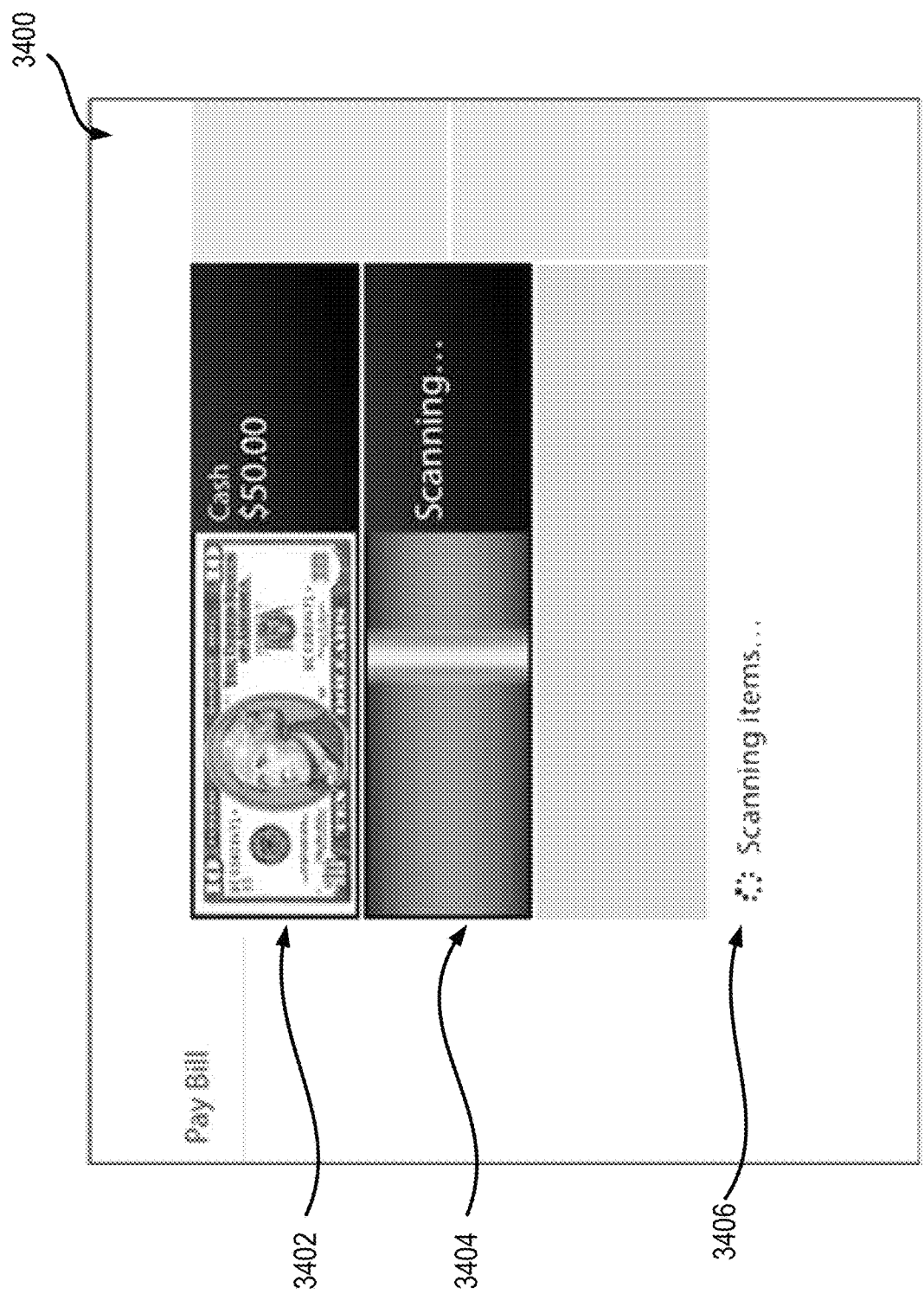
FIG. 34 shows a screenshot of a user interface shown at a transaction machine providing information about the denominations of bills being scanned by the transaction machine.
Figure 35:
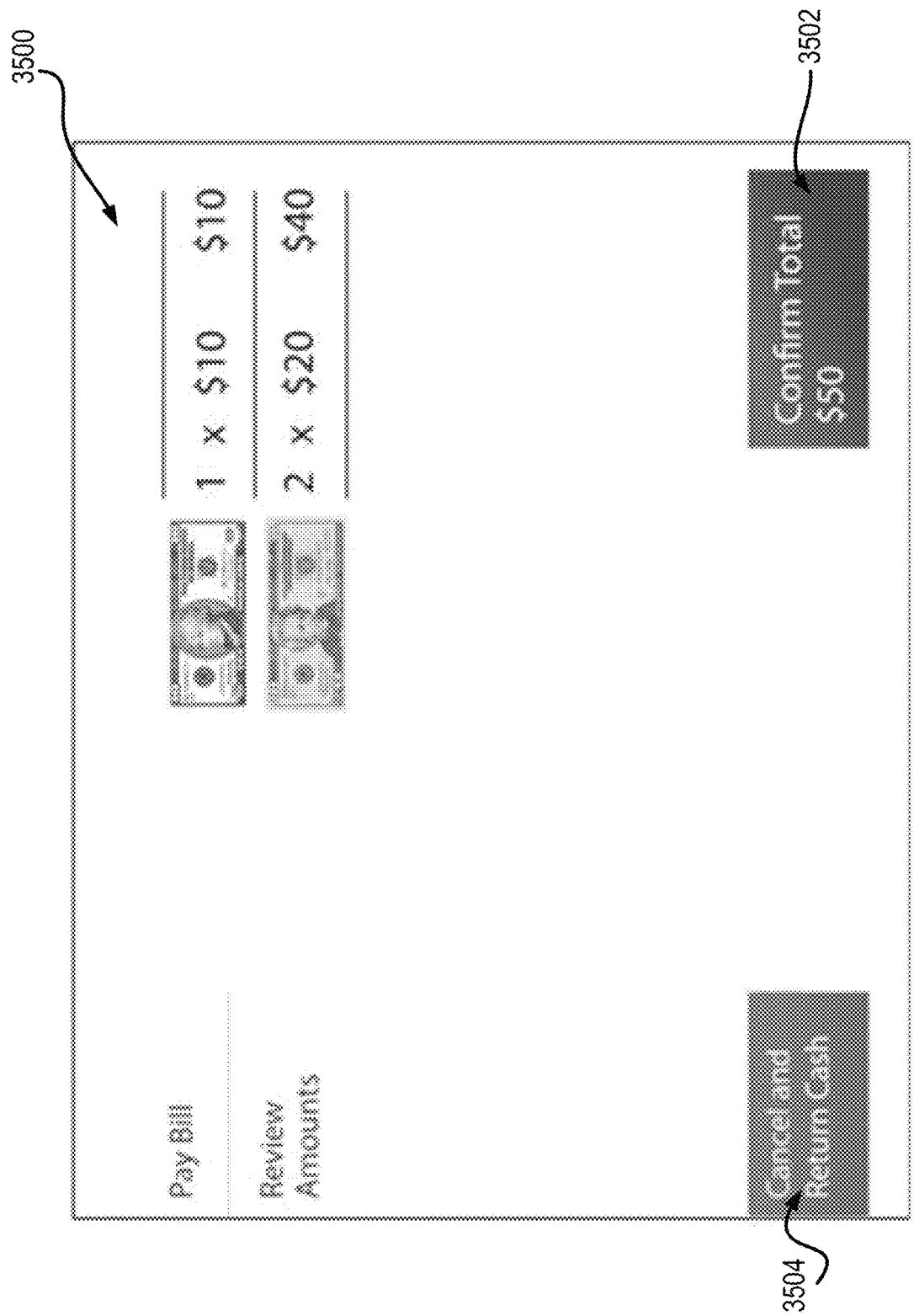
FIG. 35 shows a screenshot of a user interface shown at a transaction machine providing a list of denominations of bills verified by the transaction machine.

Responsive to the user inserting cash into the deposit mechanism 134 (FIG. 26, 2626), the user interface circuit 107 can display a user interface showing the progress of scanning the bills inserted by the user. For example, FIG. 34 shows a user interface 3400 that displays the progress of scanning the bills inserted by the user. The user interface 3400 can display an image 3402 of a denomination of a bill that the deposit mechanism 134 has scanned and verified. The user interface 3400 also can show images 3404 and 3406 indicating that the deposit mechanism 134 is scanning and verifying additional bills inserted by the user.

Once all the bills inserted by the user are scanned and verified by the deposit mechanism 134, the user interface circuit 107 can display a user interface 3500 on the display 138 listing the denominations of the bills inserted by the user, the number of bills of each denomination, and the total amount. The user interface 3500 also can include a "Confirm Total" button 3502, which indicates the total amount that the deposit mechanism 134 has verified. An actuation of the "Confirm Total" button 3502 can indicate that the user confirms the total amount displayed on the user interface 3500 is the amount inserted by the user. The user interface 3500 also includes a "Cancel and Return Cash" button 3504, the actuation of which by the user, can indicate to the deposit mechanism 134 that the user wishes to cancel the transaction and would like for the bills previously inserted to be returned to the user. The deposit mechanism 134 in response can return the bills through the currency dispenser 132 of the transaction machine 1130.

If the transaction processing circuit 142 identifies that the amount deposited by the user does not match the selected amount, the transaction processing circuit 142 can generate a user interface (not shown) indicating as such to the user. The user may then be given the opportunity to deposit additional bills such that the deposited cash matches the user selected amount. In case the user is unable to deposit the amount of cash matching the user selected amount, the transaction processing circuit can decline processing the bill pay transaction, and notify the third party computing system 131 that the user associated with the passcode was unable to deposit the user selected amount, and that the transaction was therefore unsuccessful. The transaction processing circuit 142 may also notify the third party computing system 131 of an unsuccessful transaction if the user actuates the "Cancel and Return Cash" button 3504.

Figure 36:
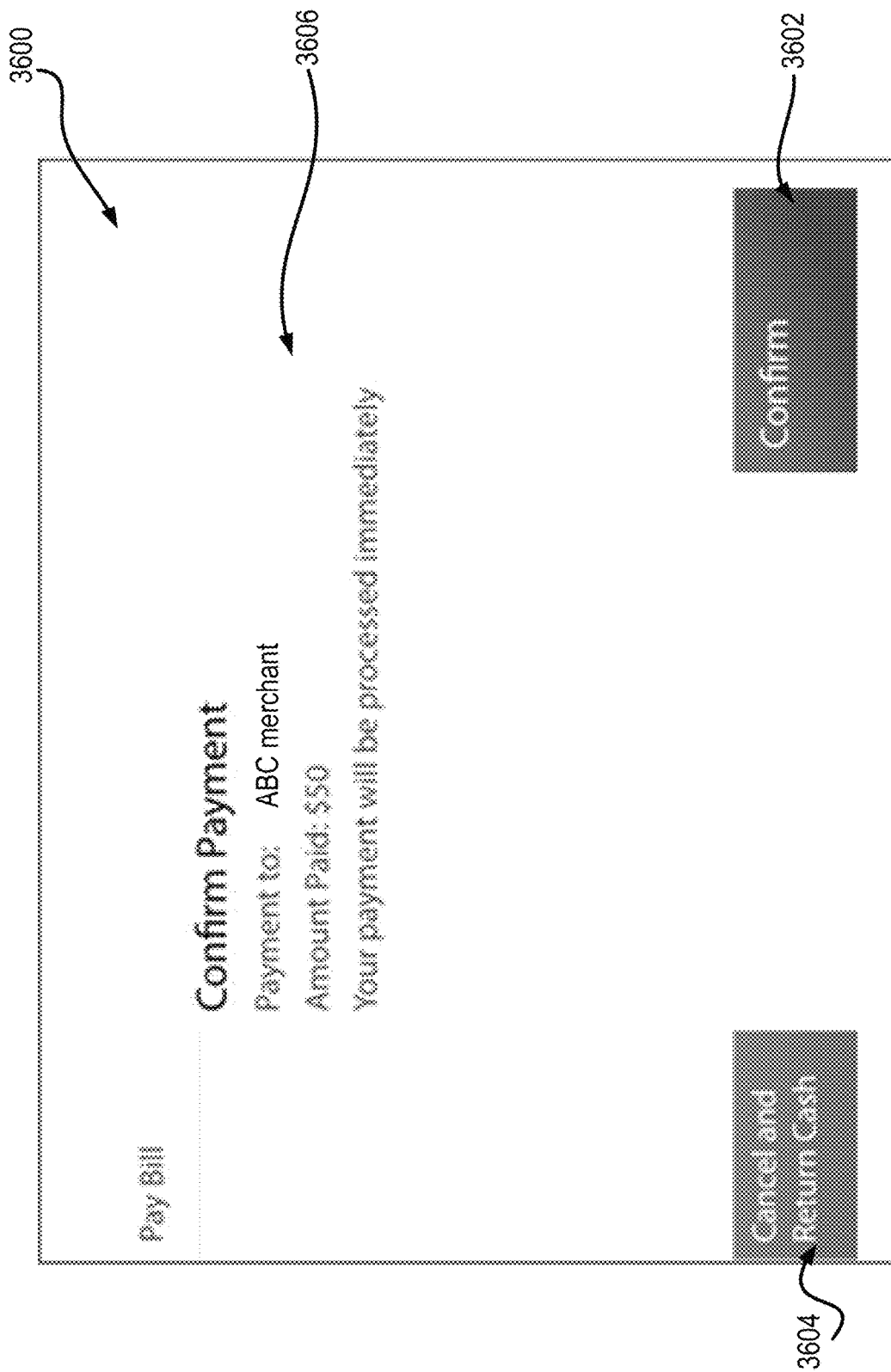
FIG. 36 shows a screenshot of a user interface shown at a transaction machine providing the user deposit information including a name of the bill pay recipient and the amount deposited.

Responsive to the user actuating the "Confirm Total" button 3502, the user interface circuit 107 can display a user interface 3600 shown in FIG. 36 on the display 138 of the transaction machine 1130. The user interface 3600 can display bill pay information 3606 including the name of the merchant to which the payment was made and the amount paid. The user interface 3600 may also include a "Confirm" button 3602 and a "Cancel and Return Cash" button 3604. The actuation of the "Confirm" button 3602 can indicate that the user confirms the information displayed on the user interface 3600 to be correct.

Responsive to the user actuating the "Confirm" button 3602, the transaction processing circuit 142 can process the payment (FIG. 26, 2628). In particular, the transaction processing circuit 142 can send a notification (FIG. 26, 2630) to the third party computing system 131 that a user has deposited cash for a bill payment. The notification 2630 can include information stored in the transaction machine account database 1127 associated with the processed payment. For example, the notification can include the passcode entered by the user and the amount deposited by the user. In some instances, the transaction machine 1130 can also send a notification to the provider computing machine 101 indicating that the user associated with the passcode has deposited cash at the transaction machine, where the notification can include the amount deposited. The third party computing machine 131 can, in turn, notify (2632) the user that the payment was successfully received. For example, the third party computing system 131 can send a text, email, or a message on a third party application installed on the user computing device.

Figure 37:
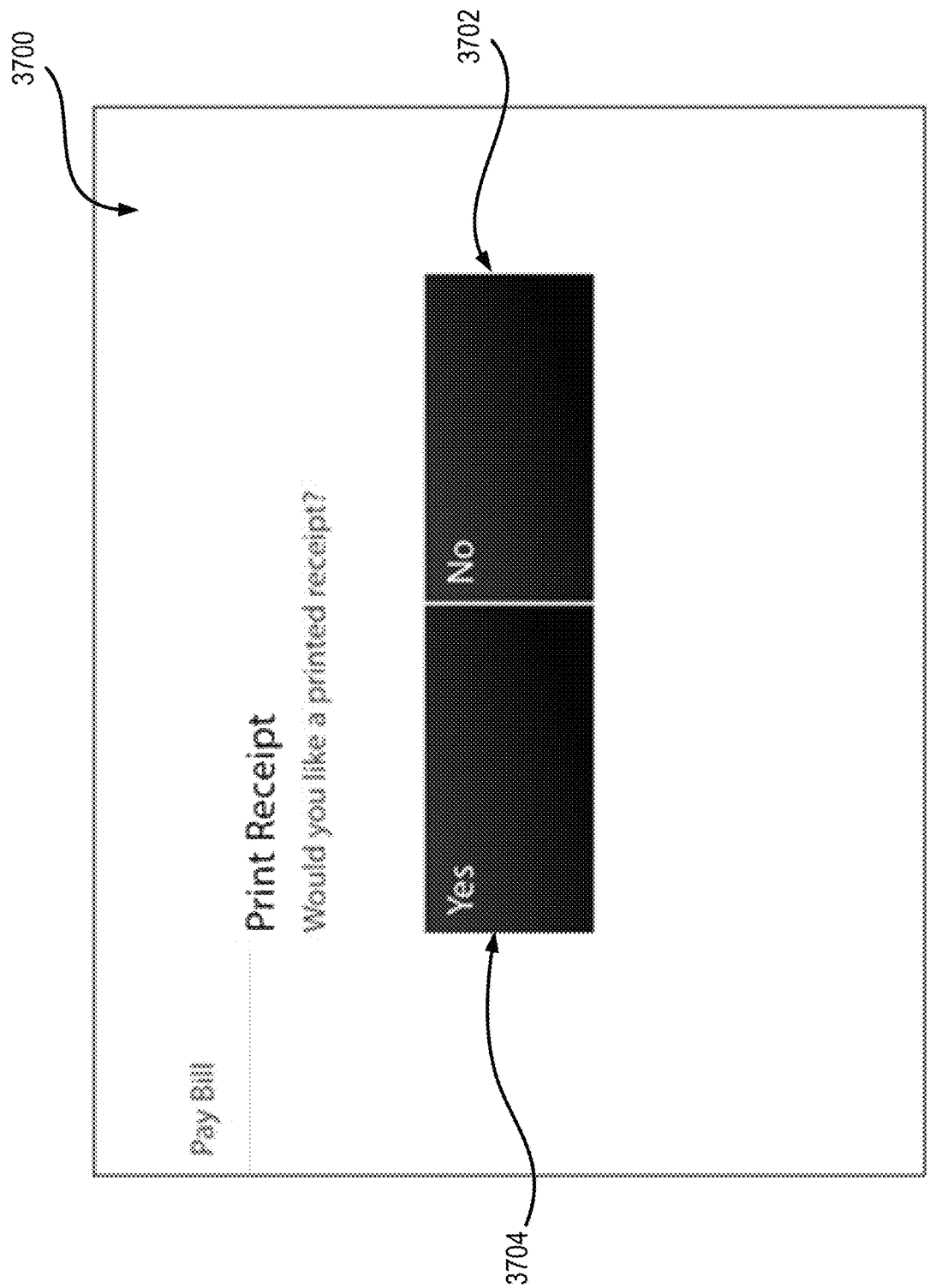
FIG. 37 shows a screenshot of a user interface shown at a transaction machine providing the user an option to request for a receipt.

Also, responsive to the user actuating the "Confirm" button 3602 on the user interface 3600 shown in FIG. 36, the user interface circuit 107 can generate and display on the display 138 the user interface 3700 shown in FIG. 37. The user interface 3700 can allow the user to print a receipt for the deposit. For example, the user interface 3700 can include a "Yes" button 3704, the actuation of which can indicate to the user interface 107 that the user would like to receive a receipt. The user interface 3700 also can include a "No" button 3702, the actuation of which can indicate that the user does not need a receipt.

Figure 38:
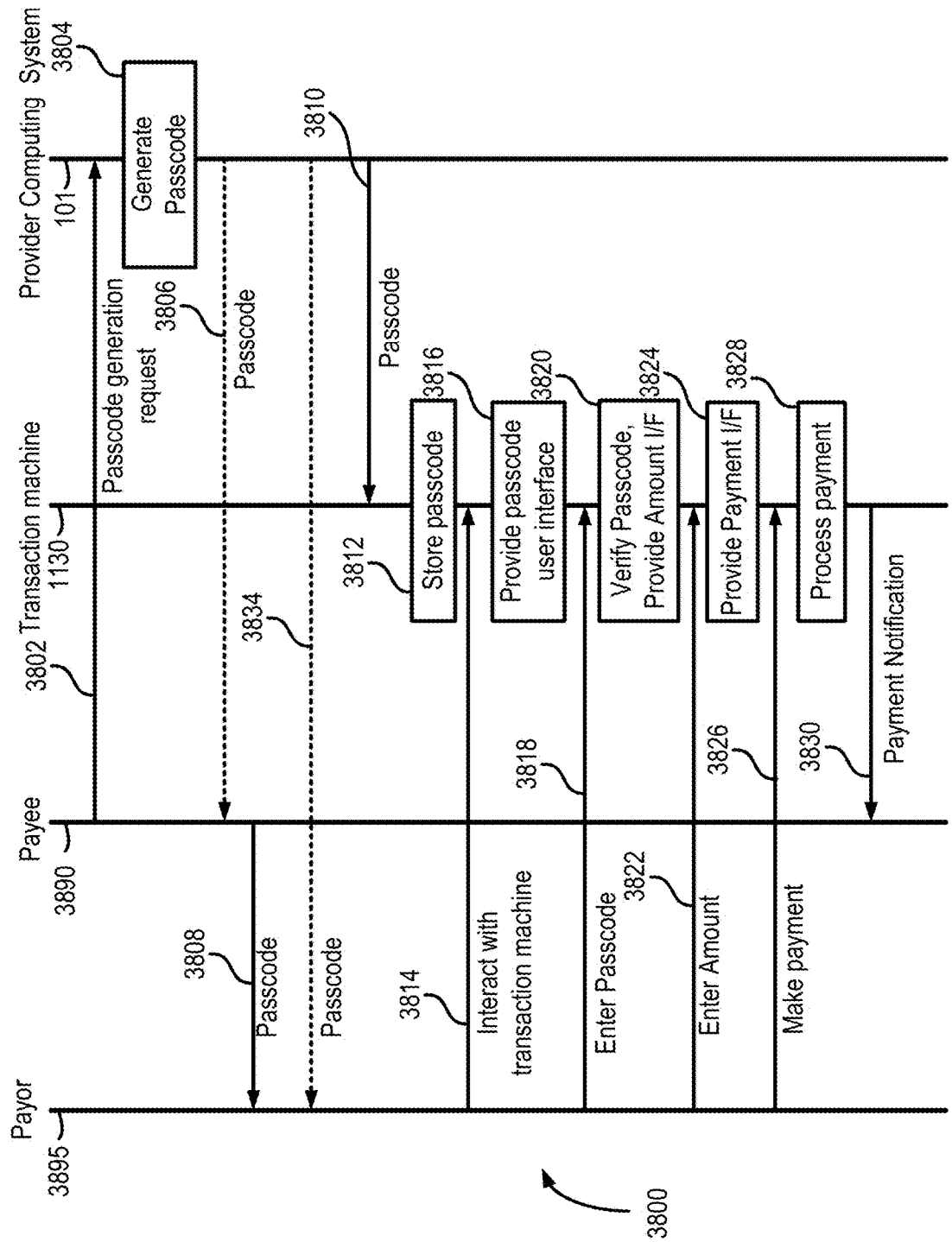
FIG. 38 shows a process flow for an example payor to payee or person to person payment process.

FIG. 38 shows a process flow 3800 for an example payor 3895 to payee 3890 or person to person payment process. The process flow 3800 depicts an example payment process that provides the payor 3895 to make a payment to the payee 3890 at the transaction machine 1130. As discussed below, the transaction machine 1130 can utilize the passcode to verify the payment transaction.

The process flow 3800 includes the provider computing system 101 receiving a request to generate a passcode (3802). This process step is similar to the process step 2602 for requesting generation of a passcode discussed above in relation to FIG. 26. However, in the process step 2602, the request for the generation of the passcode was generated by a third party computer system 131. In contrast, in the process stage 3802, the request for the generation of the passcode can be received from the payee 3890. The payee 3890 can be an individual or a corporation. The user interface circuit 107 (FIG. 11) of the provider computing system 101 can provide the payee a user interface to request the generation of the passcode. In some examples, the user interface circuit 107 can provide a web interface to a payee 3890 device over which the payee can request the generation of the passcode. In some examples, the user interface circuit 107 can receive the request over a text message over the network from the payee 3890 device. In some other examples, the user interface circuit 107 can provide an automated phone voice response system to receive a request for the generation of the passcode over a payee 3890 phone.

In some examples, the request for the generation of the passcode can be received from a payee that is an individual. The account management circuit 103 of the provider computing system 101 can establish, if not already existing, an individual account associated with the payee 3890. The request 3802 can include an identity or account number of the payee 3890, which the provider computing system 101 can use to access or determine the existence of an account in the account database 127. In some examples, the request can be received from a merchant. The merchants can include, for example, event ticket vendors, local produce vendors, or other small business owners. Such payees may not be sophisticated enough to maintain computing resources, such as a third party computing system 131, but can still request passcode based transactions using personal computing devices or workstations.

Responsive to receiving the request to generate a passcode, the provider computing system 101 can generate a passcode (3804). In one or more embodiments, the provider passcode circuit 109 (FIG. 11) can include a pseudo-random number generator for generating a random number. In one or more embodiments, the random number can be of a substantially long length, such as, for example, between about 32 bits to about 256 bits. The provider passcode circuit 109 can use the random number as the passcode. In one or more embodiments, the provider passcode circuit 109 can include an encryption engine to generate the passcode based on an encryption algorithm, such as for example AES, a hash algorithm, or other encryption algorithms. In one or more embodiments, the provider passcode circuit 109 may transform the random number or the output of the encryption engine into another number to use as a passcode. For example, the provider passcode circuit 109 can transform binary numbers into decimal numbers, alphabets, or alphanumeric characters.

In some embodiments, the passcode circuit 109 may assign a lifetime to the generated passcode. In some examples, the request 3802 received from the payee 3890 can include information regarding the lifetime of the passcode to be generated. As discussed above, the passcode can be a static passcode or have a substantially long lifetime, such as for example, a week, a month, etc. The passcode circuit 109 can assign a lifetime based on the lifetime information received from the payee 3890 either with the request (3802) or based on a pre-established lifetime policy. In some embodiments, the payee 3890 or some other entity can generate the passcode and provide the passcode to the provider computing system 101. For example, the payee 3890 device can be used to generate the passcode and communicate the passcode to the provider computing system 101 over a network.

In one or more embodiments, the provider passcode circuit 109 may store the passcode in the account database 127 (FIG. 11). The account management circuit 103 can create a record associated with payee 3890. The provider passcode circuit 109 can use the payee information received with the passcode generation request 3802 to access the record associated with the payee 3890, and store the generated passcode.

The provider computing system 101 can transmit the generated passcode to the payee 3890 (3806). The payee 3890 can, in turn, transmit the passcode to the payor 3895. In some examples, the payee 3890 can electronically transmit the passcode to the payor 3895 via text, email, chat, etc. In some examples, the payee 3890 can also choose to convey the passcode to the payor 3895 in person or over the phone. In some examples, the provider computing system 101 can instead transmit the generated passcode directly to the payor 3895 (3834). In this instance as well, the provider computing system 101 may utilize electronic means to transmit the passcode to the payor 3895. In some other examples, the provider computing system 101 may initiate a work order to have the passcode printed and mailed to the payor 3895.

The provider computing system 101 can store the passcode in the provider account database 127. In some instances, the provider computing system 101 can transmit at least a portion of the information stored in the provider account database 127 associated with the payee 3890 to the transaction machine 1130 (3810). For example, the provider computing system 101 can transmit the passcode to the transaction machine 1130, which can store the passcode in the transaction machine account database 1127 (3812).

The payor 3895 can approach and interact with the transaction machine 1130 (3814). In response to the payee's interaction with the transaction machine 1130, the user interface circuit 107 can provide (3816) a passcode user interface to the payor 3895. In some embodiments, the transaction machine 1130 can display a passcode interface on a display 138 of the transaction machine 1130. One example of the user interface can be similar to the interface 3000 shown in FIG. 30. In some other embodiments, the transaction machine 1130 can provide an audio user interface in place of or in addition to the display interface. Referring to the interface 3000 shown in FIG. 30, the interface 3000 can include a "Use an Access Code" button 3002, which the user can click to initiate the transaction using a passcode (FIG. 38, 3818). Responsive to the payor selecting the "Use and Access Code" button 3002, the user interface circuit 107 can provide a user interface that allows the payor to enter the passcode. A screenshot of an example user interface 3100 is shown in FIG. 31, and discussed above. The payor can utilize the passcode user interface 3100 to enter the passcode in the passcode field 1302 and click the OK button 3104.

Figure 39:
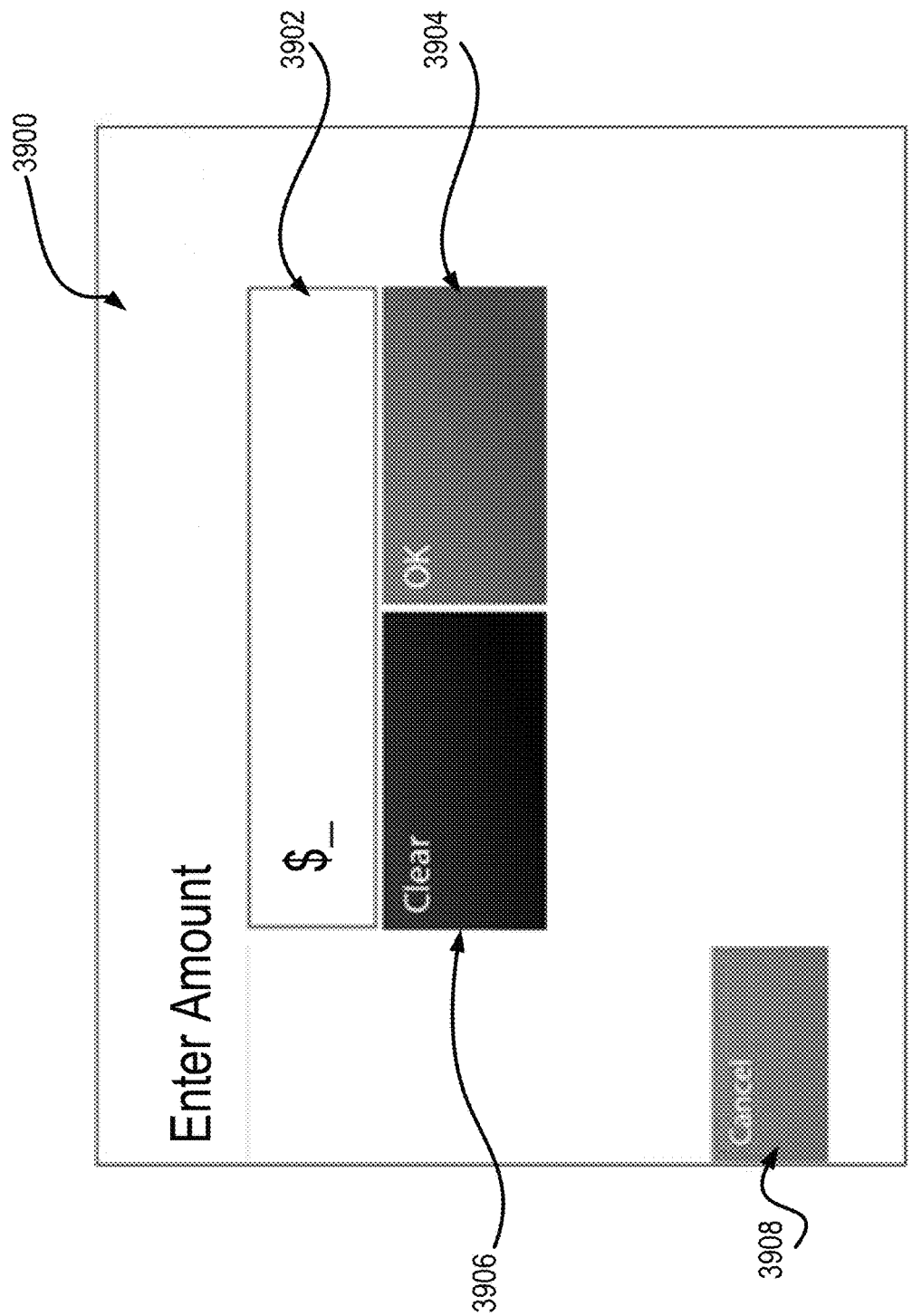
FIG. 39 shows a screenshot of an example amount user interface on which the payor can enter an amount.

Responsive to the payor entering the passcode, the transaction machine 1130 can determine the validity of the passcode (3820). For example, the transaction processing circuit 142 (FIG. 11) can access the transaction machine account database 1127 to access a database entry associated with the passcode. If the database entry exists the transaction processing circuit 142 can determine that the passcode is valid. Responsive to determining that the passcode is valid, the transaction machine 1130 can provide an amount user interface requesting an amount associated with the transaction. FIG. 39 shows a screenshot of an example amount user interface 3900 on which the payor can enter an amount. The amount user interface 3900 can include an amount field 3902, an OK button 3905, a CLEAR button 3906, and a CANCEL button 3908. The payor can user a keypad (not shown) or voice commands to enter the amount in the amount field 3902. The payor can then press the OK button 3904 to enter the amount (3822), or press the CLEAR button 3906 to clear the amount field 3902, and re-enter a different amount. The payor can press the CANCEL button 3908 to terminate the transaction.

In some embodiments, the transaction machine can verify the amount entered with an expected amount stored in association with the passcode in the account database 1127. The expected amount can be received as part of the request for the passcode from the payee. In such instances, the transaction machine can match the amount entered by the payor in the amount field 3902 with the expected amount. If the amount matches, the transaction machine can proceed with providing a payment user interface. If the amounts do not match, the transaction machine can indicate the mismatch to the payor on the amount user interface 3900. The transaction machine 1130 can terminate the transaction if the payor enters an incorrect amount for a pre-determined number of times. Alternatively, the transaction machine 1130 can proceed with providing the payment user interface regardless of the mismatch, and merely indicate to the payor of the mismatch on the amount user interface 3900.

In some embodiments, the transaction machine can determine whether the amount entered by the payor 3895 exceeds a threshold value above the amount. The threshold value can be set by the payee or by the financial institution associated with the provider computing system 101. The threshold value can set a safe upper limit to the transactions to reduce mistake or fraud. As an example, the threshold value can be equal to $500, but other desired threshold values can also be selected. Responsive to determining that the amount entered exceeds the threshold value, the transaction machine can indicate to the payor on the amount user interface to re-enter an amount below the threshold value.

Figure 40:
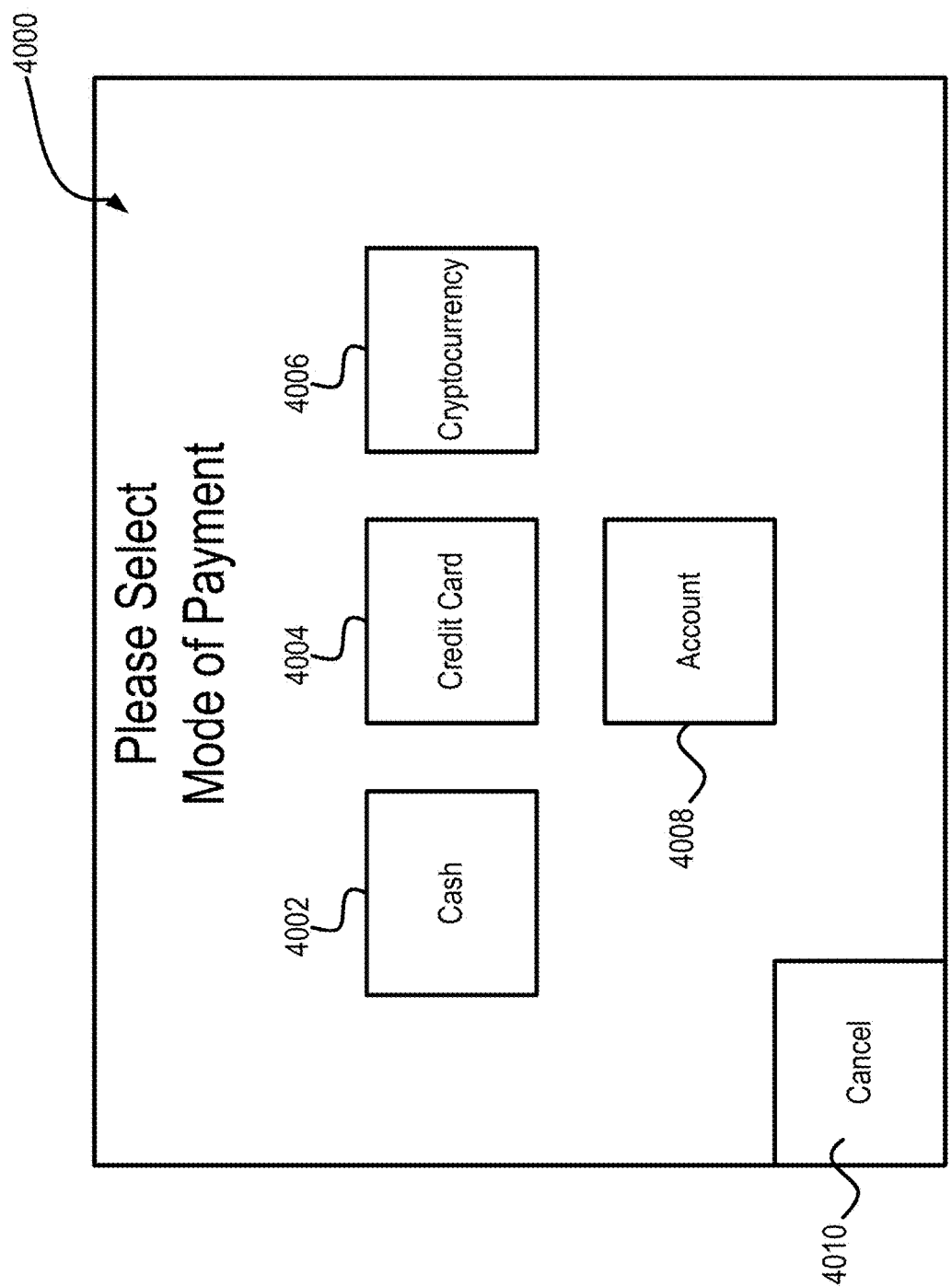
FIG. 40 shows a screenshot of an example payment user interface that allows the payor to select a mode of payment.

Responsive to receiving the amount from the amount user interface the transaction machine 1130 can provide a payment user interface (3824). The payment user interface can allow the user to select a mode of payment. FIG. 40 shows a screenshot of an example payment user interface 4000 that allows the payor to select a mode of payment. The payment user interface 4000 includes a Cash button 4002, a Credit Card button 4004, a Cryptocurrency button 4006, an Account button 4008, and a Cancel button 4010. Selection of the appropriate buttons can indicate the mode of payment with which the payor 3895 would like to make the payment in the amount specified in the amount user interface. In the instance where the payor 3895 selects the Cash button 4002, the transaction machine 1130 can display to the payor 3895 user interfaces similar to those discussed above in relation to FIGS. 33-36. In some instances, the payor 3895 may select the cash payment mode because the payor 3895 does not hold an account with a provider or financial institution associated with the transaction machine 1130 or the provider computing system 101.

Similar user interfaces can be provided to the payor 3895 in response to the selection of other modes of payments. For example, responsive to the payor 3895 selecting the Credit Card button 4004, the transaction machine can provide a credit card user interface that allows the payor 3895 to enter credit card information on the user interface. The transaction machine 1130 can send the credit card information to the provider computing system 101 to process the credit card transaction and provide a notification if the credit card transaction is successful. The transaction machine 1130 can then indicate to the payor 3895 whether the credit card transaction was successfully completed or failed. Similarly, responsive to the payor 3895 selecting the Cryptocurrency button 4006, the transaction machine 1130 can provide the payor 3895 with a cryptocurrency user interface that allows the payor 3895 to select the type of currency (e.g., Bitcoin, Dash, Etherium, etc.), and enter the cryptocurrency account information. The transaction machine 1130 can provide the cryptocurrency account information to the provider computing system 101 to process the transaction and receive a notification of success or failure of the transaction. Also similarly, if the user selects the Account button 4008, the transaction machine can provide an account user interface that allows the payor 3895 to enter details of a bank account, such as a checking or saving account that the payor 3895 holds with the financial institution associated with the provider computing system 101.

Responsive to successfully receiving the payment, the transaction machine 1130 send a notification of the completion of the transaction to the payee (3830). In particular, the transaction processing circuit 142 (FIG. 11) can send a notification to the payee 3890 that a payor has deposited money associated with the passcode. The notification can include the amount deposited, the passcode or information related to the passcode, mode of payment, the time and date of the payment transaction, the location of the transaction machine, etc. The transaction machine 1130 can send the notification electronically, such as for example in a text message or an email. In some instances, the transaction machine 1130 can also send a notification to the provider computing machine 101 indicating that a payment was made in association with the passcode at the transaction machine 1130, where the notification can include the amount deposited and any other information discussed above. The provider computing system 101 can, in turn, notify the user that the payment was successfully received. For example, the third party computing system 131 can send a text, email, or a message on a third party application installed on the user computing device.

The embodiments of the methods and system have been described with reference to drawings. The drawings illustrate certain details of specific embodiments that implement the systems and methods and programs of the present invention. However, describing the invention with drawings should not be construed as imposing on the invention any limitations that may be present in the drawings. The embodiments described above contemplate methods, systems and program products stored on any non-transitory machine-readable storage media for accomplishing its operations. The embodiments may be implemented using an existing computer processor, or by a special purpose computer processor incorporated for this or another purpose or by a hardwired system.

As noted above, embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, logics, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method comprising:
 receiving, by one or more processors, a request to complete a transaction between a third party and a third party customer;
 providing, by the one or more processors, a first user interface to the third party customer via a customer device associated with the third party customer, the first user interface comprising a plurality of payment options to complete the transaction;

receiving, by the one or more processors, a selection of one of the plurality of payment options to complete the transaction, the selection comprising a cash payment at a transaction machine;

identifying, by the one or more processors, a plurality of transaction machines that accept cash for bill payment that are located near the third party customer;

generating, by the one or more processors, a second user interface comprising a map that shows locations of the plurality of transaction machines in relation to a current position of the third party customer, wherein generating the second user interface includes adjusting a sequence of user interfaces displayed via the user device based on receiving the selection comprising a cash payment at a transaction machine and identifying the plurality of transaction machines; and providing, by the one or more processors, a transaction completion indication on the customer device based on the cash payment being received by one of the plurality of transaction machines from the map.

2. The method of claim 1, further comprising:

generating, by the one or more processors based on receiving the selection, a payment identification code specific to the transaction; and providing, by the one or more processors, a third user interface to the third party customer, the third user interface comprising the payment identification code.

3. The method of claim 2, wherein the third user interface further comprises at least one of a payment identification expiration duration, a new payment identification button, a find a transaction machine button, or transaction details.

4. The method of claim 2, further comprising:

receiving, by the one or more processors, an information request for transaction information associated with the payment identification code; and providing, by the one or more processors, the transaction information to the transaction machine based on the payment identification code being received by the transaction machine.

5. The method of claim 4, wherein the transaction information comprises at least one of an amount of the transaction, transaction details, a duration of time for which a payment amount is valid, or an identity of the third party.

6. The method of claim 1, further comprising:

receiving, by the one or more processors, a payment notification indicating the cash payment for the transaction was received by the transaction machine.

7. The method of claim 6, further comprising:

updating, by the one or more processors based on receiving the payment notification, a database associated with the third party to indicate the cash payment for the transaction has been received.

8. The method of claim 7, further comprising:

providing, by the one or more processors, an updated balance on the customer device based on the cash payment being received and being insufficient to cover an outstanding balance.

9. A system comprising:

a network interface circuit configured to:

receive a request to complete a transaction between a third party and a third party customer;

provide a first user interface to the third party customer via a customer device associated with the third party customer, the first user interface comprising a plurality of payment options to complete the transaction;

receive a selection of one of the plurality of payment options to complete the transaction, the selection comprising a cash payment at a transaction machine;

identify a plurality of transaction machines that accept cash for bill payment that are located near the third party customer;

generate a second user interface comprising a map that shows locations of the plurality of transaction machines in relation to a current position of the third party customer, wherein generation of the second user interface includes the network interface circuit being configured to adjust a sequence of user interfaces displayed via the customer device based on receipt of the selection comprising a cash payment at a transaction machine and identification of the plurality of transaction machines; and provide a transaction completion indication on the customer device based on the cash payment being received by one of the plurality of transaction machines from the map.

10. The system of claim 9, further comprising:

a passcode circuit configured to generate a payment identification code specific to the transaction;

wherein the network interface circuit is further configured to provide a third user interface to the third party customer, the third user interface comprising the payment identification code.

11. The system of claim 10, wherein the third user interface further comprises at least one of a payment identification expiration duration, a new payment identification button, a find a transaction machine button, or transaction details.

12. The system of claim 10, wherein the network interface circuit is further configured to:

receive an information request for transaction information associated with the payment identification code; and provide the transaction information to the transaction machine based on the payment identification code being received by the transaction machine.

13. The system of claim 12, wherein the transaction information comprises at least one of an amount of the transaction, transaction details, a duration of time for which a payment amount is valid, or an identity of the third party.

14. The system of claim 9, further comprising a notification circuit configured to receive a payment notification indicating the cash payment for the transaction was received by the transaction machine.

15. The system of claim 14, wherein the notification circuit is further configured to update, based on receipt of the payment notification, a database associated with the third party to indicate the cash payment for the transaction has been received.

16. The system of claim 15, wherein the notification circuit is further configured to provide an updated balance on the customer device based on the cash payment being received and being insufficient to cover an outstanding balance.

17. A non-transitory computer readable medium storing instructions that, when executed by one or more processors, cause the one or more processors to:

receive a request to complete a transaction between a third party and a third party customer;

provide a first user interface to the third party customer via a customer device associated with the third party customer, the first user interface comprising a plurality of payment options to complete the transaction;

receive a selection of one of the plurality of payment options to complete the transaction, the selection comprising a cash payment at a transaction machine;

identify a plurality of transaction machines that accept cash for bill payment that are located near the third party customer;

generate a second user interface comprising a map that shows locations of the plurality of transaction machines in relation to a current position of the third party customer wherein generation of the second user interface includes adjusting a sequence of user interfaces displayed via the customer device based on receipt of the selection comprising a cash payment at a transaction machine and identification of the plurality of transaction machines; and provide a transaction completion indication on the customer device based on the cash payment being received by one of the plurality of transaction machines from the map.

18. The non-transitory computer readable medium of claim 17, wherein the instructions cause the one or more processors to:

generate a payment identification code specific to the transaction; and provide a third user interface to the third party customer, the third user interface comprising the payment identification code.

19. The non-transitory computer readable medium of claim 18, wherein the instructions cause the one or more processors to:

receive an information request for transaction information associated with the payment identification code; and provide the transaction information to the transaction machine based on the payment identification code being received by the transaction machine.

20. The non-transitory computer readable medium of claim 17, wherein the instructions cause the one or more processors to:

receive a payment notification indicating the cash payment for the transaction was received by the transaction machine; and update, based on receipt of the payment notification, a database associated with the third party to indicate the cash payment for the transaction has been received.

* * * * *